US011383703B2

(12) United States Patent
Nishi et al.

(10) Patent No.: US 11,383,703 B2
(45) Date of Patent: Jul. 12, 2022

(54) WORK VEHICLE

(71) Applicant: KUBOTA CORPORATION, Osaka (JP)

(72) Inventors: Keishiro Nishi, Osaka (JP); Atsushi Shinkai, Osaka (JP); Tomofumi Fukunaga, Osaka (JP); Takahiro Nakatsuka, Osaka (JP); Atsushi Kobayashi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 314 days.

(21) Appl. No.: 16/479,437

(22) PCT Filed: Dec. 26, 2017

(86) PCT No.: PCT/JP2017/046691
§ 371 (c)(1),
(2) Date: Jul. 19, 2019

(87) PCT Pub. No.: WO2018/135256
PCT Pub. Date: Jul. 26, 2018

(65) Prior Publication Data
US 2019/0382005 A1   Dec. 19, 2019

(30) Foreign Application Priority Data

Jan. 20, 2017   (JP) .............................. JP2017-008346
Jan. 20, 2017   (JP) .............................. JP2017-008348
(Continued)

(51) Int. Cl.
*B60W 30/09*   (2012.01)
*A01B 69/04*   (2006.01)
(Continued)

(52) U.S. Cl.
CPC ........... *B60W 30/09* (2013.01); *A01B 69/008* (2013.01); *G01S 7/481* (2013.01); *G01S 7/521* (2013.01);
(Continued)

(58) Field of Classification Search
CPC .......... B60W 30/09; B60W 2300/152; B60W 2420/54; A01B 69/008; G01S 7/481; G01S 7/521; G01S 15/931; G05D 1/0255
See application file for complete search history.

(56) References Cited

U.S. PATENT DOCUMENTS 4,920,520 A   4/1990   Goebel et al.
6,173,215 B1   1/2001   Sarangapani
(Continued)

FOREIGN PATENT DOCUMENTS

EP   2 888 930 A1   7/2015
JP   62-65110   3/1987
(Continued)

OTHER PUBLICATIONS

Office Action issued on Japanese Patent Application No. 2017-084413, dated Sep. 15, 2020 and English Translation thereof.
(Continued)

*Primary Examiner* — Calvin Cheung
(74) *Attorney, Agent, or Firm* — Greenblum & Bernstein, P.L.C.

(57) ABSTRACT

The present invention is provided to more reliably keep a work vehicle from coming into contact with an obstacle during automated driving. The work vehicle includes an electronic control system for automated driving that automatically drives the vehicle body. The electronic control system includes an obstacle detection module configured to detect presence or absence of an obstacle, and a contact avoidance control unit configured to perform, upon the
(Continued)

obstacle detection module detecting an obstacle, contact avoidance control to keep the vehicle body from coming into contact with the obstacle. The obstacle detection module includes a plurality of obstacle searchers that are distributed on the front end portion and the right and left end portions of the vehicle body such that the front side and the right and left lateral sides of the vehicle body are search-target areas.

11 Claims, 34 Drawing Sheets

(30) Foreign Application Priority Data

| | | | |
|---|---|---|---|
| Apr. 21, 2017 | (JP) | ............................. | JP2017-084413 |
| Apr. 21, 2017 | (JP) | ............................. | JP2017-084414 |
| Apr. 26, 2017 | (JP) | ............................. | JP2017-087498 |

(51) Int. Cl.
  *G01S 7/481* (2006.01)
  *G01S 7/521* (2006.01)
  *G01S 15/931* (2020.01)
  *G05D 1/02* (2020.01)

(52) U.S. Cl.
  CPC .......... *G01S 15/931* (2013.01); *G05D 1/0255* (2013.01); *B60W 2300/152* (2013.01); *B60W 2420/54* (2013.01)

(56) References Cited

U.S. PATENT DOCUMENTS

| | | |
|---|---|---|
| 2010/0036553 A1 | 2/2010 | Morichika et al. |
| 2015/0160655 A1 | 6/2015 | Korthals et al. |
| 2016/0340867 A1 | 11/2016 | Matsuzaki |
| 2017/0139418 A1 | 5/2017 | Hiramatsu et al. |
| 2017/0268202 A1 | 9/2017 | Matsuzaki |
| 2017/0316692 A1* | 11/2017 | Rusciolelli ........... A01B 79/005 |
| 2018/0141544 A1* | 5/2018 | Xiao ....................... G08G 1/164 |
| 2018/0321682 A1 | 11/2018 | Matsumoto et al. |
| 2019/0382005 A1 | 12/2019 | Nishi et al. |

FOREIGN PATENT DOCUMENTS

| | | |
|---|---|---|
| JP | 05-03311 U | 4/1993 |
| JP | 33011/1993 | 4/1993 |
| JP | 7-35846 | 2/1995 |
| JP | 7-87807 | 4/1995 |
| JP | 3034007 | 2/1997 |
| JP | H9-094006 | 4/1997 |
| JP | 10 6979 A | 1/1998 |
| JP | 2000-214927 | 8/2000 |
| JP | 2000-276232 | 10/2000 |
| JP | 2001-341672 | 12/2001 |
| JP | 2003-291848 | 10/2003 |
| JP | 2006 209644 A | 8/2006 |
| JP | 2008-092818 | 4/2008 |
| JP | 2010-202005 | 9/2010 |
| JP | 2010-211512 | 9/2010 |
| JP | 2011-62115 | 3/2011 |
| JP | 2015-191592 | 11/2015 |
| JP | 2016-168883 | 9/2016 |
| JP | 2016-206999 | 12/2016 |
| JP | 6781055 | 10/2020 |
| WO | 2009/011141 | 1/2009 |
| WO | 2015/147082 | 10/2015 |
| WO | 2016/178294 | 11/2016 |

OTHER PUBLICATIONS

Office Action issued on Japanese Patent Application No. 2017-084414, dated Sep. 15, 2020 and English Translation thereof.
Official Communication issued in International Bureau of WIPO Patent Application No. PCT/JP2017/046691, dated Apr. 3, 2018.
Extended European Search Report issued from European Patent Application No. 17893066.5 dated Oct. 7, 2020.
Notice of Reasons for Refusal in Japanese Patent Application No. 2020-173310, dated Nov. 9, 2021, with an English translation thereof.
Notice of Reasons for Refusal in Japanese Patent Application No. 2020-173311, dated Nov. 9, 2021, with an English translation thereof.
Office Action issued in Corresponding JP Patent Application 2021-018850, dated Apr. 26, 2022, along with an English translation thereof.

* cited by examiner

WORK VEHICLE

TECHNICAL FIELD

The present invention relates to a work vehicle.

BACKGROUND ART

First Background Art

One example of a work vehicle as mentioned above is a work vehicle that includes, in a front portion of the vehicle body, an obstacle detection means for detecting the presence or absence of an obstacle in front of the vehicle body (see e.g. JP 2008-092818 A: Patent Literature 1).

In the work vehicle described in Patent Literature 1, it is conceivable that, upon the obstacle detection means detecting an obstacle, automated driving (autonomous travel) of the vehicle body is stopped, thereby preventing an issue such as the vehicle body coming into contact with the obstacle located in front of the vehicle body and being damaged.

It is also conceivable that the vehicle body travels, with automated driving, in a straight line toward an end of a farm field until the obstacle detection means detects a ridge as an obstacle, and upon the obstacle detection means detecting a ridge as an obstacle, the automated driving of the vehicle body is stopped so that the vehicle body is automatically stopped at the end of the farm field.

Second Background Art

One example of a work vehicle as mentioned above is a work vehicle that includes, in a front portion of the vehicle body, an obstacle detection means for detecting the presence or absence of an obstacle in front of the vehicle body (see JP 2008-092818 A, for example).

In the work vehicle described in Patent Literature 1, it is conceivable that, upon the obstacle detection means detecting an obstacle, automated driving (autonomous travel) of the vehicle body is stopped, thereby preventing an issue such as the vehicle body coming into contact with the obstacle located in front of the vehicle body and being damaged.

It is also conceivable that the vehicle body travels, with automated driving, in a straight line toward an end of a farm field until the obstacle detection means detects a ridge as an obstacle, and upon the obstacle detection means detecting a ridge as an obstacle, the automated driving of the vehicle body is stopped so that the vehicle body is automatically stopped at the end of the farm field.

Third Background Art

One example of the above-described work vehicle is disclosed in JP 2008-092818 A. The work vehicle described in this document is provided with, in a front portion of the vehicle body, an obstacle detection means capable of detecting an obstacle that is present in front of the vehicle body. In this work vehicle, automated driving (autonomous travel) of the vehicle body is stopped upon detection of an obstacle by the obstacle detection means, thereby keeping the vehicle body from coming into contact with the obstacle that is present in front of the vehicle body.

Fourth Background Art

One example of the above-described work vehicle is disclosed in JP 2008-092818 A. The work vehicle described in this document is provided with, in a front portion of the vehicle body, an obstacle detection means capable of detecting an obstacle that is present in front of the vehicle body. In this work vehicle, automated driving (autonomous travel) of the vehicle body is stopped upon detection of an obstacle by the obstacle detection means, thereby keeping the vehicle body from coming into contact with the obstacle that is present in front of the vehicle body.

Fifth Background Art

In recent years, in order to, for example, solve the issue of shortage of manpower and reduce labor in agricultural work using a work vehicle such as a tractor and a combine, it is conceivable that the work vehicle is provided with an electronic control system for automated driving that automatically drives the vehicle body, for example.

Also, examples of the work vehicle provided with the electronic control system for automated driving include a work vehicle that includes an obstacle detector (obstacle detection unit) such as a laser scanner for detecting an obstacle in the surroundings of the vehicle body, so that it is possible to avoid the risk of the work vehicle coming into contact with an obstacle during automated driving in a farm field (see e.g. JP 2016-168883 A: Patent Literature 2).

PRIOR ART DOCUMENTS

Patent Literatures

Patent Literature 1: JP 2008-092818 A
Patent Literature 2: JP 2016-168883 A

SUMMARY OF THE INVENTION

Problem to be Solved by the Invention

First Problem
The problem with respect to First Background Art is as follows.

The work vehicle disclosed in JP 2008-092818 A is merely provided with the obstacle detection means for detecting the presence or absence of an obstacle in front of the vehicle body. Accordingly, when, for example, the work vehicle is traveling while turning at an end of a farm field (referred to as "ridge edge turn") during automated driving, if the vehicle body makes a large turn due to a malfunction of a steering mechanism, a slip of a travel apparatus, or the like, and a lateral side portion of the work vehicle unexpectedly approaches an obstacle such as a ridge, the obstacle detection means cannot detect presence of this obstacle. Accordingly, the work vehicle cannot appropriately deal with the above-described unexpected approach, which may cause an issue of the lateral side portion of the work vehicle coming into contact with the obstacle.

In other words, there is demand for being able to more reliably avoid the risk that a work vehicle will come into contact with an obstacle during automated driving.

Second Problem
The problem with respect to Second Background Art is as follows.

The work vehicle described in JP 2008-092818 A is merely provided with the obstacle detection means for detecting the presence or absence of an obstacle in front of the vehicle body. Accordingly, for example, when the work vehicle is traveling backward during automated driving, if, a rear portion of the work vehicle approaches an obstacle such as a ridge, the obstacle detection means cannot detect presence of the obstacle. Accordingly, the work vehicle cannot appropriately deal with the case where the rear portion of the work vehicle has approached the obstacle, which may cause an issue of the rear portion of the work vehicle coming into contact with the obstacle.

In other words, there is demand for being able to more reliably avoid the risk that a work vehicle will come into contact with an obstacle during automated driving.

Third Problem

The problem with respect to Third Background Art is as follows.

In the above-described conventional technology, the obstacle detection means can only detect an obstacle that is present in front of the vehicle body, and cannot detect an obstacle that is present behind the vehicle body, and thus there is a chance that an obstacle will come into contact with a work implement apparatus or the like that is located in a rear portion of the vehicle body.

In view of the above-described circumstances, there is demand for a measure with which a rear portion of the vehicle body can be kept from coming into contact with an obstacle.

Fourth Problem

The problem with respect to Fourth Background Art is as follows.

In the above-described conventional technology, the obstacle detection means can only detect an obstacle that is present in front of the vehicle body, and cannot detect an obstacle that is present lateral to the vehicle body, and thus there is a chance that an obstacle will come into contact with the vehicle body from the side when the vehicle body turns.

In view of the above-described circumstances, there is demand for a measure with which a side portion or the like of the vehicle body can be kept from coming into contact with an obstacle.

Fifth Problem

The problem with respect to Fifth Background Art is as follows.

In the work vehicle disclosed in JP 2016-168883 A, and the like, the obstacle detector is provided at a predetermined height position of the work vehicle at a predetermined mounting angle, by being mounted on a support member fixed to a predetermined position of the work vehicle.

However, in the above-described configuration, there is the risk that an error may occur in the mounting angle of the obstacle detector due to a manufacturing error of the support member or the like, and if such an error occurs, the detection-target area of the obstacle detector will shift. Also, this shift in the detection-target area may cause an issue that if, for example, the vehicle body rolls or pitches during work travel due to unevenness or the like of a farm field, or a wheel or the like of the work vehicle is stuck in the ground of the farm field, the ground of the farm field or the like will enter the detection-target area of the obstacle detector, and the obstacle detector will detect the ground of the farm field or the like as an obstacle.

In other words, there is demand for a measure with which, if an error occurs in the mounting angle of an obstacle detector due to a manufacturing error or the like, the mounting angle of the obstacle detector can be easily adjusted to an appropriate mounting angle.

Means for Solving Problem

As a means for solving the above-described First Problem, according to the present invention:

A work vehicle comprising:
an obstacle detection module configured to detect presence or absence of an obstacle; and
a contact avoidance control unit configured to perform, upon the obstacle detection module detecting an obstacle, contact avoidance control to keep a vehicle body from coming into contact with the obstacle,
the obstacle detection module and the contact avoidance control unit being included in an electronic control system configured for automated driving that automatically drives the vehicle body,
wherein the obstacle detection module includes a plurality of obstacle searchers that are distributed on a front end portion and right and left end portions of the vehicle body such that a front side and right and left lateral sides of the vehicle body are search-target areas.

With this means, if an obstacle has approached the vehicle body from the front side or right or left lateral side of the vehicle body during automated driving, the obstacle detection module detects the obstacle based on search information from any of the obstacle searchers. Also, based on the detection, the contact avoidance control unit performs contact avoidance control, and thereby it is possible to keep the front portion, or right or left lateral side portion of the vehicle body from coming into contact with the obstacle during automated driving.

Also, in the work vehicle, it is often the case where a work implement apparatus is attached to the rear portion of the vehicle body so as to be able to move up and down. Since no obstacle searcher is provided in the rear end portion of the vehicle body, if, for example, a work implement apparatus is attached to the rear portion of the vehicle body so as to be able to move up and down, it is possible to keep the obstacle detection module from misdetecting this work implement apparatus as an obstacle. Also, it is possible to avoid a reduction in work efficiency that may occur resulting from the contact avoidance control unit performing contact avoidance control based on the misdetection.

As a result, during automated driving, it is possible to more reliably keep the work vehicle from coming into contact with an obstacle, and avoid a reduction in work efficiency based on misdetection.

Note that, when, for example, the vehicle body is traveling toward a ridge during automated driving, or when the vehicle body is traveling along a ridge at a ridge edge during automated driving, if the ridge approaches the vehicle body, the obstacle detection module will detect the ridge as an obstacle. Furthermore, if a moving object approaches the vehicle body, the obstacle detection module will detect the moving object as an obstacle.

As a means for preferably implementing the present invention,

The work vehicle further comprises:
a hood that is located in a front portion of the vehicle body;
a cabin that is located in a rear portion of the vehicle body; and
right and left rear fenders that are located in the rear portion of the vehicle body,
wherein the plurality of obstacle searchers include:
right and left first range sensors that are attached to a front end portion of the hood;
right and left second range sensors that are attached to right and left side portions of the hood at positions higher than right and left travel apparatuses, respectively;

right and left third range sensors that are attached to right and left front pillars of the cabin that are located at front/rear intermediate portions of the vehicle body, respectively; and right and left fourth range sensors that are attached to the right and left rear fenders at positions higher than the travel apparatuses, respectively.

According to this means, with the right and left first range sensors, the search-target area on the front side of the vehicle body can be increased in the right-left direction. As a result, it is possible to thoroughly detect presence or absence of an obstacle on the front side of the vehicle body using the obstacle detection module.

Also, of the right and left lateral sides of the vehicle body, the right and left lateral sides in the front portion of the vehicle body, in which the hood and the like are arranged, are the search-target areas of the right and left second range sensors; the right and left lateral sides of the front/rear intermediate direction of the vehicle body, in which the right and left front pillars and the like are arranged, are the search-target areas of the right and left third range sensors; and the right and left lateral sides of the rear portion of the vehicle body, in which the right and left rear fenders and the like are arranged, are the search-target areas of the right and left fourth range sensors.

In other words, with the right and left second range sensors, the right and left third range sensors, and the right and left fourth range sensors, all of the areas on the lateral sides of the vehicle body that extend largely in the front-rear direction can serve as the search-target areas. As a result, it is possible to thoroughly search for the presence or absence of an obstacle on the lateral sides of the vehicle body, using the range sensors.

As a result, it is possible to more reliably avoid the risk that the vehicle body will come into contact with an obstacle during automated driving, based on a search performed by each obstacle searcher.

As a means for preferably implementing the present invention, each of the obstacle searchers comprises a sonar device with an oscillator, and the sonar device is attached to the vehicle body via a resonance prevention member that is made of resin.

With this means, it is possible to prevent resonance that may occur when, for example, the sonar devices are attached to the hood, the rear fenders, or the like that are formed of a steel plate.

As a means for solving the above-described Second Problem, according to the present invention:

A work vehicle comprising:

front and rear obstacle detectors configured to detect an approaching obstacle; and a contact avoidance control unit configured to perform, upon any one of the obstacle detectors detecting an approaching obstacle, contact avoidance control to keep a vehicle body from coming into contact with the obstacle, the front and rear obstacle detectors and the contact avoidance control unit being included in an electronic control system configured for automated driving that automatically drives the vehicle body, wherein the front and rear obstacle detectors are arranged such that the front obstacle detector is located in an upper portion of a front portion of the vehicle body, the rear obstacle detector is located in an upper portion of a rear portion of the vehicle body, and at least one of the front and rear obstacle detectors is located at a right/left center position of the vehicle body.

With this means, if an obstacle approaches the vehicle body from the front side of the vehicle body during automated driving, the approach of the obstacle to the vehicle body will be detected by the obstacle detector located on the front side of the vehicle body. Also, if an obstacle approaches the vehicle body from the rear side, the approach of the obstacle to the vehicle body will be detected by the obstacle detector located on the rear side of the vehicle body. Also, as a result of the contact avoidance control unit performing contact avoidance control based on this detection, it is possible to avoid the risk that, during automated driving, the front portion or the rear portion of the vehicle body will come into contact with an obstacle.

As a result, it is possible to more reliably avoid the risk that the work vehicle during automated driving will come into contact with an obstacle.

As a means for preferably implementing the present invention,

The work vehicle further comprises:

a prime mover part that is located in the front portion of the vehicle body; and a cabin that is located in the rear portion of the vehicle body;

wherein the front obstacle detector is located at a right/left center position of an upper portion of the prime mover part, and the rear obstacle detector is located at a right/left center position of an upper rear end of the cabin.

With this means, the front obstacle detector can also serve as a sighting device that is used for the driver to determine the travel direction of the vehicle body. As a result, it is possible to avoid the risk that the vehicle body will come into contact with an obstacle during automated driving from the front side of the vehicle body, while achieving a reduction in cost by also using the front obstacle detector as a sighting device.

Also, in the work vehicle in which a work implement apparatus is often attached to the rear portion of the vehicle body, the rear obstacle detector can be arranged at a higher position on the upper side of the vehicle body above the work implement apparatus located in the rear portion of the vehicle body. Accordingly, the rear obstacle detector can favorably detect that an obstacle has approached and entered a short range of the work implement apparatus located in the rear portion of the vehicle body, without interference from the work implement apparatus. As a result, it is possible to avoid the risk that the work implement apparatus located in the rear portion of the vehicle body during automated driving will come into contact with an obstacle.

As a means for preferably implementing the present invention, the prime mover part includes:

an engine located in a downstream portion, in a cooling direction, of the prime mover part, and a radiator located on a upstream side relative to the engine in the cooling direction, and wherein the front obstacle detector is provided on the upstream side relative to the radiator, in the cooling direction of the radiator.

With this means, it is possible to avoid heat damage that may be caused by heated cooling air used to cool, thus heated by the engine and the radiator reaching the obstacle detector on the front side.

As a means for preferably implementing the present invention, the prime mover part includes:
a support frame attached to a vehicle body frame in an upright orientation, and
a hood configured to be pivotally opened and closed,
wherein the front obstacle detector is attached to an upper end portion of the support frame, and
wherein the hood has an opening through which a detection unit of the front obstacle detector is exposed upward from the hood when the hood is at a closed position.

With this means, an impact that occurs when an operation for closing the hood is performed is unlikely to affect the front obstacle detector, compared to a case where the front obstacle detector is attached to the hood. Accordingly, the supporting structure and vibration-proof structure that are required to attach the front obstacle detector can be simplified. Also, during automated driving, while achieving simplification of the supporting structure and vibration-proof structure, the detection unit of the obstacle detector, which is exposed to the upper side of the hood from the opening formed in the hood at the closed position, can detect an obstacle that is approaching the vehicle body in the front portion.

As a means for preferably implementing the present invention,
The work vehicle further comprises:
a dustproof member provided between the support frame and the hood at the closed position, the dustproof member being configured to prevent dust from entering the hood through the opening.

With this means, it is possible to prevent, using the dustproof member, powder dust in air, together with outside air, from entering the hood from the opening in the hood. As a result, it is possible to prevent an issue, such as clogging of the radiator, from occurring due to dust entering the hood from the opening in the hood.

As a means for preferably implementing the present invention,
each of the obstacle detectors is attached to the vehicle body via vibration-proof rubber element.

With this means, vibration of the vehicle body is unlikely to be transmitted to the obstacle detectors. As a result, it is possible to prevent vibration of the vehicle body from adversely affecting the obstacle detectors.

As a means for solving the above-described Third Problem, according to the present invention:
A work vehicle comprising:
an obstacle detection module configured to detect presence or absence of an obstacle; and
a travel regulation control unit configured to control travel of a vehicle body upon the obstacle detection module detecting an obstacle,
the obstacle detection module and the electronic control system being included in an electronic control system configured for automated driving that automatically drives a vehicle body,
wherein the obstacle detection module includes a plurality of obstacle searchers each configured to detect an obstacle that is present in a search-target area, and
wherein the obstacle searchers include a pair of right and left first obstacle searchers, each of the first obstacle searchers having the search-target area thereof on a right/left lateral side of a rear end portion of a main part of the vehicle body.

According to the present invention, the pair of right and left first obstacle searchers can detect an obstacle that is present in the vicinity of the rear end portion of the main part of the vehicle body. Upon the pair of right and left first obstacle searchers detecting an obstacle, travel of the vehicle body is prevented. Therefore, for example, when an obstacle is located between the work implement apparatus located in the rear end portion of the vehicle body, and the main part of the vehicle body, the vehicle body can be prevented from shifting from the stopped state to the travel state. Thus, for example, it is possible to avoid an issue such as the work implement apparatus running over the obstacle, thus increasing reliability in automated driving.

Therefore, according to the present invention, it is possible to keep the obstacle from coming into contact with the rear portion of the vehicle body.

According to the present invention, preferably,
each of the first obstacle searchers is attached to a rear portion of a rear fender associated therewith.

With the above-described configuration, the first obstacle searchers can accurately detect an obstacle that is present in the vicinity of a rear end portion of the rear wheels located below the rear fenders.

According to the present invention, preferably,
the obstacle searchers include a pair of right and left second obstacle searchers, each of the second obstacle searchers having the search-target area thereof on a right/left lateral side of a front/rear center portion of the vehicle body.

With the above-described configuration, the second obstacle searchers can accurately detect an obstacle that is present in the vicinity of a lateral side in the front/rear center portion of the vehicle body.

According to the present invention, preferably,
each of the second obstacle searchers is attached to a front portion of a rear fender associated therewith.

With the above-described configuration, the second obstacle searchers can accurately detect an obstacle that is present in the vicinity of a front end portion of the rear wheels located below the rear fenders.

According to the present invention, preferably,
the obstacle detection module includes an obstacle detector configured to detect an obstacle that is present in a detection-target area using a method different from a method performed by the obstacle searchers, and
wherein the search-target areas of the obstacle searchers include an area located below the detection-target area of the obstacle detector.

With the above-described configuration, by covering the area below the detection-target area of the obstacle detector with the search-target areas of the obstacle searchers, it is possible to reduce blind areas in which an obstacle cannot be detected, and thoroughly detect an obstacle that is present in the surroundings of the vehicle body and may hinder automated driving.

According to the present invention, preferably,
each of the obstacle searchers comprises an ultrasonic sonar device.

With the above-described configuration, by using relatively inexpensive ultrasonic sonar devices for obstacle detection, it is possible to suppress an increase in the overall cost.

As a means for solving the above-described Fourth Problem, according to the present invention:
A work vehicle comprising:
an obstacle detection module configured to detect presence or absence of an obstacle; and
a travel regulation control unit configured to control travel of a vehicle body upon the obstacle detection module detecting an obstacle, the obstacle detection module and the travel regulation control unit being included in an electronic control system configured for automated driving that automatically drives the vehicle body, wherein the obstacle detection module includes an obstacle detector that is configured to detect an obstacle present in a detection-target area located on a front side and a lateral side of a main part of the vehicle body.

According to the present invention, if, for example, during travel of the vehicle body, an obstacle appears out from the front or lateral side of the main part of the vehicle body, the obstacle detectors for detecting an obstacle that is present in the front and lateral sides of the main part of the vehicle body can accurately detect the obstacle, and based on the detection result, travel of the vehicle body is appropriately suppressed. Accordingly, for example, the vehicle body is unlikely to come into contact with an obstacle when making a turn, thus increasing reliability in automated driving.

Therefore, according to the present invention, it is possible to avoid the obstacle from coming into contact with the vehicle body from the side or the like.

According to the present invention, preferably, in a right-left direction, the obstacle detector is located between an outer end of a hood, and an outermost position of the main part of the vehicle body associated therewith.

With the above-described configuration, while appropriately setting the detection range, it is possible to arrange the obstacle detectors in a small range so that they are not located outward from the main part of the vehicle body.

According to the present invention, preferably, the obstacle detector is located at a front/rear intermediate portion of the main part of the vehicle body.

With the above-described configuration, it is possible to set a large detection-target area in which an obstacle can be detected with the main part of the vehicle body serving as the center.

According to the present invention, preferably, in an up-down direction, the obstacle detector is located between an upper end portion of a hood, and an upper end portion of a front wheel.

With the above-described configuration, it is possible to set the obstacle detectors reasonably so that their detection-target areas can be set such that the constituent components of the main part are not detected but an obstacle other than the main part can be suitably detected, in contrast to cases where, for example, obstacle detectors are arranged at positions higher than the hood, or positions lower than the upper end portion of the front wheels.

Note that positions "between an upper end portion, in an up-down direction, of the hood, and an upper end portion of a front wheel" include positions at the same height as the upper end portion of the hood, and the positions at the same height of the upper end portions of the front wheels.

According to the present invention, preferably, the obstacle detector is attached to a support frame that extends in an up-down direction.

With the above-described configuration, the height at which the obstacle detector is attached can be appropriately adjusted along the direction in which the support frame extends.

According to the present invention, preferably, the support frame comprises a front pillar provided in a cabin.

With the above-described configuration, the front pillars, which are reinforcement members of the cabin, can also be used as the support members for the obstacle detectors, and thus no dedicated support member for attaching the obstacle detectors is required.

According to the present invention, preferably, the obstacle detector is attached to a ROPS (Roll Over Protective Structure) frame for turnover protection of the work vehicle.

With the above-described configuration, an ROPS frame for turnover protection can also be used as the mounting member for mounting the obstacle detectors.

According to the present invention, preferably, a right-left pair of the obstacle detectors are provided.

With the above-described configuration, even if an obstacle appears on any of the right and left sides of the main part of the vehicle body, the right or left obstacle detector can suitably detect the obstacle.

According to the present invention, preferably, the detection-target area of the obstacle detector is set to extend over an upper front side of a front wheel.

With the above-described configuration, the obstacle detector can accurately detect an obstacle on the front side of the front wheels.

According to the present invention, preferably, the obstacle detector comprises a laser scanner, and wherein the detection-target area of the obstacle detector is set to be inclined fore and aft, and right and left with respect to the horizontal plane.

With the above-described configuration, although, for example, if the detection-target areas of the obstacle detectors are oriented horizontally, only an obstacle that is present right beside the obstacle detector can be detected, with the detection-target areas of the obstacle detectors that are inclined frontward, rearward, leftward, and rightward, with respect to a horizontal plane, it is possible to appropriately detect an obstacle that is present at a height different from the positions at which the obstacle detectors are placed.

As a means for solving the above-described Fifth Problem, according to the present invention:

A work vehicle comprising:

an obstacle detector configured to detect an obstacle around a vehicle body; and a mounting unit configured to mount the obstacle detector on the vehicle body, wherein the mounting unit includes an adjustment mechanism configured to adjust a mounting angle of the obstacle detector on the vehicle body.

With this means, if an error occurs in the mounting angle of the obstacle detector due to a manufacturing error or the like, the adjustment mechanism facilitates adjustment of the mounting angle of the obstacle detector to an appropriate mounting angle, thereby avoiding the risk that the detection-target area of the obstacle detector will shift.

As a result, if, resulting from the shift in the detection-target area of the obstacle detector, for example, during work travel, the vehicle body rolls or pitches due to unevenness of a farm field, or if a wheel or the like of the work vehicle is stuck in the ground of the farm field, it is possible to prevent an issue such as the ground of the farm field or the like entering the detection-target area of the obstacle detector, and the obstacle detector detecting the ground of the farm field as an obstacle.

As a means for preferably implementing the present invention, the mounting unit includes:
- a fixing member that is fixed to the vehicle body, and
- a plurality of support members that are configured to support a plurality of the obstacle detectors having different detection-target areas, respectively, and wherein the fixing member has the plurality of the support members mounted thereon such that mounting angles of the support members can be adjusted independently of each other, whereby the adjustment mechanism allows adjustment of the mounting angles of the plurality of the obstacle detectors independently of each other.

With this means, by mounting the plurality of obstacle detectors to the fixing member, it is possible to achieve simplification of the configuration with a reduction in the number of fixing members. Also, while achieving such simplification of the configuration, it is possible to adjust the mounting angles of the obstacle detectors individually to the respective appropriate mounting angles, making it possible to avoid the risk that the detection-target areas of the obstacle detectors will shift.

As a means for preferably implementing the present invention,
- one of the plurality of the support members includes a single pivot shaft, and a pair of screw shafts extending parallel to the pivot shaft at positions facing each other across the pivot shaft,
- each of the remainder of the plurality of the support members and the fixing member has a single circular hole through which the pivot shaft is inserted, and a pair of elongate holes through which the pair of the screw shafts are inserted, and
- the adjustment mechanism is configured to mount the plurality of the support members on the fixing member such that the mounting angles of the support members can be adjusted independently of each other, by the pivot shaft, the pair of the screw shafts, the circular hole, the pair of the elongate holes, and a pair of nuts screwed onto the pair of the screw shafts.

With this means, in the adjustment mechanism, in a layout in which the fixing member is located between one of the support members and the remaining one of the support members, the pivot shaft of the one support member is inserted into the circular hole of the fixing member, and the circular hole of the remaining one support member, and the screw shafts of the one support member are inserted into the elongate holes of the fixing member and the elongate holes of the remaining support member. Thus, the angles of the support members with respect to the fixing member can be adjusted individually around the pivot shaft in a range of the elongate holes. Also, after the adjustment of the angles of the support members, the nuts are screwed to the screw shafts, and the fixing member is interposed between the one support member and the remaining support member, and thereby the support members are each fixed to the fixing member at a suitable mounting angle. Accordingly, it is possible to individually adjust the mounting angles of the obstacle detectors to the respective appropriate mounting angles.

In other words, while simply configuring the adjustment mechanism with: a single pivot shaft and a pair of screw shafts that are provided on one support member; and circular holes formed in the remaining support member and the fixing member, and a pair of elongate holes; and a pair of nuts, it is possible to individually adjust the mounting angles of the obstacle detectors to the respective appropriate mounting angles, and avoid the risk that a shift will occur in the detection-target areas of the obstacle detectors.

As a means for preferably implementing the present invention, the mounting unit includes a cover that covers and hides the adjustment mechanism.

With this means, it is possible to suppress the risk of the adjustment mechanism being unintentionally manipulated by a user, and the mounting angles of the obstacle detectors being inappropriately changed.

BRIEF DESCRIPTION OF THE DRAWINGS

FIG. 1 is a left side view of a tractor according to a first embodiment, illustrating a layout of obstacle searchers and obstacle detectors, and the like.

FIG. 2 is a top view of the tractor according to the first embodiment, illustrating the layout of the obstacle searchers and the obstacle detectors, and the like.

FIG. 3 is a perspective view of the tractor according to the first embodiment, illustrating the layout of the obstacle searchers and the obstacle detectors, and the like.

FIG. 8 is a front view of an upper portion of a cabin according to the first embodiment, illustrating a layout of an antenna unit, a monitoring camera, and the like.

FIG. 9 is a rear view of the upper portion of the cabin according to the first embodiment, illustrating the layout of the antenna unit, the monitoring camera, and the like.

FIG. 10 is a left side view of the upper portion of the cabin according to the first embodiment, illustrating the layout of the antenna unit, the monitoring camera, and the like.

FIG. 19 is a left side view of a tractor according to a second embodiment, illustrating a layout of obstacle searchers and obstacle detectors, and the like.

FIG. 20 is a top view of the tractor according to the second embodiment, illustrating the layout of the obstacle searchers and the obstacle detectors, and the like.

FIG. 21 is a perspective view of the tractor according to the second embodiment, illustrating the layout of the obstacle searchers and the obstacle detectors, and the like.

FIG. 26 is a left side view of a tractor according to a third embodiment, illustrating a layout of obstacle detectors, and the like.

FIG. 27 is a plan view of the tractor according to the third embodiment, illustrating the layout of the obstacle detectors, and the like.

FIG. 28 is a perspective view of a main portion according to the third embodiment, illustrating a frame structure of a cabin, a structure for mounting the obstacle detectors, and the like.

FIG. 29 is a rear view of an upper portion of the cabin according to the third embodiment, illustrating a structure for mounting a laser scanner in a rear portion of the vehicle body, and the like.

FIG. 30 is a schematic left side view of the tractor according to the third embodiment, illustrating a detection-target area of the obstacle detectors, and the like.

FIG. 31 is a schematic plan view of the tractor according to the third embodiment, illustrating detection-target areas of the obstacle detectors, and the like.

FIG. 32 is a substantially front view of the tractor according to the third embodiment, illustrating a detection-target area of the obstacle detectors, and the like.

EMBODIMENTS OF THE INVENTION

First Embodiment

The following describes, as an example of a mode for carrying out the present invention, a first embodiment in which the present invention is applied to a tractor, which is an example of a work vehicle, with reference to the drawings.

Figure 1:
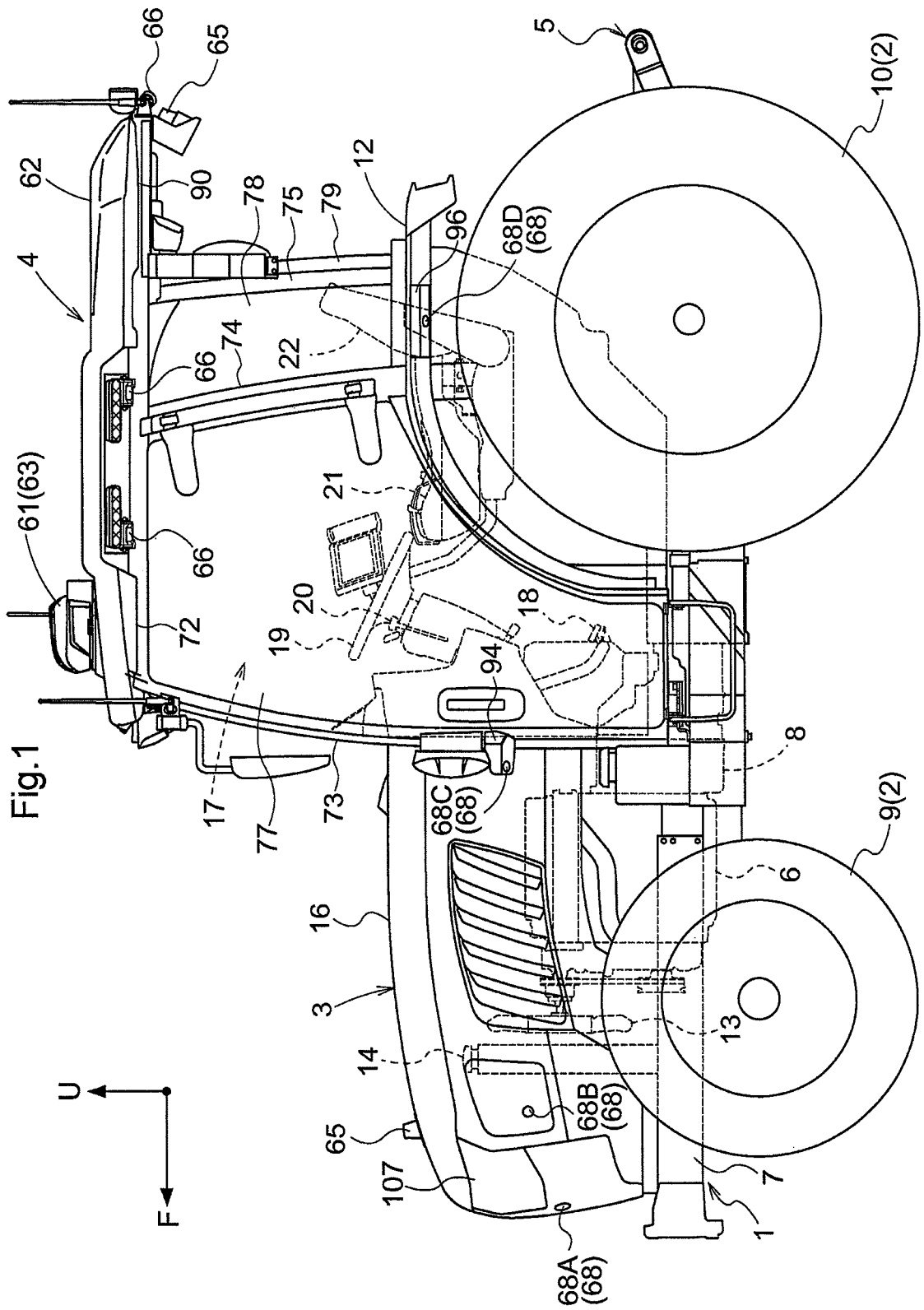

Note that an arrow with a reference mark F in FIG. 1 indicates the front side of the tractor, and an arrow with a reference mark U indicates the upper side of the tractor.

Figure 2:
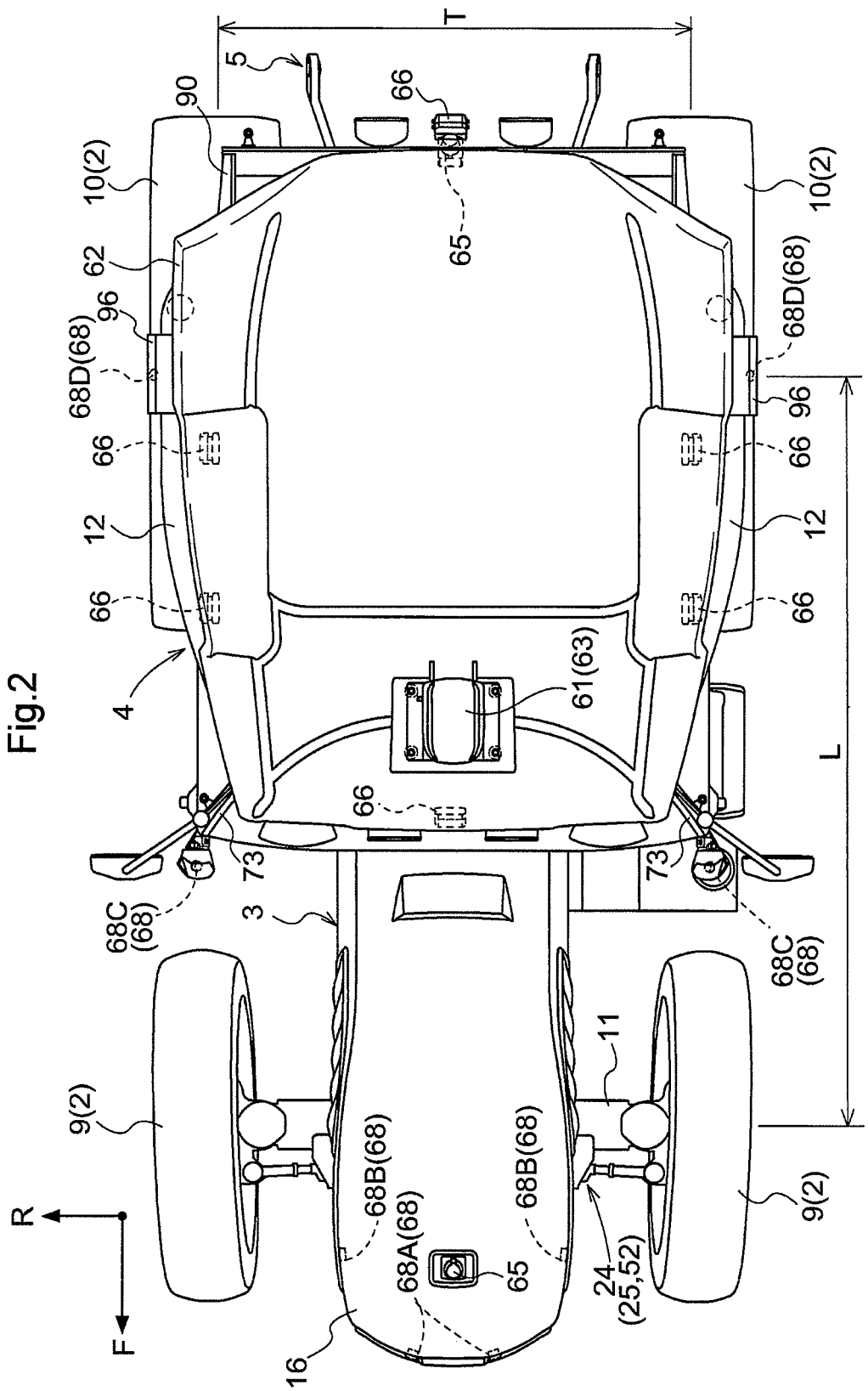

Furthermore, an arrow with a reference mark F in FIG. 2 indicates the front side of the tractor, and an arrow with a reference mark R indicates the right side of the tractor.

Figure 3:
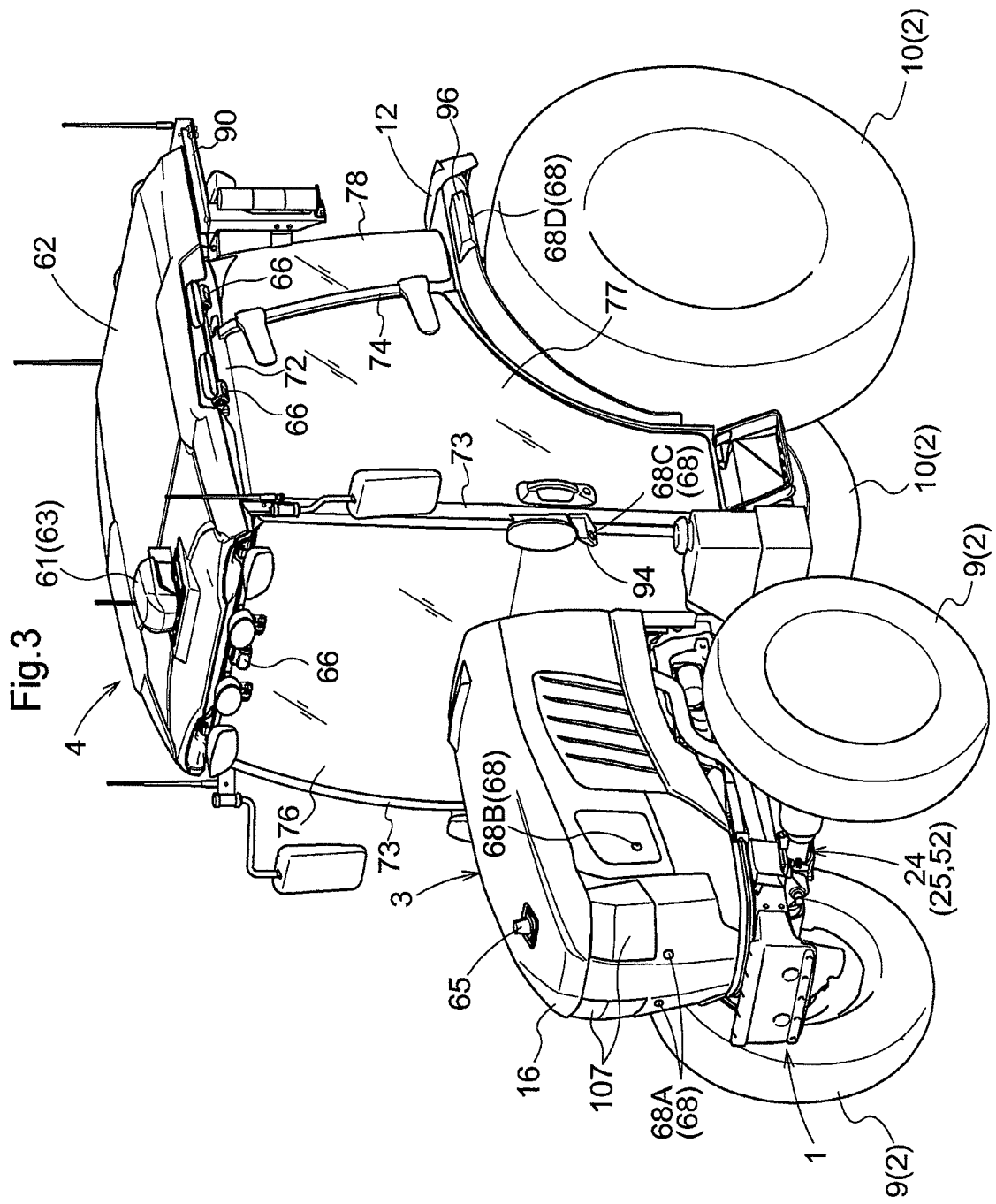

As shown in FIGS. 1 to 3, the tractor illustrated as an example of the present embodiment include: a vehicle body frame 1 that spans between the front and rear ends of the vehicle body; travel apparatuses 2; a prime mover part 3, a cabin 4; and a three-point linkage mechanism 5 that is used to couple a work implement apparatus thereto. The travel apparatuses 2 are respectively provided on the right and left of the vehicle body frame 1. The prime mover part 3 is located at a front portion of the vehicle body frame 1. The cabin 4 is located at a rear portion of the vehicle body frame 1. The three-point linkage mechanism 5 is attached to a rear end portion of the vehicle body frame 1 to be moved up and down.

As shown in FIGS. 1 to 5, the vehicle body frame 1 includes a front frame 7, a case unit 8 that also serves as a rear frame, and the like. The front frame 7 extends from a position below an engine 6 located in the prime mover part 3, to the front side of the vehicle body. Also, the case unit 8 extends from a position below the rear end of the engine 6 to the rear side of the vehicle body. Although not shown in the drawings, the case unit 8 houses: a pedal-operation type main clutch; a speed change power transmission unit; and a pair of right and left side brakes. The main clutch connects or disconnects power from the engine 6. The speed change power transmission unit splits power transmitted via the main clutch into travel power and work power, and performs speed change. The side brakes act on the right and left travel apparatuses 2.

The right and left travel apparatuses 2 include right and left front wheels 9 that function as drivable and steering wheels, and right and left rear wheels 10 that function as driving wheels. The right and left front wheels 9 are supported at the right and left ends of a wheel support member 11 that is rollingly supported by the front frame 7, so as to be drivable in a steerable state. The wheel support member 11 is a front wheel shaft case that houses, for example, a power transmission shaft 11A for driving the front wheels. The right and left rear wheels 10 are drivably supported by the case unit 8, and upper portions of the rear wheels 10 are covered by right and left rear fenders 12 located in the rear portion of the vehicle body.

The prime mover part 3 includes: the engine 6 of a water-cooled type; a cooling fan 13; a radiator 14; a battery 15; an exhaust processing apparatus (not shown); an air cleaner (not shown); and a hood 16 that is pivotally opened and closed. The engine 6 is located in a rear portion of the prime mover part 3 relative to the vehicle body, which is a downstream side in a cooling direction of the prime mover part 3. The cooling fan 13 is located in a front portion of the vehicle body, which is the upstream side relative to the engine 6 in the cooling direction. The radiator 14 is located forward of the cooling fan 13 in the vehicle body. The battery 15 is located forward of the radiator 14 in the vehicle body. The exhaust processing apparatus is located above a rear portion of the engine 6. The air cleaner is located above a front portion of the engine 6. The hood 16 is configured to be pivotally opened and closed, and covers the engine 6, the radiator 14, etc. from above. An electronic control type diesel engine that is provided with a common rail system is employed as the engine 6. A DOC (Diesel Oxidation Catalyst), a DPF (Diesel Particulate Filter), etc. are provided in the exhaust processing apparatus.

As show in FIGS. 1 to 4, and 6, the cabin 4 includes a driver part 17 and a boarding space in a rear portion of the vehicle body. The driver part 17 includes: a clutch pedal 18; a pair of right and left brake pedals 49; a steering wheel 19 for manual steering; a shuttle lever 20 for switching to forward travel and rearward travel; a driver's seat 22; and a display unit 23. The clutch pedal 18 enables operation of the main clutch. The brake pedals 49 enable operation of the right and left side brakes. The steering wheel 19 enables manual steering of the right and left front wheels 9. The driver's seat 22 has an armrest 21 for the right arm. The display unit 23 includes, for example, a liquid crystal panel 23A that accepts touch operations. The steering wheel 19 is linked to the right and left front wheels 9 via a steering mechanism 25, and the steering mechanism 25 includes a full hydraulic type power steering unit 24. The armrest 21 is provided with a main shift lever 26 (see FIG. 7), an up/down lever 27 (see FIG. 7) for setting the height position of a work implement apparatus W (see FIGS. 23 and 24), and an up/down switch 28 (see FIG. 7) for making an instruction to move the work implement apparatus W up and down.

Figure 7:
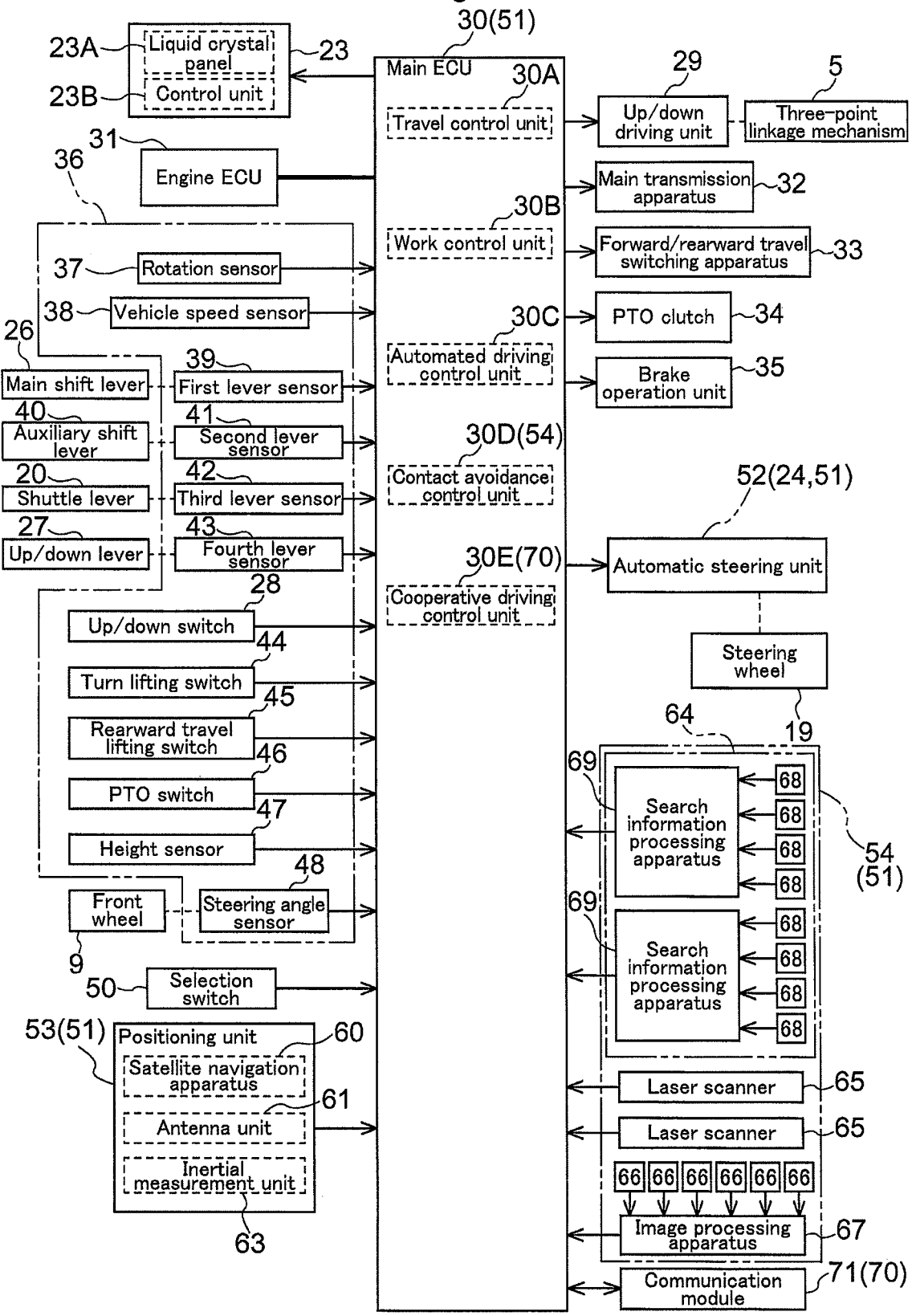
FIG. 7 is a block diagram illustrating a schematic configuration of a control[4] system according to the first embodiment.
Figure 8:
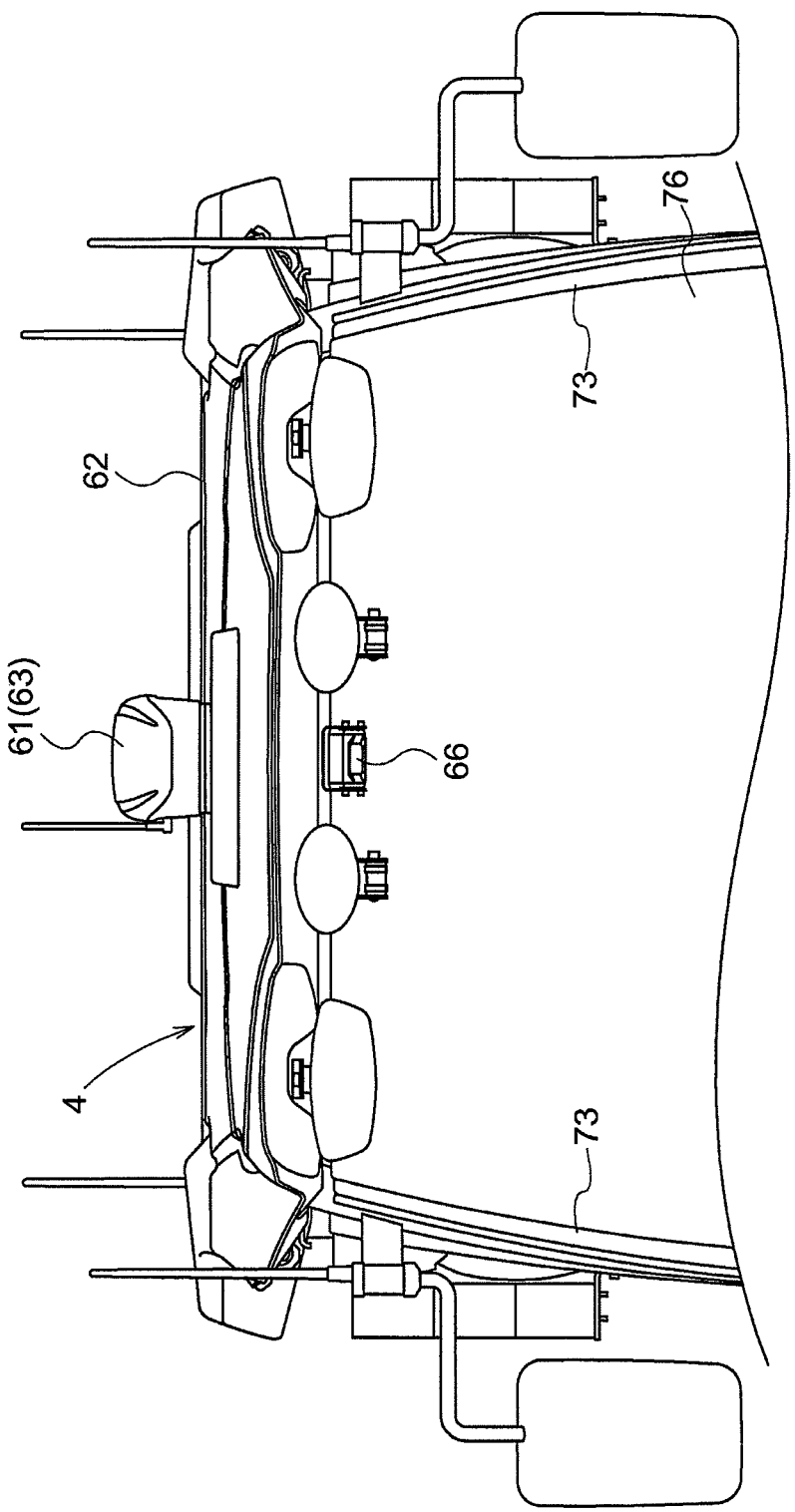
Figure 9:
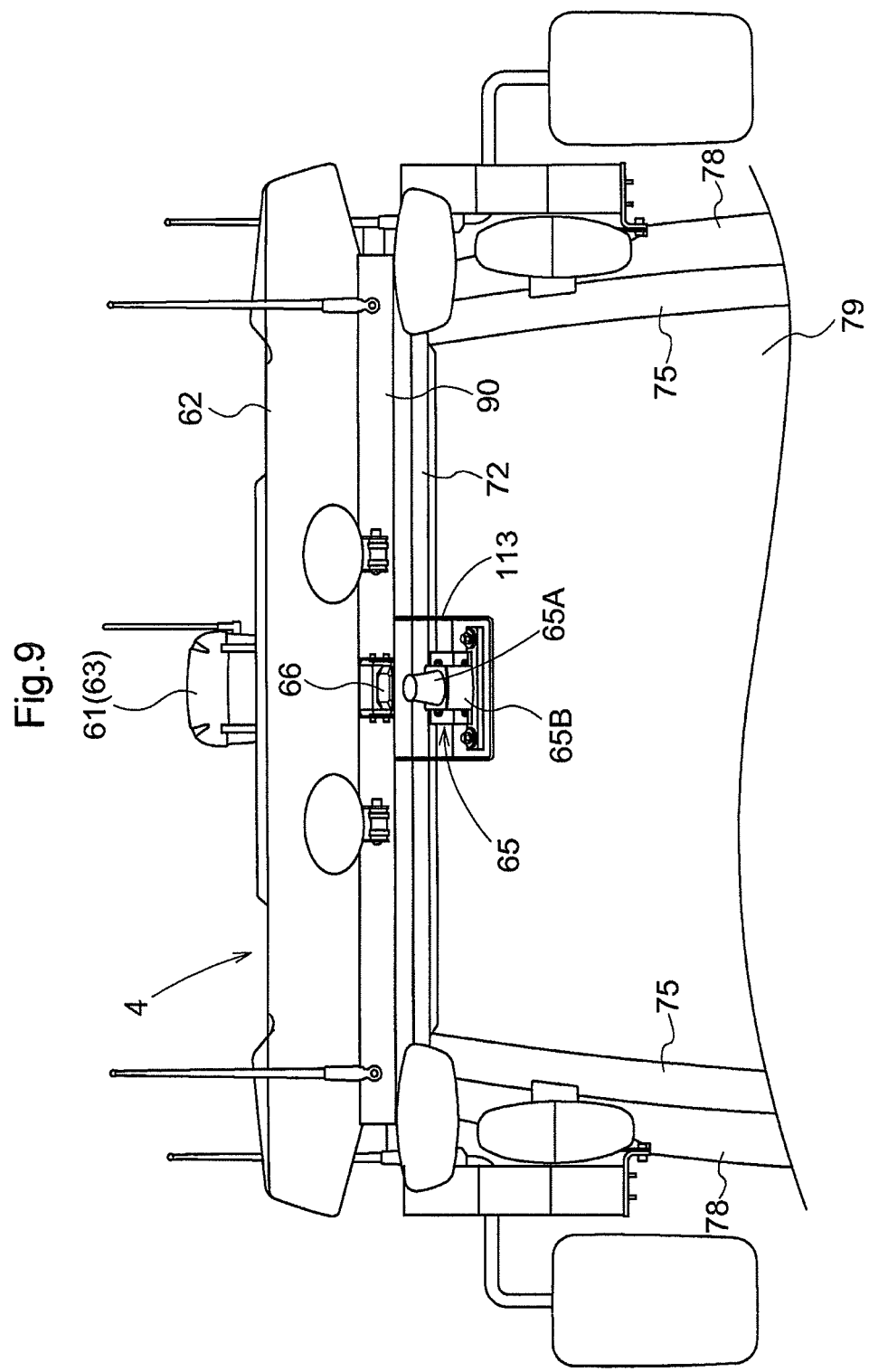
Figure 10:
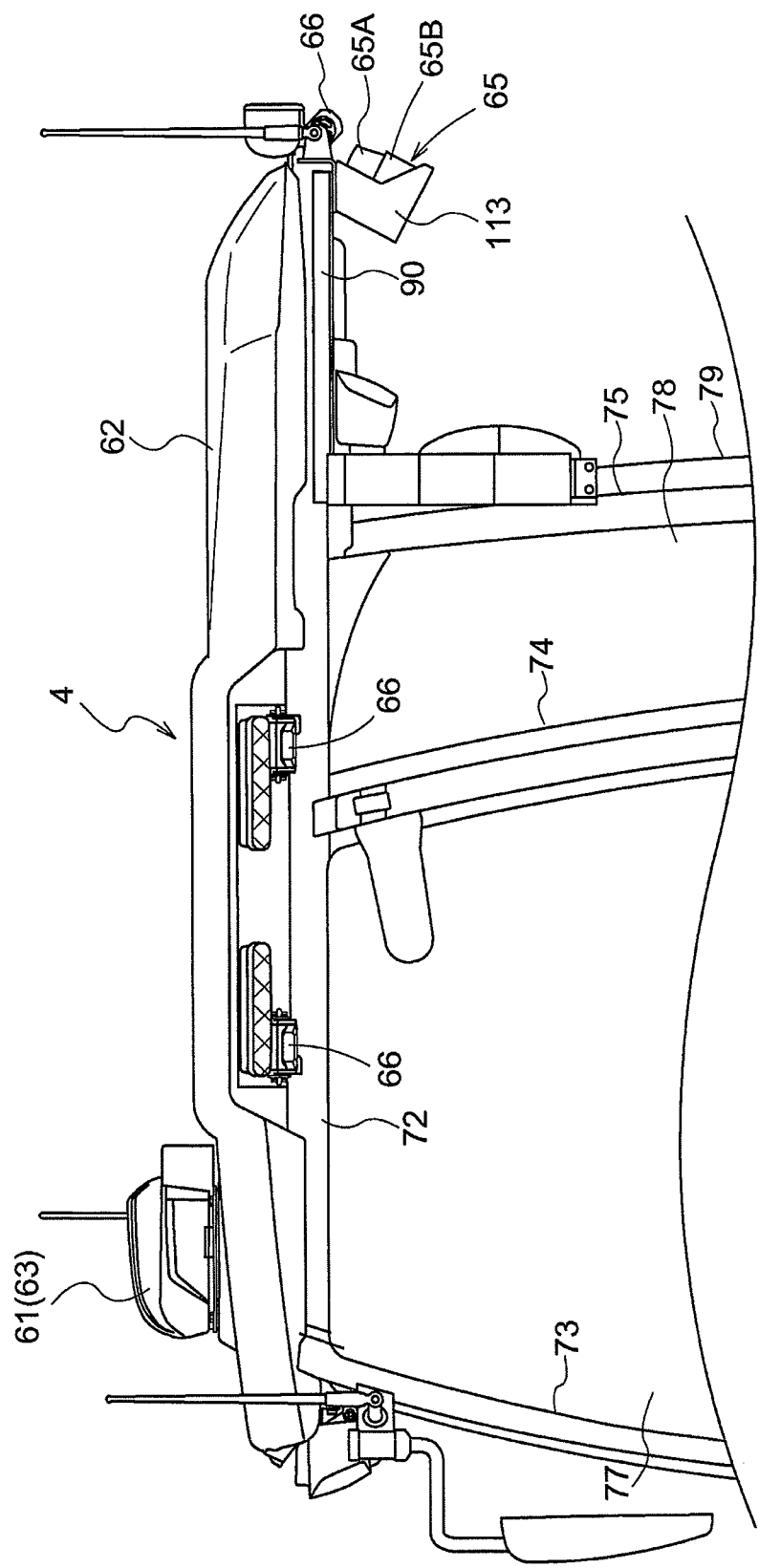
Figure 11:
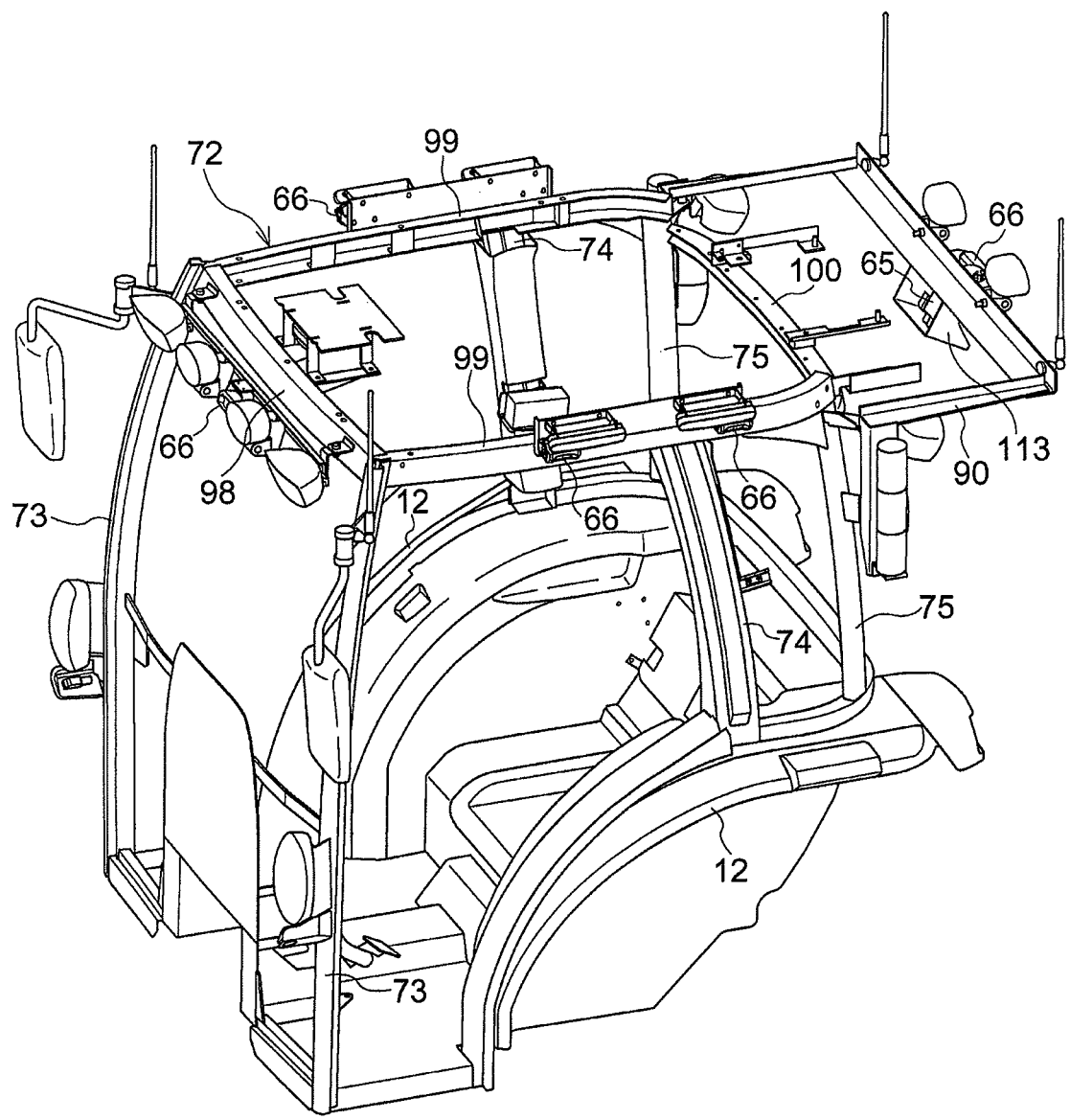
FIG. 11 is a perspective view of the main portion that shows a frame structure of the cabin, according to the first embodiment.
Figure 12:
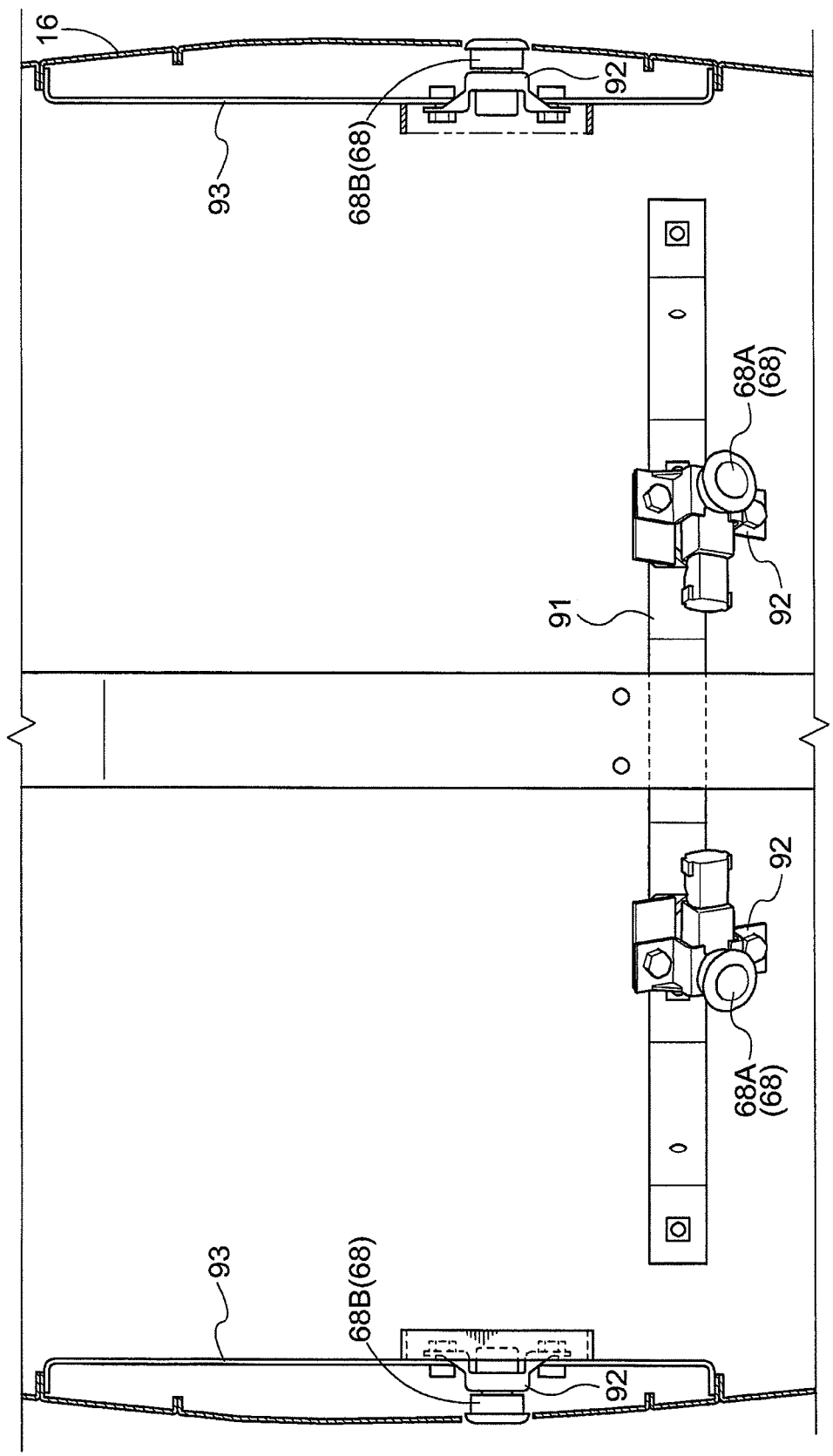
FIG. 12 is a front view in vertical section of the main portion that shows a structure for mounting a first range sensor and a second range sensor, according to the first embodiment.
Figure 13:
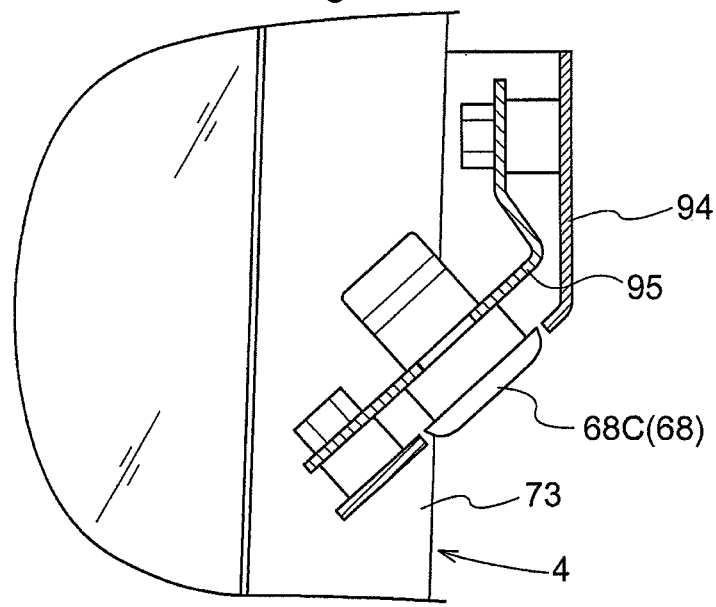
FIG. 13 is a front view in vertical section of the main portion that shows a structure for mounting a third range sensor, according to the first embodiment.
Figure 14:
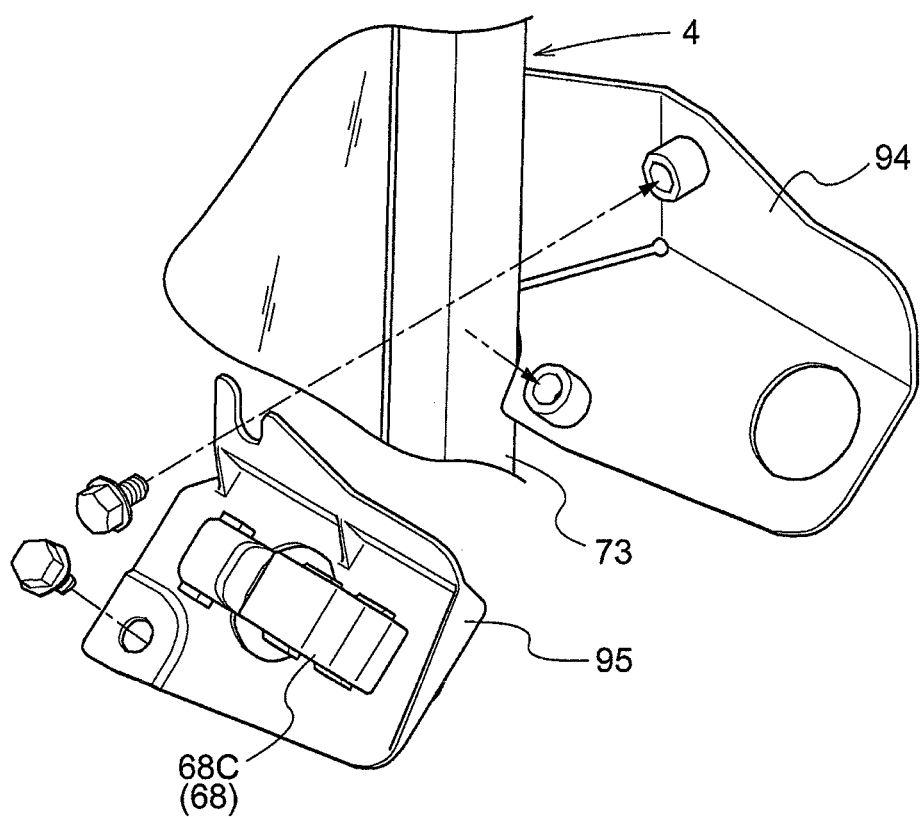
FIG. 14 is an exploded perspective view of the main portion that shows the structure for mounting the third range sensor, according to the first embodiment.
Figure 15:
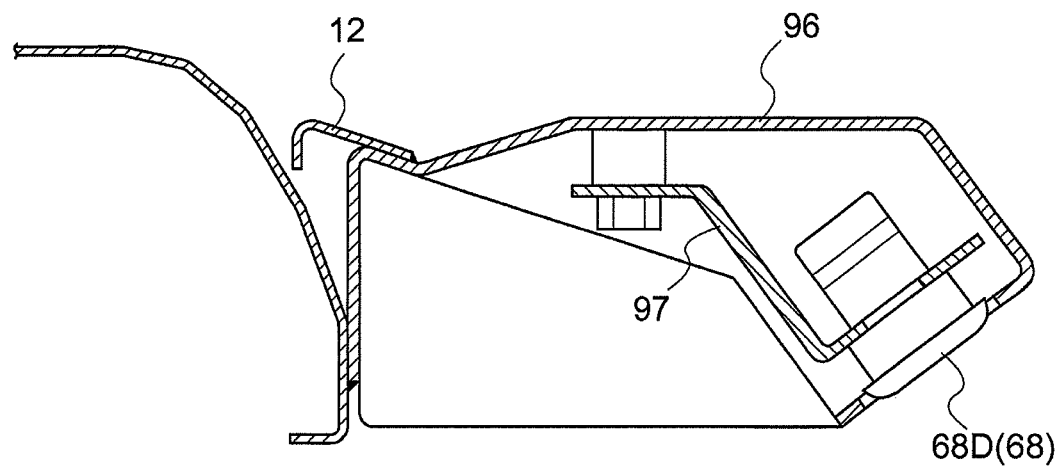
FIG. 15 is a front view in vertical section of the main portion that shows a structure for mounting a fourth range sensor, according to the first embodiment.
Figure 16:
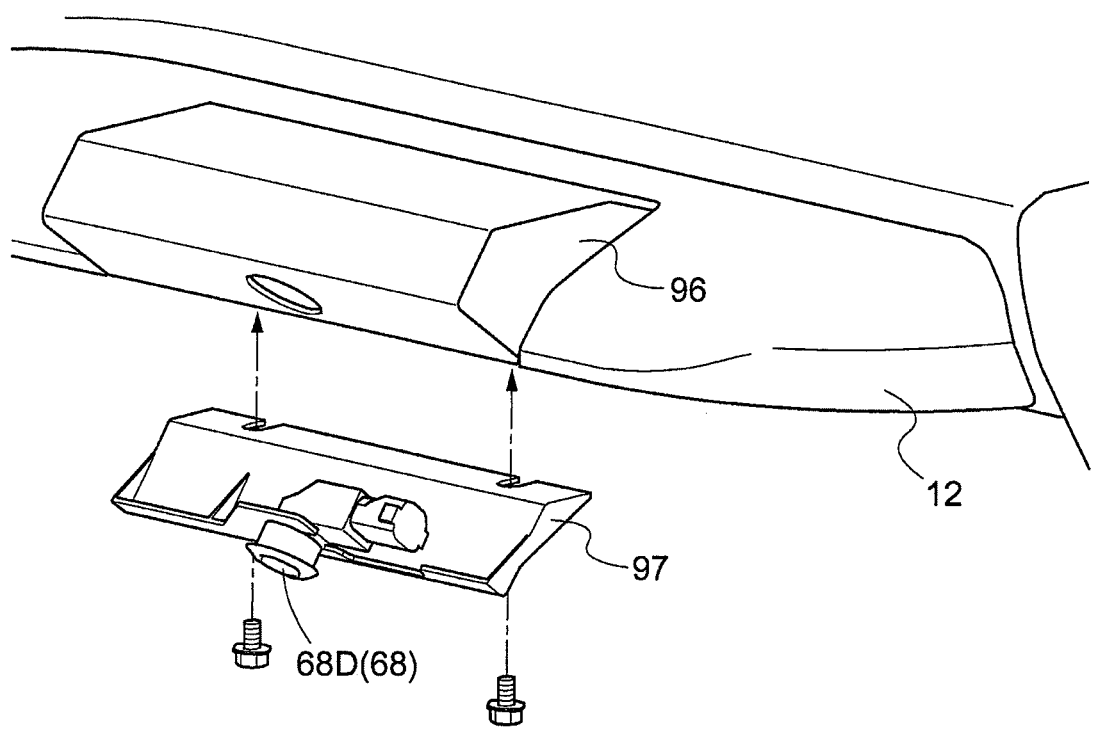
FIG. 16 is an exploded perspective view of the main portion that shows the structure for mounting the fourth range sensor, according to the first embodiment.

As shown in FIG. 7, the three-point linkage mechanism 5 is driven to be moved up and down under an action made by an electronic hydraulic control type up/down driving unit 29 provided in the vehicle body. Although not shown in the drawings, a work implement apparatus W such as a rotary cultivating apparatus, a plow, a disc harrow, a cultivator, a subsoiler, a sowing apparatus, and a spraying apparatus can be coupled to the three-point linkage mechanism 5. If the work implement apparatus W coupled to the three-point linkage mechanism 5 is a rotary cultivating apparatus or the like that is driven by power from the vehicle body, work power taken from the speed change unit is transmitted thereto via an external power transmission shaft.

A main ECU 30, which is a main electronic control unit, is mounted on the vehicle body, and the main ECU 30 includes a travel control unit 30A that performs control regarding travel of the vehicle body, a work control unit 30B that performs control regarding the work implement apparatus, and the like. The main ECU 30 is connected to the above-described electronic hydraulic control type up/down driving unit 29, an engine ECU 31, which is an electronic control unit for the engine, an electronic control type main transmission apparatus 32, a forward/rearward travel switching apparatus 33, a PTO clutch 34, an electronic hydraulic type brake operation unit 35, an in-vehicle information acquisition unit 36, and so on, so as to be able to communicate with them via an in-vehicle LAN such as a CAN (Controller Area Network) or a communication line. The main transmission apparatus 32, the forward/rearward travel switching apparatus 33, and the PTO clutch 34 are provided in the speed change power transmission unit. The brake operation unit 35 enables automatic operation of the right and left side brakes.

The in-vehicle information acquisition unit 36 acquires in-vehicle information including the vehicle speed. The main ECU 30 and the engine ECU 31 include a microprocessor that includes a CPU, an EEPROM, and the like. The travel control unit 30A includes, for example, various control programs that realize control regarding the travel of the vehicle body. The work control unit 30B includes, for example, various control programs that realizes control regarding the work implement apparatus W.

A hydrostatic continuously variable transmission apparatus that performs stepless transmission of travel power is employed as the main transmission apparatus 32. The forward/rearward travel switching apparatus 33 also serves as a travel clutch that connects or disconnects travel power. Although not shown in the drawings, the speed change power transmission unit includes, in addition to the main transmission apparatus 32 and the like, an auxiliary transmission apparatus that performs stepwise transmission of travel power, a PTO transmission apparatus that performs stepwise transmission of work power, and so on.

The in-vehicle information acquisition unit 36 includes various sensors such as a rotation sensor 37, a vehicle speed sensor 38, a first lever sensor 39, a second lever sensor 41, a third lever sensor 42, and a fourth lever sensor 43. Also, the in-vehicle information acquisition unit 36 includes various switches such as the above-described up/down switch 28, a turn lifting switch 44, a rearward travel lifting switch 45, a PTO switch 46, a height sensor 47, and a steering angle sensor 48. The rotation sensor 37 detects the output speed of the engine 6. The vehicle speed sensor 38 detects the output speed of the auxiliary transmission apparatus as the vehicle speed. The first lever sensor 39 detects the operation position of the main shift lever 26. The second lever sensor 41 detects the operation position of an auxiliary shift lever 40 that is provided in the driver part 17. The third lever sensor 42 detects the operation position of the shuttle lever 20. The fourth lever sensor 43 detects the operation position of the up/down lever 27. The turn lifting switch 44, the rearward travel lifting switch 45, and the PTO switch 46 are included in the driver part 17. The height sensor 47 detects the angle of up/down swing of right and left lift arms (not shown) of the up/down driving unit 29 as the height position of the work implement apparatus W. The steering angle senior 48 detects a steering angle of the front wheels 9.

The travel control unit 30A performs vehicle speed control to operate a trunnion shaft (not shown) of the main transmission apparatus 32 based on the output from the rotation sensor 37, the output from the vehicle speed sensor 38, the output from the first lever sensor 39, and the output from the second lever sensor 41, such that the vehicle speed reaches a control target vehicle speed obtained based on the engine speed, the operation position of the main shift lever 26, and operation position of the auxiliary shift lever 40. Thus, the driver can change the vehicle speed to any vehicle speed by operating the main shift lever 26 to a certain operation position.

The travel control unit 30A performs forward/rearward travel switching control to switch the forward/rearward travel switching apparatus 33 to the power transmission state that corresponds to the operation position of the shuttle lever 20, based on the output from the third lever sensor 42. Thus, the driver can set the travel direction of the vehicle body to the forward direction by operating the shuttle lever 20 to a forward travel position. Also, the driver can set the travel direction of the vehicle body to the rearward direction by operating the shuttle lever 20 to a rearward travel position.

The work control unit 30B performs position control to control the action of the up/down driving unit 29 based on the output from the fourth lever sensor 43 and the output from the height sensor 47, such that the work implement apparatus W is located at the height position that corresponds to the operation position of the up/down lever 27. Thus, the driver can change the height position of the work implement apparatus W to any height position, by operate the up/down lever 27 to a certain operation position.

Upon the up/down switch 28 being switched to a lifting instruction state in response to the up/down switch 28 being manually operated, the work control unit 30B performs lifting control to control the action of the up/down driving unit 29 based on a lifting instruction from the up/down switch 28 and the output from the height sensor 47, such that the work implement apparatus W is lifted to an upper limit position that has been determined in advance. Thus, the driver can make the work implement apparatus W be automatically lifted to the upper limit position by switching the up/down switch 28 to the lifting instruction state.

Upon the up/down switch 28 being switched to a lowering instruction state in response to the up/down switch 28 being manually operated, the work control unit 30B performs lowering control to control the action of the up/down driving unit 29 based on a lowering instruction from the up/down switch 28, the output from the fourth lever sensor 43, and the output from the height sensor 47, such that the work implement apparatus W is lowered to a work height position that has been set using the up/down lever 27. Thus, the driver can make the work implement apparatus W be automatically lowered to the work height position by switching the up/down switch 28 to the lowering instruction state.

When execution of turn-conjunctive lifting control is selected in response to the turn lifting switch 44 being manually operated, the work control unit 30B automatically performs the above-described lifting control upon detecting that the steering angle of the front wheels 9 has reached a set angle for ridge edge turn based on the output from the steering angle sensor 48 that detects the steering angle of the front wheels 9. Thus, by selecting execution of turn-conjunctive lifting control in advance, the driver can make the work implement apparatus W be automatically lifted to the upper limit position in conjunction with the start of a ridge edge turn.

When execution of rearward travel-conjunctive lifting control is selected in response to the rearward travel lifting switch 45 being manually operated, the work control unit 30B automatically performs the above-described lifting control upon detecting that the shuttle lever 20 has been manually operated to the rearward travel position based on the output from the third lever sensor 42. Thus, by selecting execution of rearward travel-conjunctive lifting control in advance, the driver can make the work implement apparatus W be automatically lifted to the upper limit position in conjunction with switching to rearward travel.

Upon the PTO switch 46 being manually operated and the operation position of the PTO switch 46 being switched to an ON position, the work control unit 30B performs clutch ON control to switch the PTO clutch 34 to an ON state based on the switching of the PTO switch 46 to the ON position so that work power is transmitted to the work implement apparatus W. Thus, the driver can activate the work implement apparatus W by operating the PTO switch 46 to the ON position.

Upon the PTO switch 46 being manually operated and the operation position of the PTO switch 46 being switched to an OFF position, the work control unit 30B performs clutch OFF control to switch the PTO clutch 34 to an OFF state based on the switching of the PTO switch 46 to the OFF position, so that work power is not transmitted to the work implement apparatus W. Thus, the driver can stop the work implement apparatus W by operating the PTO switch 46 to the OFF position.

Upon the PTO switch 46 being manually operated and the operation position of the PTO switch 46 being switched to an automatic position, the work control unit 30B automatically performs the above-described clutch OFF control in conjunction with execution of the above-described lifting control, and automatically performs the above-described clutch ON control in conjunction with execution of the above-described lowering control. Thus, by operating the PTO switch 46 to the automatic position in advance, the driver can stop the work implement apparatus W in conjunction with the automatic lifting of the work implement apparatus W to the upper limit position, or activate the work implement apparatus W in conjunction with the automatic lowering of the work implement apparatus W to the work height position.

As shown in FIGS. 1 to 5, and 7, a selection switch 50, and an electronic control system 51 for automated driving are provided in the tractor. The selection switch 50 enables the driver to select a manual driving mode, an automated driving mode, and the like, as a driving mode. The electronic control system 51 automatically drives the vehicle body when the automated driving mode is selected. The electronic control system 51 includes the above-described main ECU 30, an automatic steering unit 52, a positioning unit 53, a monitoring unit 54, and so on. The automatic steering unit 52 realizes automatic steering of the right and left front wheels 9. The positioning unit 53 measures the position and orientation of the vehicle body. The monitoring unit 54 monitors the surroundings of the vehicle body.

As shown in FIGS. 2 to 4, and 7, the automatic steering unit 52 is constituted by the above-described power steering unit 24. When the manual driving mode is selected, the power steering unit 24 steers the right and left front wheels 9 based on an operation to rotate the steering wheel 19. Also, when the automated driving mode is selected, the power steering unit 24 steers the right and left front wheels 9 based on a control instruction from the main ECU 30.

That is to say, it is possible to automatically steer the right and left front wheels 9 without providing a steering unit that is dedicated to automatic steering. Also, if a failure occurs in the electrical system of the power steering unit 24, an onboard person can easily switch to manual steering, and continue driving the vehicle body.

As shown in FIGS. 1 to 3, and 7 to 10, the positioning unit 53 includes a satellite navigation apparatus 60 that measures the position and orientation of the vehicle body using a well-known GPS (Global Positioning System), which is an example of a GNSS (Global Navigation Satellite System). Positioning methods using a GPS include a DGPS (Differential GPS) method and an RTK-GPS (Real Time Kinematic GPS) method, for example. In the first embodiment, an RTK-GPS method, which is suitable for positioning a moving object, is employed.

The satellite navigation apparatus 60 includes a satellite navigation antenna unit 61 that receives radio waves transmitted from a GPS satellite (not shown) and positioning data transmitted from a reference station (not shown) located at a known position. The reference station transmits positioning data obtained by receiving radio waves from the GPS satellite, to the satellite navigation apparatus 60. The satellite navigation apparatus 60 obtains the position and orientation of the vehicle body based on positioning data obtained by receiving radio waves from the GPS satellite, and positioning data from the reference station.

The antenna unit 61 is attached to a roof 62 of the cabin 4, which is located at the top of the vehicle body, so as to increase sensitivity when receiving radio waves from a GPS satellite. Therefore, the position and orientation of the vehicle body measured using the GPS include positioning errors due to displacement of the antenna unit 61 resulting from yawing, pitching, or rolling of the vehicle body.

Accordingly, the vehicle body is provided with an IMU 63 (Inertial Measurement Unit) that includes a three-axis gyroscope (not shown) and a three-direction acceleration sensor (not shown), and measures the yaw angle, the pitch angle, and the roll angle of the vehicle body, and the like, so that correction can be performed to remove the above-described positioning errors. The IMU 63 is provided inside the antenna unit 61 so that the amount of displacement of the above-described antenna unit 61 can be easily obtained. The antenna unit 61 is attached to a right/left intermediate portion of the upper surface of a front portion of the roof 62 of the cabin 4 such that the antenna unit 61 is located at a central portion of a tread T and a central portion of a wheelbase L of the vehicle body in a plan view (see FIG. 2).

With the above-described configuration, at least in a plan view, the position at which the IMU 63 is attached is close to the position of the center of gravity of the vehicle body. As a result, it is possible to easily perform calculation for correcting the yaw angle and the like measured by the IMU 63, based on the amount of displacement of the IMU 63 from the position of the center of gravity of the vehicle body, and thus it is possible to promptly and correctly correct the result of measurement performed by the IMU 63. In other words, the IMU 63 can promptly and accurately measure the yaw angle and the like of the vehicle body.

When the satellite navigation apparatus 60 measures the position and orientation of the vehicle body, if the antenna unit 61 is displaced due to yawing, pitching, or rolling of the vehicle body, it is possible to promptly and accurately obtain the amount of displacement of the antenna unit 61 in this case, based on, for example, the yaw angle, pitch angle, and roll angle of the vehicle body measured by the IMU 63. Then, even if positioning errors resulting from displacement of the antenna unit 61 are included in the position and orientation of the vehicle body measured by the satellite navigation apparatus 60, it is possible to promptly and accurately obtain the positioning errors based on the amount of displacement of the antenna unit 61 that can be obtained from the result of measurement performed by the IMU 63. Thus, it is possible to promptly and appropriately perform correction to remove the positioning errors from the result of measurement performed by the satellite navigation apparatus 60.

As a result, it is possible to easily, promptly, and accurately measure the position and orientation of the vehicle body using the GNSS.

As shown in FIG. 7, the main ECU 30 includes an automated driving control unit 30C that includes, for example, various control programs that realize automated driving of the vehicle body. The automated driving control unit 30C transmits various control instructions to the travel control unit 30A, the work control unit 30B, and the like at appropriate points in time so that the vehicle body automatically travels along a preset target travel path on a farm field at a set speed while appropriately performing work, based on, for example, the target travel path and the result of positioning performed by the positioning unit 53. The travel control unit 30A controls the operations of the main transmission apparatus 32, the forward/rearward travel switching apparatus 33, and so on by transmitting various control instructions to the main transmission apparatus 32, the forward/rearward travel switching apparatus 33, and so on at appropriate points in time, based on various control instructions from the automated driving control unit 30C, various types of information acquired by the in-vehicle information acquisition unit 36, and so on. The work control unit 30B controls the operations of the up/down driving unit 29, the PTO clutch 34, and so on by transmitting various control instructions to the up/down driving unit 29, the PTO clutch 34, and so on at appropriate points in time, based on various control instructions from the automated driving control unit 30C, various types of information acquired by the in-vehicle information acquisition unit 36, and so on.

The target travel path may be obtained by converting, into data, a travel path along which the vehicle travelled during work travel while being manually driven in a farm field, the start point of a ridge edge turn, and so on, based on the result of positioning performed by the positioning unit 53, for example. Alternatively, the target travel path may be obtained by converting, into data, a travel path along which the vehicle travelled during teaching travel while being manually driven in a farm field, the start point of a ridge edge turn, and so on, based on the result of positioning performed by the positioning unit 53, for example.

As shown in FIGS. 1 to 5, and 7 to 10, the monitoring unit 54 includes: an obstacle detection module 64 that detects the presence or absence of an obstacle within an immediate range (e.g. within 1 m) of the vehicle body; front and rear obstacle detectors 65 that detect an approaching obstacle within a short range (e.g. within 10 m) of the vehicle body; a contact avoidance control unit 30D that performs contact avoidance control to avoid coming into contact with an obstacle; six monitoring cameras 66 that capture images of the surroundings of the vehicle body; an image processing apparatus 67 that processes images captured by the monitoring cameras 66; and the like.

The obstacle detection module 64 includes: eight obstacle searchers 68 that each search for an obstacle within the immediate range of the vehicle body; and two search information processing apparatuses 69 that perform processing for determining whether or not an obstacle has approached and entered the immediate range of the vehicle body, based on search information acquired from the obstacle searchers 68.

Each obstacle searcher 68 employs, as an example of a range sensor, a sonar device that uses ultrasonic waves to measure a distance. The eight obstacle searchers 68 are distributed on the front end portion and the right and left end portions of the vehicle body such that the front side and the right and left sides of the vehicle body are search-target areas. Each obstacle searcher 68 transmits search information obtained by performing a search to the corresponding search information processing apparatus 69.

Each search information processing apparatus 69 performs determination processing to determine whether or not an obstacle has approached and entered the immediate range of the vehicle body, based on the period of time from transmission to reception of an ultrasonic wave from the corresponding obstacle searcher 68, and outputs the result of determination to the contact avoidance control unit 30D.

As a result, when an obstacle has unexpectedly approached and entered the immediate range of the vehicle body from the front side or the right or left sides of the vehicle body during automated driving, the obstacle detection module 64 detects the approaching obstacle. Also, no obstacle searcher 68 is provided in a rear end portion of the vehicle body, and thus the obstacle detection module 64 is prevented from misdetecting the work implement apparatus W (see FIGS. 23 and 24) attached to the rear portion of the vehicle body so as to be able to move up and down, as an obstacle.

For example, when the vehicle body is traveling toward a ridge during automated driving, or when the vehicle body is traveling along a ridge at a ridge edge during automated driving, if the ridge has unexpectedly approached and entered the immediate range of the vehicle body, the obstacle detection module 64 detects the ridge as an obstacle. Also, if a moving object has unexpectedly approached and entered the immediate range of the vehicle body, the obstacle detection module 64 detects the moving object as an obstacle.

Each obstacle detector 65 employs a laser scanner that has a detection angle of about 270 degrees. Each obstacle detector 65 includes a detection unit 65A that performs detection of an obstacle, and a processing unit 65B that processes detection information from the detection unit 65A. The detection unit 65A irradiates a detection-target area with a laser beam and receives the reflected light. The processing unit 65B determines, for example, whether or not an obstacle has approached and entered a short range of the vehicle body, based on the period of time from irradiation to reception of the laser beam, and outputs the result of determination to the contact avoidance control unit 30D. An area on the front side of the vehicle body is set to the detection-target area of the front-side obstacle detector 65. An area on the rear side of the vehicle body is set to the detection-target area of the rear-side obstacle detector 65.

The contact avoidance control unit 30D includes, for example, a control program that realizes execution of contact avoidance control, and is provided in the main ECU 30. Upon detecting that an obstacle has approached and entered the short range of the vehicle body based on the result of determination performed by each obstacle detector 65, the contact avoidance control unit 30D starts contact avoidance control in preference to automated driving that is based on control operations performed by the automated driving control unit 30C. Thereafter, the contact avoidance control unit 30D performs the contact avoidance control based on the result of determination performed by each obstacle detector 65 and each search information processing apparatus 69.

In contact avoidance control, the contact avoidance control unit 30D outputs a deceleration instruction to the travel control unit 30A upon contact avoidance control starting. Accordingly, the contact avoidance control unit 30D causes the main transmission apparatus 32 to perform a deceleration operation through a control operation performed by the travel control unit 30A, thereby reducing the vehicle speed from a set speed for normal travel to a set speed for contact avoidance. In this low-speed travel state, if the contact avoidance control unit 30D confirms that an obstacle has approached and entered the immediate range of the vehicle body based on the result of determination performed by any of the search information processing apparatuses 69, the contact avoidance control unit 30D outputs an emergency stop instruction to the travel control unit 30A and the work control unit 30B. As a result, the contact avoidance control unit 30D switches the forward/rearward travel switching apparatus 33 to the neutral state through a control operation performed by the travel control unit 30A, and causes the brake operation unit 35 to activate the right and left brakes, thereby braking the right and left front wheels 9 and the right and left rear wheels 10. Also, the contact avoidance control unit 30D causes the work control unit 30B to switch the PTO clutch 34 to an OFF state, and stop the action of the work implement apparatus W. As a result, it is possible to promptly stop the vehicle body from traveling and stop the work implement apparatus W from operating, based on the fact that an obstacle has approached and entered the immediate range of the vehicle body, and it is possible to avoid the risk that the obstacle comes into contact with the vehicle body. In this low-speed travel state, if the contact avoidance control unit 30D confirms that there is no obstacle within the short range of the vehicle body based on the result of determination performed by each obstacle detector 65, the contact avoidance control unit 30D outputs an acceleration instruction to the travel control unit 30A, and then ends the contact avoidance control. Thus, the contact avoidance control unit 30D causes the transmission apparatus 32 to perform an acceleration operation through a control operation performed by the travel control unit 30A so that the vehicle speed is increased from the set speed for contact avoidance to the set speed for normal travel, and thereafter restarts automated driving that is based on a control operation performed by the automated driving control unit 30C.

As shown in FIGS. 1 to 3, and 7 to 10, a wide-angle CCD camera for visible light is employed in each monitoring camera 66. One of the six monitoring cameras 66 is for capturing an image of objects on the front side of the vehicle body. This monitoring camera 66 is provided at a right/left intermediate portion in a front upper end region of the cabin 4, in an inclined orientation so as to capture forward and downward thereof. Two of the six monitoring cameras 66 are for capturing an image of objects located to the right of the vehicle body. These monitoring cameras 66 are provided at the right upper end portion of the cabin 4 with a predetermined front/rear interval, in an inclined orientation so as to capture an image downward and rightward thereof. Two of the six monitoring cameras 66 are for capturing an image of objects located to the left of the vehicle body. These monitoring cameras 66 are provided at the left upper end portion of the cabin 4 with a predetermined front/rear interval, in an inclined orientation so as to capture an image downward and leftward thereof. One of the six monitoring cameras 66 is for capturing an image of objects located to the rear of the vehicle body. This monitoring camera 66 is provided at a right/left intermediate portion in a rear upper end region of the cabin 4 in rear upper end region of the cabin 4, in an inclined orientation so as to capture rearward and downward thereof. As a result, it is possible to capture images of the entire surroundings of the vehicle body.

Note that only one right-side monitoring camera 66 and only one left-side monitoring camera 66 may be provided at appropriate positions on the right and left end of the upper end portion of the cabin 4.

The image processing apparatus 67 processes video signals from the monitoring cameras 66, generates an image of objects on the front side of the vehicle body, an image of objects on the right side of the vehicle body, an image of objects on the left side of the vehicle body, an image of objects on the rear side of the vehicle body, a bird's eye image seen from right above the vehicle body, and so on, and transmits the images to the display unit 23 and the like. The display unit 23 includes, for example, a control unit 23B that changes an image displayed on the liquid crystal panel 23A, based on, for example, a manual operation made with various operation switches (not shown) displayed on the liquid crystal panel 23A.

With the above-described configuration, during manual driving, displaying images from the image processing apparatus 67 on the liquid crystal panel 23A makes it easier for the driver to visually check the state of the surroundings of the vehicle body and the state of work during operation. Thus, the driver can easily drive the vehicle body in a preferable manner according to the type of work, and so on. Also, during automated driving, when an administrator rides in the vehicle body, displaying images from the image processing apparatus 67 on the liquid crystal panel 23A makes it easier for the administrator to visually check the state of the surroundings of the vehicle body and the state of work during automated driving. If the administrator visually recognizes an abnormality in the surroundings of the vehicle body, the state of work, or the like during automated driving, the administrator can promptly and appropriately address the abnormality according to the type of abnormality, the degree of the abnormality, and so on.

As shown in FIG. 7, the electronic control system 51 includes a cooperation control unit 70. When a cooperative driving mode is selected by manually operating the selection switch 50, the cooperation control unit 70 causes the vehicle body to automatically travel in cooperation with another vehicle that has the same specifications. The cooperation control unit 70 includes a communication module 71 that wirelessly communicates with another vehicle to exchange information regarding cooperative travel with the other vehicle, including information regarding the positions of the vehicle bodies, with each other, and a cooperative driving control unit 30E that performs cooperative driving control based on information from the other vehicle. The cooperative driving control unit 30E includes, for example, a control program that realizes execution of cooperative driving control, and is provided in the main ECU 30.

In the cooperative driving mode, the automated driving control unit 30C transmits various control instructions to the travel control unit 30A, the work control unit 30B, and so on at appropriate points in time so that the vehicle body automatically travels along a preset target travel path for side-by-side travel at a set speed while appropriately performing work, based on, for example, the target travel path for side-by-side travel and the result of positioning performed by the positioning unit 53.

The cooperative driving control unit 30E determines whether or not the distance between the vehicle and another preceding vehicle in the forward travel direction, the distance between the vehicle and the other preceding vehicle in the side-by-side direction, and the like are appropriate, based on the target travel path for side-by-side travel of the vehicle, the result of positioning performed by the positioning unit 53, the target travel path for side-by-side travel of the other vehicle, position information regarding the other vehicle, and so on. If any of the distances between the vehicles is inappropriate, the cooperative driving control unit 30E starts cooperative driving control in preference to automated driving that is based on the control operation made by the automated driving control unit 30C, so that the distance of the vehicles is appropriate.

In cooperative driving control, if the distance between the vehicles in the forward travel direction is shorter than an appropriate distance, the cooperative driving control unit 30E outputs a deceleration instruction to the travel control unit 30A. Thus, the cooperative driving control unit 30E causes the main transmission apparatus 32 to perform a deceleration operation through a control operation performed by the travel control unit 30A, thereby returning the distance between the vehicles in the forward travel direction to the appropriate distance. Upon the distance between the vehicles in the forward travel direction returning to the appropriate distance, the cooperative driving control unit 30E restarts automated driving that is based on a control operation performed by the automated driving control unit 30C, thereby increasing the vehicle speed to the set speed for normal travel and keeping the distance between the vehicles in the forward travel direction at the appropriate distance.

If the distance between the vehicles in the forward travel direction is longer than the appropriate distance, the cooperative driving control unit 30E outputs an acceleration instruction to the travel control unit 30A. Thus, the cooperative driving control unit 30E causes the main transmission apparatus 32 to perform an acceleration operation through a control operation performed by the travel control unit 30A, thereby returning the distance between the vehicles in the forward travel direction to the appropriate distance. Upon the distance between the vehicles in the forward travel direction returning to the appropriate distance, the cooperative driving control unit 30E restarts automated driving that is based on a control operation performed by the automated driving control unit 30C, thereby decreasing the vehicle speed to the set speed for normal travel and keeping the distance between the vehicles in the forward travel direction at the appropriate distance.

If the distance between the vehicles in the side-by-side direction is longer than the appropriate distance, the cooperative driving control unit 30E outputs a steering instruction to the travel control unit 30A to travel toward the other vehicle. Thus, the cooperative driving control unit 30E causes the right and left front wheels 9 to steer toward the other vehicle through a control operation performed by the travel control unit 30A, thereby returning the distance between the vehicles in the side-by-side direction to the appropriate distance. Upon the distance between the vehicles in the side-by-side direction returning to the appropriate distance, the cooperative driving control unit 30E restarts automatic driving that is based on a control operation performed by the automated driving control unit 30C, thereby returning the travel direction of the vehicle body to the travel direction for normal travel and keeping the distance between the vehicles in the side-by-side direction at the appropriate distance.

If the distance between the vehicles in the side-by-side direction is shorter than the appropriate distance, the cooperative driving control unit 30E outputs a steering instruction to the travel control unit 30A to travel away from the other vehicle. Thus, the cooperative driving control unit 30E causes the right and left front wheels 9 to steer away from the other vehicle through a control operation performed by the travel control unit 30A, thereby returning the distance between the vehicles in the side-by-side direction to the appropriate distance. Upon the distance between the vehicles in the side-by-side direction returning to the appropriate distance, the cooperative driving control unit 30E restarts automatic driving that is based on a control operation performed by the automated driving control unit 30C, thereby returning the travel direction of the vehicle body to the travel direction for normal travel and keeping the distance between the vehicles in the side-by-side direction at the appropriate distance.

Thus, it is possible to automatically and appropriately drive the vehicle so as to perform side-by-side travel with another preceding vehicle while appropriately keeping the distance between the vehicles in the forward travel direction and the distance between the vehicles in the side-by-side direction.

As shown in FIGS. 1 to 3, 6, and 8 to 11, the cabin 4 includes: a roof frame 72 that supports the roof 62 and the like; right and left front pillars 73 that support a front end portion of the roof frame 72; right and left center pillars 74 that support front/rear intermediate portions of the roof frame 72; right and left rear pillars 75 that support a rear portion of the roof frame 72; a front panel 76 that forms the front face of the cabin 4; right and left door panels 77 that are supported by the right and left center pillars 74 so as to be able to be pivotally opened and closed; right and left side panels 78 that form the rear side faces of the cabin 4; a rear panel 79 that is supported by the roof frame 72 so as to be able to be pivotally opened and closed; and the like.

The roof frame 72 is substantially rectangular when viewed in a plan view, and includes: a front beam 98 that spans the right and left front pillars 73; right and left side beams 99 that respectively span the right and left front pillars 73 and the right and left rear pillars 75; and a rear beam 100 that spans the right and left rear pillars 75; and the like.

The right and left front pillars 73 are provided on the front side of the vehicle body relative to a center of the wheelbase L of the vehicle body. The right and left front pillars 73 are provided such that the upper half portion thereof is inclined to the right/left center of the vehicle body, approaching the upper side, when viewed from the front, and the upper half portion thereof is curved to the center in the front-rear direction of the vehicle body, approaching the upper side, when viewed from the side.

The right and left center pillars 74 and the right and left rear pillars 75 are arranged between the respective right and left rear fenders 12 located on the right and left of the driver's seat 22 and the roof frame 72. The right and left center pillars 74 are provided such that they are curved to the center in the right-left direction of the vehicle body, approaching the upper side, when viewed from the front, and they are curved to the center in the front-rear direction of the vehicle body, approaching the upper side, when viewed from the side. The right and left rear pillars 75 are provided such that they are curved to the center in the right-left direction of the vehicle body toward the upper portion side, when viewed from the front, and they are substantially perpendicular, when viewed from the side.

The panels 76 to 79 are curved panels that are curved along the corresponding pillars 73 to 75, and the like, and are made of glass or a transparent acrylic resin, for example.

With the above-described configuration, in the lower half portion of the cabin 4, it is possible to secure a wide space in which a driver seated on the driver's seat 22 can easily perform various operations using his or her hands and feet, and, in the upper half portion of the cabin 4, it is possible to reduce the length in the front-rear direction and the width in the right-left direction of the roof frame 72 to the extent that comfort is not impaired. As a result, it is possible to improve stability of the vehicle body by realizing a reduction in size of the cabin upper portion and a reduction in weight thereof, without deteriorating the operability and comfort in the boarding space.

As shown in FIGS. 1 to 3, and 9 to 11, the cabin 4 includes an auxiliary frame 90 that extends rearward from the upper end portions of the right and left rear pillars 75. The auxiliary frame 90 supports the rear-side obstacle detector 65, the monitoring camera 66 for image capturing of the rear side, and the like.

Figure 4:
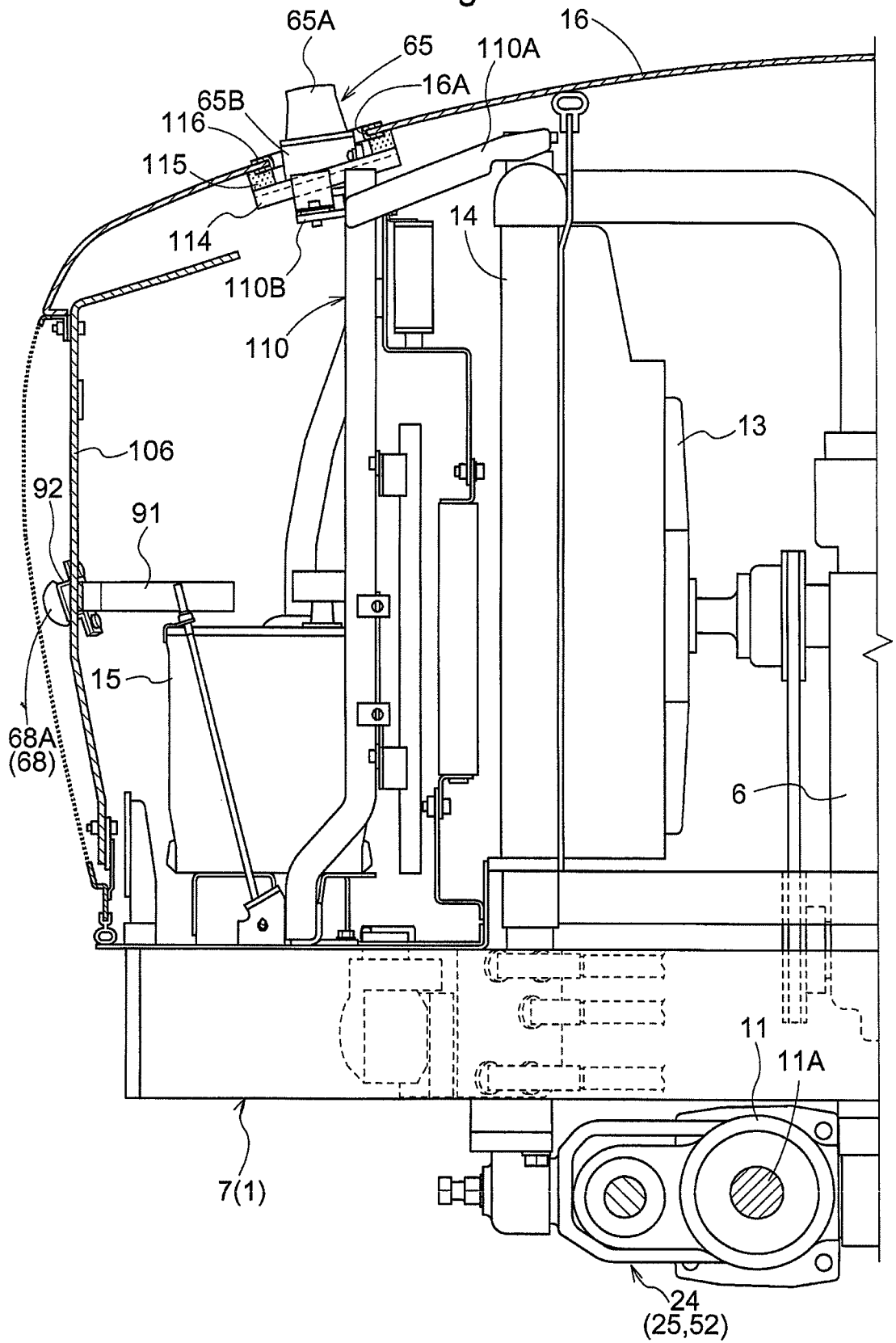
FIG. 4 is a left side view in vertical section of a front end portion of the tractor according to the first embodiment, illustrating a structure for supporting an obstacle searcher.

As shown in FIGS. 1, 3, and 4, the obstacle searchers 68 are set at positions at least above the right and left front wheels 9 of the vehicle body. Thus, for example, even if, during work travel, any obstacle searcher 68 approaches the ground of a farm field due to rolling or pitching of the vehicle body resulting from unevenness of the farm field or the like, the distances between the obstacle searchers 68 and the ground in such a case can be kept larger than the search distance of the obstacle searchers 68.

In other words, the obstacle searchers 68 are arranged at appropriate height positions at which it is possible to avoid, even if, during work travel, the vehicle body has rolled or pitched due to unevenness of the farm field or the like, the risk of the ground of the farm field entering the search distance of the obstacle searchers 68. Thus, it is possible to prevent the obstacle searchers 68 from misdetecting the ground of a farm field as an obstacle due to rolling or pitching of the vehicle body during work travel.

As shown in FIGS. 1 to 4, of the above-described eight obstacle searchers 68, two first obstacle searchers 68A are attached to up/down intermediate portions of the front end portion of the hood 16, with a predetermined distance from each other in the right-left direction. In other words, with the right and left first obstacle searcher 68A, the search-target area on the front side of the vehicle body can be increased in the right-left direction. As a result, it is possible to thoroughly search for an obstacle that has approached and entered the immediate range of the vehicle body on the front side of the vehicle body.

As shown in FIGS. 1 to 3, of the remaining six obstacle searchers 68, two second obstacle searchers 68B are attached to positions on the right and left side portions of the hood 16, the positions being located above the right and left front wheels 9. Two third obstacle searchers 68C are attached to the right and left front pillars 73 of the cabin 4 that are located at front/rear intermediate portions of the vehicle body. Two fourth obstacle searchers 68D are attached to positions on the right and left rear fenders 12, the positions being located above the right and left rear wheels 10.

With the above-described attaching, the right and left lateral sides of the front portion of the vehicle body, in which the hood 16 and the like are arranged, are search-target areas of the right and left second obstacle searchers 68B; the right and left lateral sides of the front/rear intermediate portions of the vehicle body, in which the right and left front pillars 73 and the like are arranged, are search-target areas of the right and left third obstacle searchers 68C; and the right and left lateral sides of the rear portion of the vehicle body, in which the right and left rear fenders 12 and the like are arranged, are search-target areas of the right and left fourth obstacle searchers 68D. In other words, with the right and left second obstacle searchers 68B, the right and left third obstacle searchers 68C, and the right and left fourth obstacle searchers 68D, all of the areas on the lateral sides of the vehicle body that extend largely in the front-rear direction can be used as the search-target areas. As a result, it is possible to thoroughly search for an obstacle that has approached and entered the immediate range of the vehicle body from a lateral side of the vehicle body.

As a result, it is possible to more reliably avoid the risk that the vehicle body will come into contact with an obstacle during automated driving, based on a search performed by each obstacle searcher 68.

As shown in FIGS. 1 to 4, and 12 to 16, the right and left first obstacle searchers 68A are attached to a first support member 91 via respective first resonance prevention member 92 made of resin, wherein the first support member 91 is formed of a steel plate and is arranged at an up/down intermediate portion in a front end region of the hood 16. The right and left second obstacle searchers 68B are attached to second support members 93 via another first resonance prevention member 92 made of resin, respectively, wherein each of the second support member 93 is formed of a steel plate and arranged at right/left front end portion of the hood 16. The right and left third obstacle searchers 68C are attached to third support members 94 via second resonance prevention member 95 made of resin, respectively, wherein each of the third support member 94 is formed of a steel plate and arranged at up/down intermediate portion of the right/left front pillar 73. The right and left fourth obstacle searchers 68D are attached to fourth support members 96 via third resonance prevention members 97 made of resin, respectively, wherein each of the fourth support members 96 is formed of a steel plate and protrudes laterally outward of the vehicle body from an upper end portions of the right/left rear fender 12.

With the above-described configuration, it is possible to prevent resonance that may occur when the obstacle searchers 68, which each include an oscillator (not shown), are directly attached to the support members 91, 93, 94, and 96 that are made of steel plates. Furthermore, because the first resonance prevention members 92 of the same type are used for attaching the first obstacle searchers 68A and the second obstacle searchers 68B to the hood 16, use of the members of the same type makes it possible to realize a reduction in cost.

As shown in FIG. 4, the first support member 91 is attached to a reinforcement frame 106 provided in the front end portion of the hood 16. The reinforcement frame 106 also serves as a support frame for supporting headlights 107 arranged in the upper portion of the front end of the hood 16, and the like.

As shown in FIGS. 1 to 3, the right and left third obstacle searchers 68C are located between the right and left front wheels 9 and the right and left rear wheels 10, as a result of being attached to the right and left front pillars 73. Accordingly, the search-target areas of the right and left third obstacle searchers 68C can include the area between the right and left front wheels 9 and the right and left rear wheels 10, and the right and left third obstacle searchers 68C can detect presence or absence of an obstacle between the right and left front wheels 9 and the right and left rear wheels 10.

As shown in FIG. 2, the right and left fourth obstacle searchers 68D are located higher than the lateral outer ends of the right and left rear wheels 10, as a result of being attached to the right and left rear fenders 12 via the right and left fourth support members 96. Accordingly, the right and left fourth obstacle searchers 68D can favorably search for an obstacle, without interference from the right and left rear wheels 10.

As shown in FIGS. 1 to 4, 12, 13, and 15, the attachment orientation of the right-side first obstacle searcher 68A is set to a forward right orientation in which its transmission/reception surface is directed forward and right. The attachment orientation of the left-side first obstacle searcher 68A is set to a forward left orientation in which its transmission/reception surface is directed forward and left. The attachment orientation of the right-side second obstacle searcher 68B is set to a rightward orientation in which its transmission/reception surface is directed laterally right. The attachment orientation of the left-side second obstacle searcher 68B is set to a leftward orientation in which its transmission/reception surface is directed laterally left. The orientations of attaching the right-side third obstacle searcher 68C and fourth obstacle searcher 68D are set to a downward right orientation in which their transmission/reception surfaces are directed downward and right. The orientations of attaching the left-side third obstacle searcher 68C and fourth obstacle searcher 68D are set to a downward left orientation in which their transmission/reception surfaces are directed downward and left.

As shown in FIGS. 1 to 5, and 9 to 11, the front-side obstacle detector 65 is located at a right/left intermediate portion of the front upper portion of the prime mover part 3. The rear-side obstacle detector 65 is located at a right/left intermediate portion of the rear upper portion of the cabin 4.

Accordingly, the front-side obstacle detector 65 can also serve as a sighting device that is used by a driver to determine the direction in which the vehicle body travels. As a result, it is possible to keep the vehicle body from coming into contact with an obstacle that is present in front of the vehicle body, during automated driving, while realizing a reduction in cost due to the obstacle detector also serving as a sighting device.

Also, the rear-side obstacle detector 65 may be arranged in the upper portion of the vehicle body at a position higher than the work implement apparatus W (see FIGS. 23 and 24) that is mounted to the rear portion of the vehicle body so as to be able to move up and down. Accordingly, the rear-side obstacle detector 65 can favorably detect an obstacle that has approached and entered the short range of the work implement apparatus W mounted in the rear portion of the vehicle body, without interference from the work implement apparatus W. As a result, it is possible to avoid the risk that the work implement apparatus W mounted in the rear portion of the vehicle body will come into contact with an obstacle during automated driving.

Since the front-side and rear-side obstacle detectors 65 are located at positions higher than the upper portion of the prime mover part 3 of the vehicle body, even if, during work travel for example, any obstacle detector 65 approaches the ground of a farm field due to rolling or pitching of the vehicle body resulting from unevenness of the farm field, or the like, the obstacle detectors 65 are set at height positions at which the distances between the obstacle detectors 65 and the ground at that time can be easily kept larger than the detection distance of the obstacle detectors 65.

In other words, the obstacle detectors 65 are arranged at appropriate height positions at which, if, during work travel, the vehicle body rolls or pitches due to unevenness of a farm field, or the like, the ground of the farm field is unlikely to enter the detection distance ranges of the obstacle detectors 65. Thus, it is possible to prevent the obstacle detectors 65 from misdetecting the ground of a farm field as an obstacle due to rolling or pitching of the vehicle body during work travel.

Figure 5:
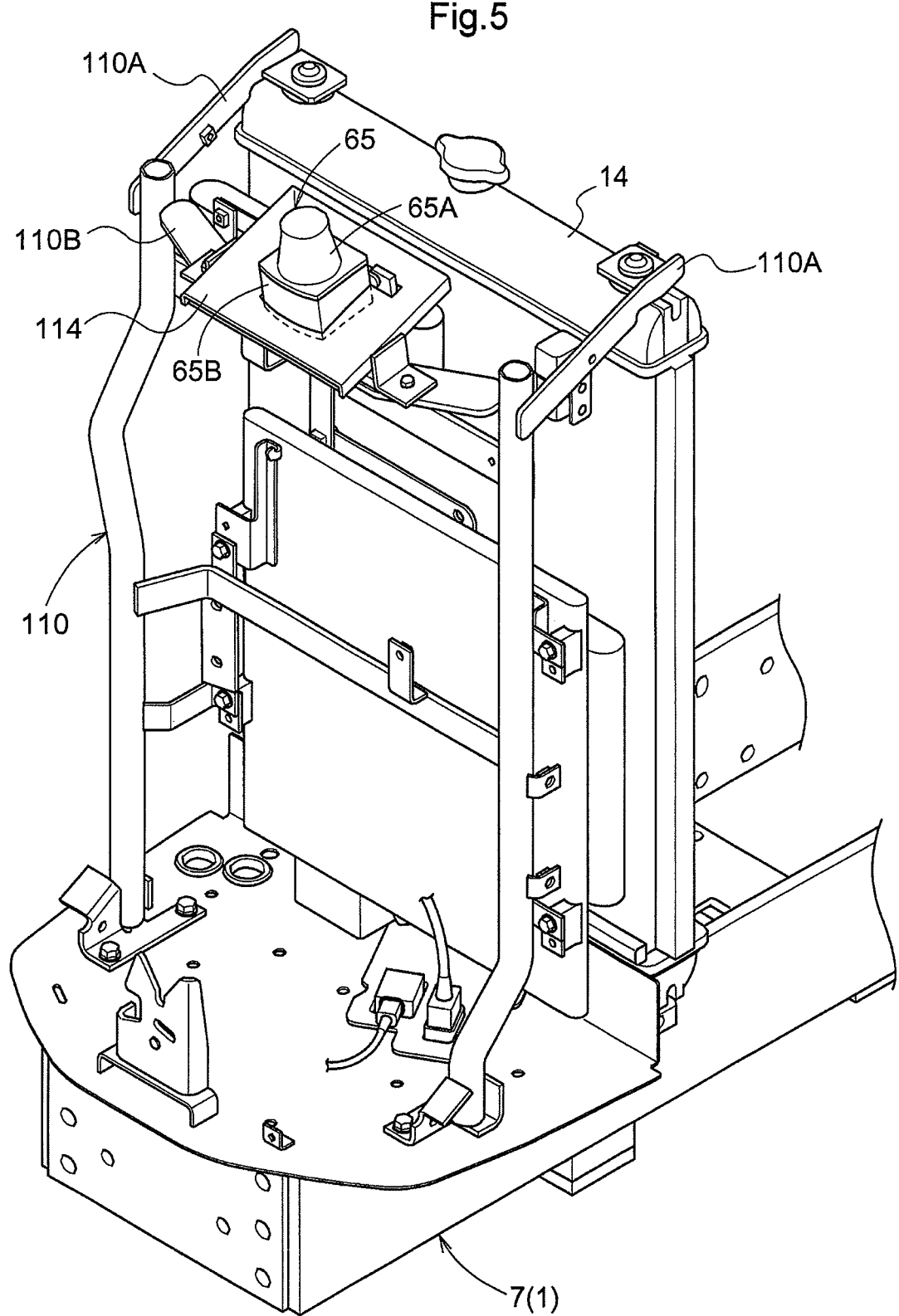
FIG. 5 is a perspective view of a main portion that shows a configuration of the front end portion of the tractor according to the first embodiment.
Figure 6:
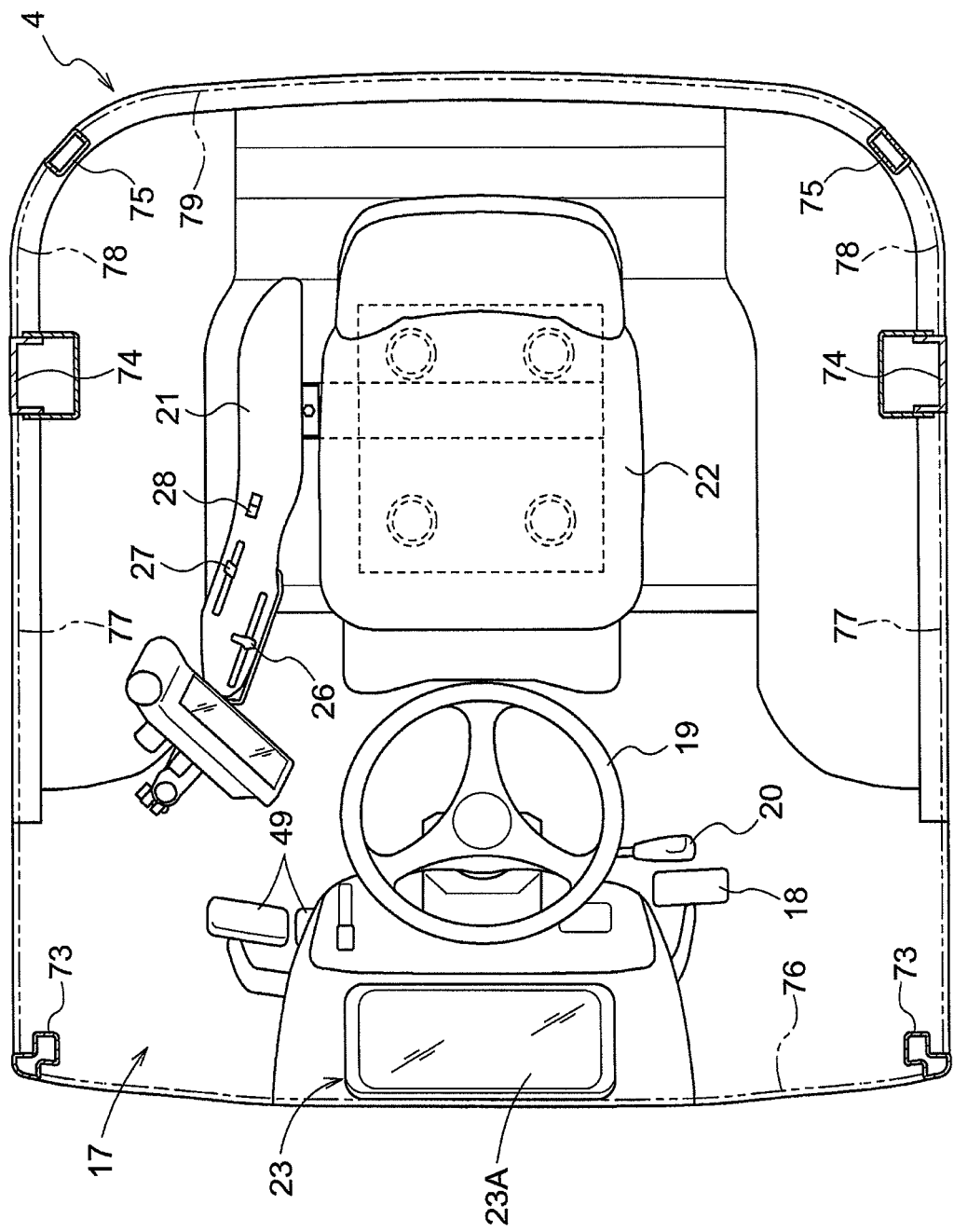
FIG. 6 is a transverse plan view of a main portion that shows a configuration of a driver part according to the first embodiment.

As shown in FIGS. 1, 4, and 5, the front-side obstacle detector 65 is located on the upstream side, in the cooling direction, relative to the radiator 14, which is located on the upstream side in the cooling direction of the prime mover part 3. Accordingly, it is possible to avoid heat damage that may be caused by heated cooling air used to cool, thus heated by the engine 6, the radiator 14, and the like reaching the front-side obstacle detector 65.

Figure 17:
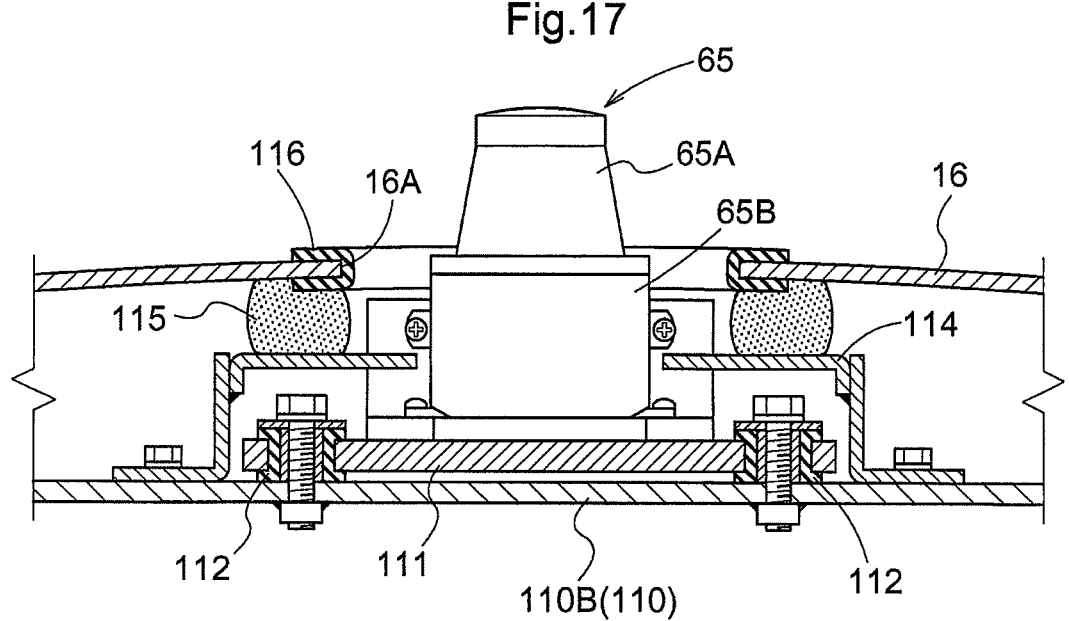
FIG. 17 is a front view in vertical section of the main portion that shows a vibration-proof structure of an obstacle detector for the front side, and the like, according to the first embodiment.
Figure 18:
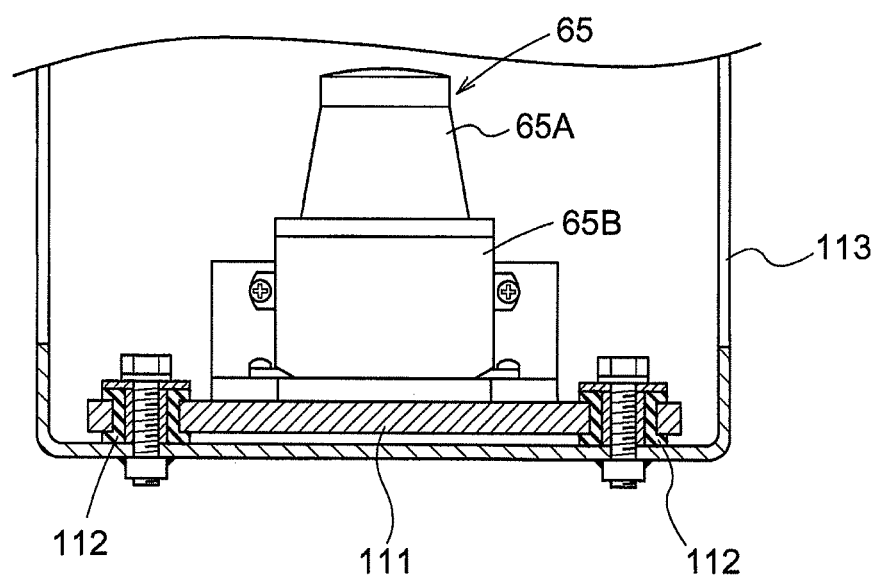
FIG. 18 is a rear view in vertical section of the main portion that shows a vibration-proof structure of an obstacle detector for the rear side, and the like, according to the first embodiment.

As shown in FIGS. 4, 5, and 17, the prime mover part 3 is provided with a support frame 110 that is attached to the front frame 7 in an upright orientation. The support frame 110 includes, on the upper portion thereof, right and left arm portions 110A that support the right and left end portions of the radiator 14, and a supporting portion 110B that supports the front-side obstacle detector 65. The front-side obstacle detector 65 is coupled, using bolts, to the supporting portion 110B via a supporting plate 111 and right and left vibration-proof rubber elements 112. The hood 16 has an opening 16A through which the detection unit 65A of the front-side obstacle detector 65 is exposed to the upper side from the hood 16 at the closed position.

As shown in FIGS. 9 to 11, and 18, a U-shaped support member 113 for supporting the rear-side obstacle detector 65 is attached to the rear end of the auxiliary frame 90 of the cabin 4. The rear-side obstacle detector 65 is coupled, using bolts, to the support member 113 via the supporting plate 111 and the right and left vibration-proof rubber elements 112.

With the above-described configuration, vibrations of the vehicle body are unlikely to be transmitted to the front-side and rear-side obstacle detectors 65. As a result, it is possible to prevent vibrations of the vehicle body from adversely affecting the obstacle detectors 65.

Also, an impact that occurs when an operation of closing the hood 16 is performed is unlikely to affect the front-side obstacle detector 65, compared to a case where the front-side obstacle detector 65 is attached to the hood 16. Accordingly, the supporting structure and vibration-proof structure that are required to attach the front-side obstacle detector 65 can be simplified. Also, the detection unit 65A of the obstacle detector 65, which is exposed to the upper side of the hood 16 from the opening 16A formed in the hood 16 at the closed position, can detect an obstacle that has approached and entered the short range of the front portion of the vehicle body during automated driving, while realizing simplification of the supporting structure and vibration-proof structure in this manner.

As shown in FIGS. 4, 5, and 17, the supporting portion 110B of the support frame 110 includes an outer enclosing member 114 that encloses the detection unit 65A of the front-side obstacle detector 65. The outer enclosing member 114 includes a ring-shaped dustproof member 115 that is made of a sponge, the dustproof member 115 being located between the upper surface of the outer enclosing member 114 and the hood 16 at the closed position, and preventing dust from entering the hood 16 via the opening 16A of the hood 16.

With the above-described configuration, it is possible to prevent, using the dustproof member 115, powder dust in air, together with outside air, from entering the hood 16 from the opening 16A in the hood 16 during travel. As a result, it is possible to prevent an issue, such as clogging of the radiator 14, from occurring due to dust entering the hood 16 from the opening 16A of the hood 16.

As shown in FIGS. 4 and 17, a rubber trim 116 is attached to and covers the circumferential edge of the opening 16A of the hood 16. Accordingly, it is possible to avoid the risk that, when an operation for opening/closing the hood 16 is performed, the front-side obstacle detector 65 will come into contact with the edge of the opening of the hood 16 and may be damaged.

Other Configurations of First Embodiment

The present invention is not limited to the configurations exemplified in the above-described first embodiment. Hereinafter, other representative configurations of the present invention will be given as examples.

[1-1] The configurations given as examples below may be employed in the work vehicle.

For example, the work vehicle may have a semi-crawler type configuration in which it is provided with right and left crawlers instead of the right and left rear wheels 10.

For example, the work vehicle may have a full-crawler type configuration in which it is provided with right and left crawlers instead of the right and left front wheels 9 and the right and left rear wheels 10.

For example, the work vehicle may be of a two-wheel drive type in which either the right and left front wheels 9 or the right and left rear wheels 10 are driven.

For example, the work vehicle may have an electric type configuration in which it is provided with an electric motor instead of the engine 6.

For example, the work vehicle may have a hybrid type configuration in which it is provided with the engine 6 and an electric motor.

For example, the work vehicle may be provided with a protection frame instead of the cabin 4.

[1-2] Various changes may be made to, for example, the number or the layout of the obstacle searchers 68 of the obstacle detection module 64 according to the configuration, dimensions, and the like of the work vehicle.

For example, if the work vehicle is long in length, ten or more obstacle searchers 68 may be provided, and if the work vehicle is short in length, six or less obstacle searchers 68 may be provided.

For example, when the work vehicle is provided with a protection frame instead of the cabin 4, an obstacle searcher 68 may be attached to the protection frame.

[1-3] An infrared range sensor or the like may be employed as each obstacle searcher 68.

[1-4] The right and left first obstacle searchers 68A may be located at positions higher than the headlights 107 provided in the front end portion of the hood 16.

[1-5] The contact avoidance control unit 30D may be configured to output an emergency stop instruction to the travel control unit 30A and the work control unit 30B upon confirming that an obstacle has approached and entered the immediate range of the vehicle body, based on the result of determination performed by one of the obstacle detection module 64 and the front-side and rear-side obstacle detectors 65, or the result of determination performed by the obstacle detection module 64 and one of the front-side and rear-side obstacle detectors 65.

[1-6] The front-side and rear-side obstacle detectors 65 may each serve also as the obstacle detection module 64.

In this configuration, for example, if each obstacle detector 65 serves also as the obstacle detection module 64, the obstacle detector 65 determines whether or not an obstacle has approached and entered a short range (e.g. within 10 m) of the vehicle body, based on the period of time from irradiation to reception of a laser beam, and detects the presence or absence of an obstacle within an immediate range (e.g. within 1 m) of the vehicle body.

[1-7] An infrared range sensor, an ultrasonic waves range sensor, or the like may be employed as each obstacle detector 65.

[1-8] Various changes may be made to, for example, the layout or the number of the obstacle detectors 65 according to the configuration, dimensions, and the like of the work vehicle.

For example, when the work vehicle is provided with a protection frame instead of the cabin 4, an obstacle detector 65 may be located at a right/left intermediate portion of the upper portion of the protection frame.

For example, two obstacle detectors 65 may be provided on either front or rear side, at positions away from the right/left intermediate portion of the vehicle body in a right/left symmetrical manner.

Second Embodiment

The following describes a second embodiment, which is an example of the present invention, with reference to the drawings. Note that an arrow with a reference mark F in FIGS. 19 and 20 indicates the "front side", an arrow with a reference mark U in FIG. 19 indicates the "upper side", and an arrow with a reference mark R in FIGS. 19 and 20 indicates the "right side".

Figure 19:
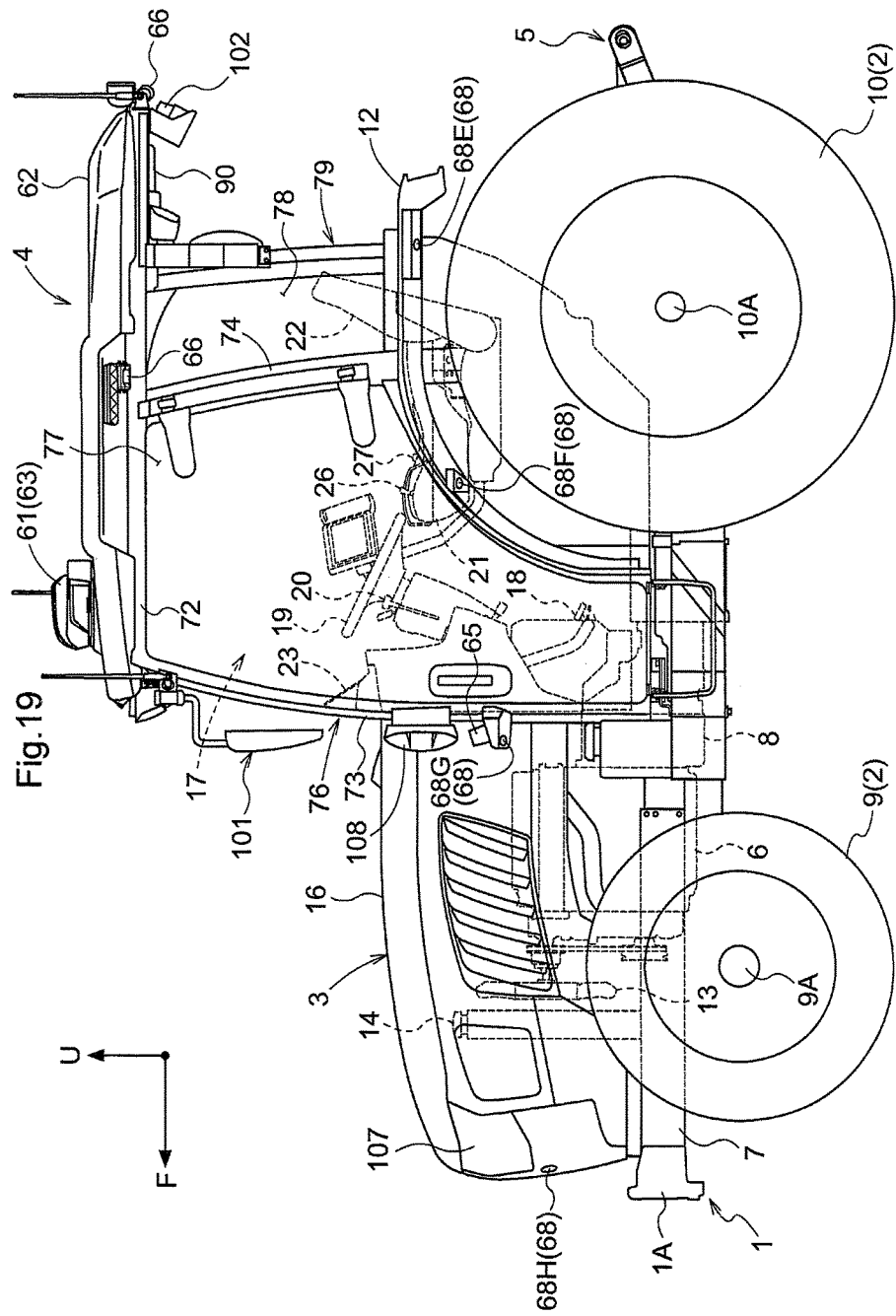
Figure 20:
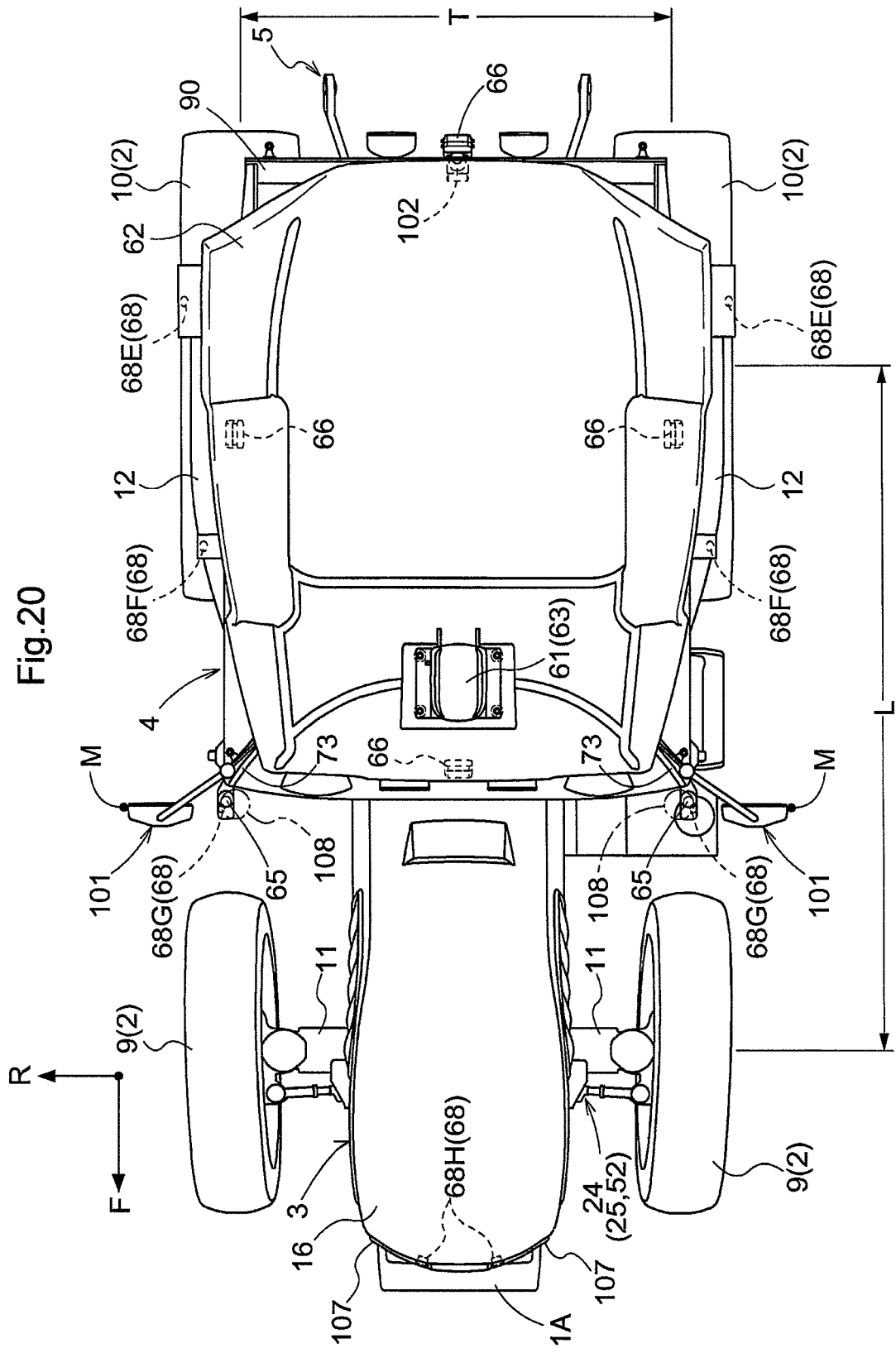
Figure 21:
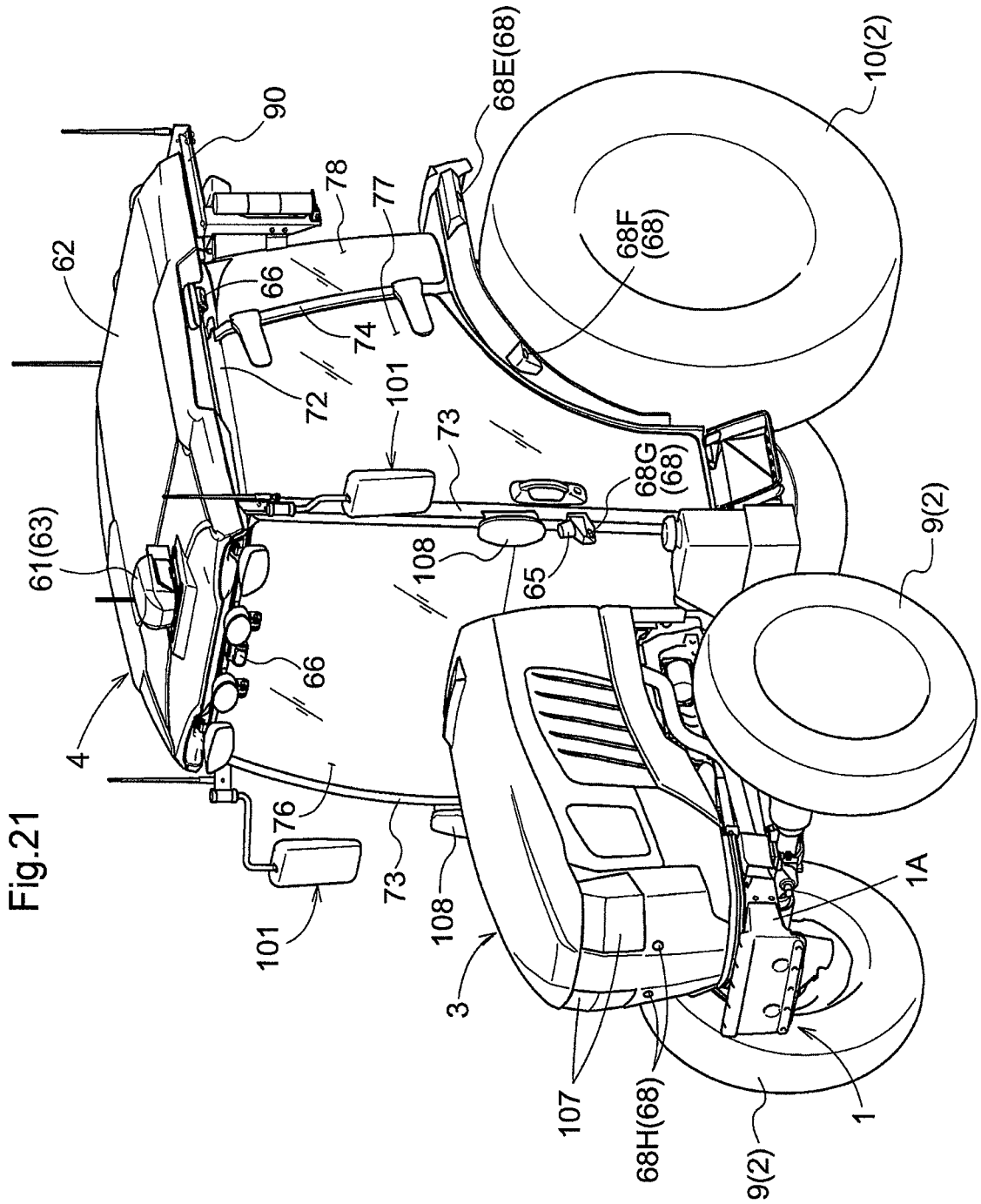

As shown in FIGS. 19 to 21 and the like, a tractor (which is an example of a "work vehicle") includes: a vehicle body frame 1 that spans between the front and rear ends of the vehicle body; right and left travel apparatuses 2 arranged to the right and left of the vehicle body frame 1; a prime mover part 3 that is located in a front portion of the vehicle body frame 1; a cabin 4 that is located in a rear portion of the vehicle body frame 1; and a three-point linkage mechanism 5 that is used to couple a work implement apparatus W (see FIGS. 23 and 24) attached to a rear end portion of the vehicle body frame 1 to be moved up and down. As shown in FIGS. 19 and 20, a weight 1A is attached to a front end portion of the vehicle body frame 1.

As shown in FIGS. 19 to 21 and the like, the vehicle body frame 1 includes a front frame 7 that extends from a position below an engine 6 located in the prime mover part 3 to the front side of the vehicle body, a case unit 8 that extends from a position below the rear end of the engine 6 to the rear side of the vehicle body and serves also as a rear frame, and the like. The configurations of the front frame 7, the case unit 8, and the like are the same as those of the above-described first embodiment.

As shown in FIGS. 19 to 21 and the like, the right and left travel apparatuses 2 include right and left front wheels 9 that function as drivable and steering wheels, and right and left rear wheels 10 that function as driving wheels. The configurations of the front wheels 9, the rear wheels 10, a wheel support member 11, and the like are the same as those of the above-described first embodiment.

As shown in FIGS. 19 to 21, the prime mover part 3 includes: the engine 6 of a water-cooled type that is located in a rear portion of the prime mover part 3 relative to the vehicle body, which is a downstream side in a cooling direction of the prime mover part 3; a cooling fan 13 that is located in a front portion of the vehicle body, which is the upstream side relative to the engine 6 in the cooling direction; a radiator 14 that is located forward of the cooling fan 13 in the vehicle body; a battery 15 (see FIG. 4) that is located forward of the radiator 14 in the vehicle body; an exhaust processing apparatus (not shown) that is located above a rear portion of the engine 6; an air cleaner (not shown) that is located above a front portion of the engine 6; a hood 16 that is configured to be pivotally opened and closed, and covers the engine 6, the radiator 14, and so on from above; and the like. The configurations of the engine 6 and the exhaust processing apparatus are the same as those of the above-described first embodiment.

As shown in FIGS. 19 to 21 and the like, the cabin 4 includes a driver part 17 and a boarding space in a rear portion of the vehicle body. The driver part 17 includes: a clutch pedal 18 that enables operation of the main clutch; right and left brake pedals (corresponding to the brake pedals 49 in FIG. 6) that enable operation of the right and left side brakes; a steering wheel 19 for manual steering that enables manual steering of the right and left front wheels 9; a shuttle lever 20 for switching to forward travel and rearward travel; a driver's seat 22 with an armrest 21 for the right arm; a display unit 23 that includes a liquid crystal panel 23A (see FIG. 6) that accepts touch operations; and the like. The configurations of the steering wheel 19 and the armrest 21 are the same as those of the above-described first embodiment.

Figure 22:
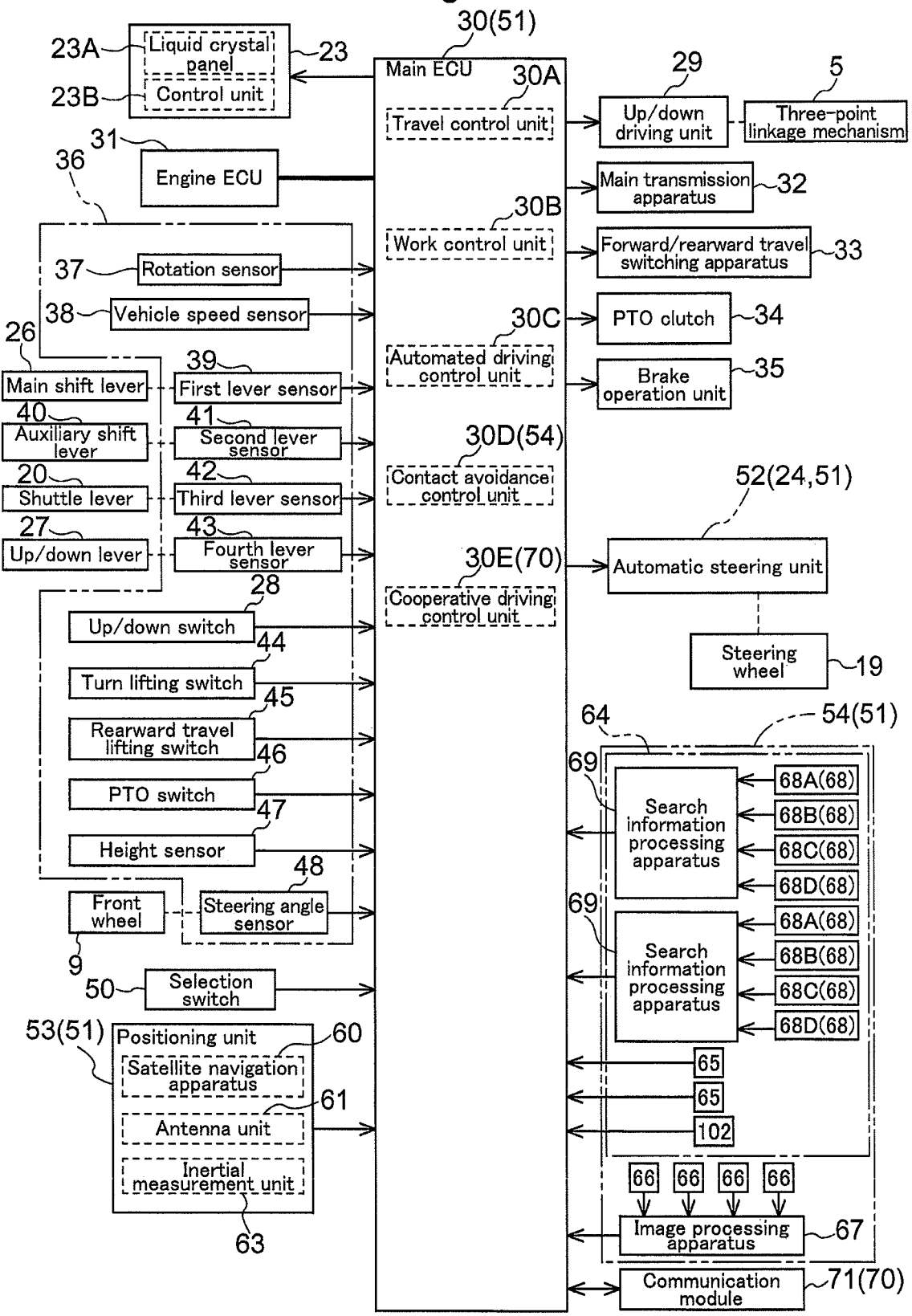
FIG. 22 is a block diagram illustrating a schematic configuration of a control system according to the second embodiment.
Figure 23:
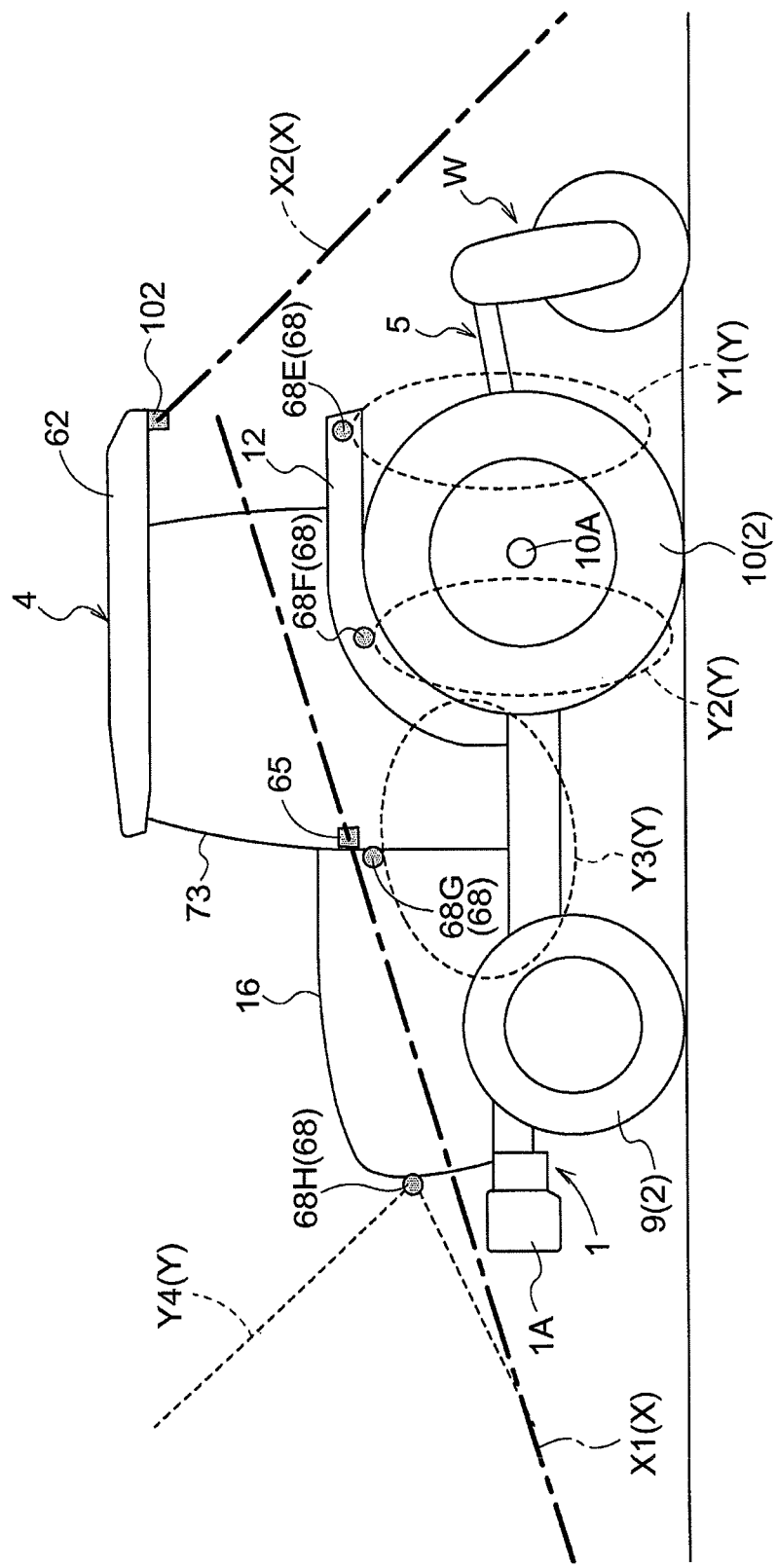
FIG. 23 is a left side view schematically illustrating search-target areas of obstacle searchers, and a detection-target area of an obstacle detector, according to the second embodiment.
Figure 24:
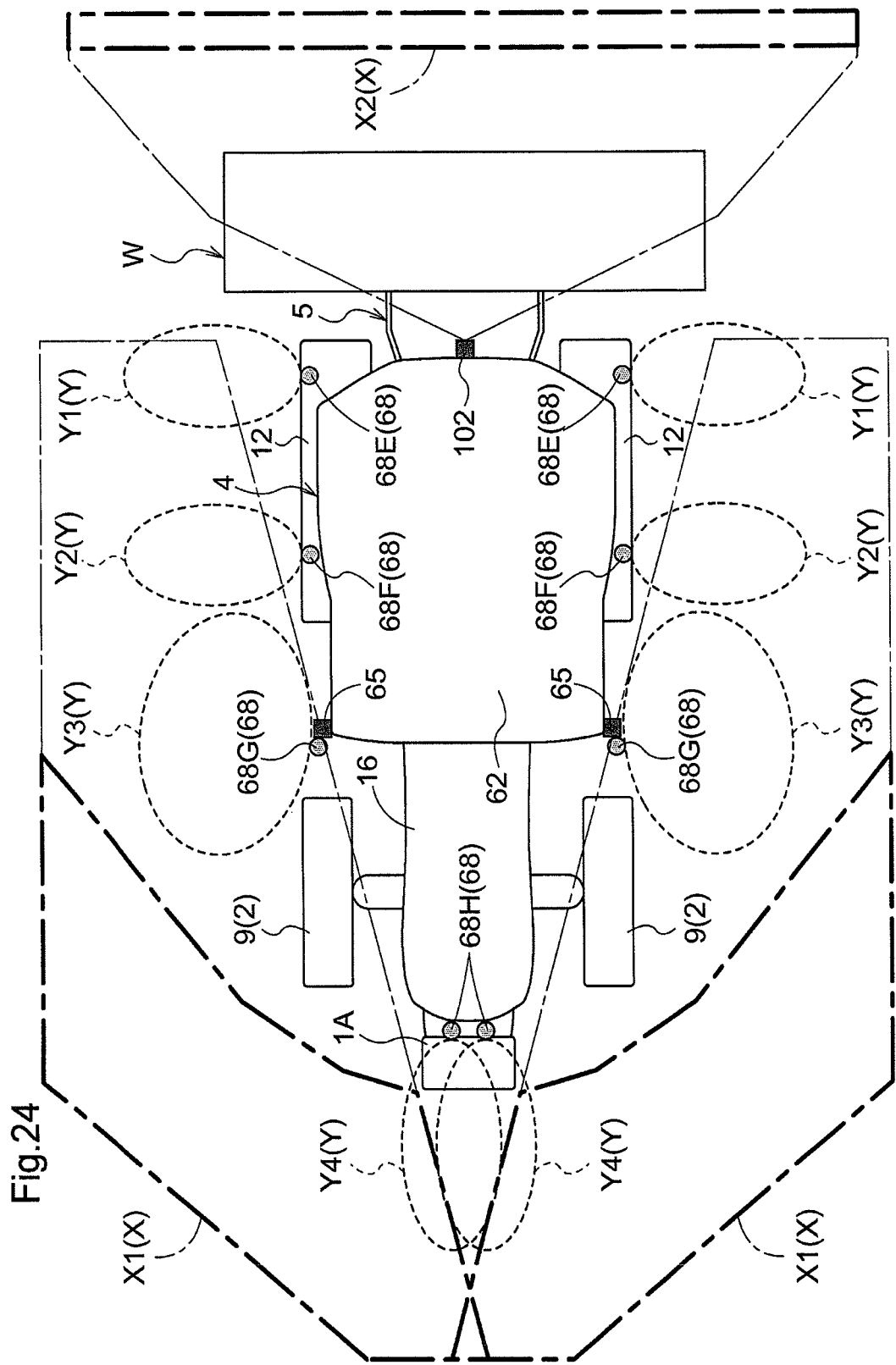
FIG. 24 is a top view schematically illustrating search-target areas of the obstacle searchers, and detection-target areas of the obstacle detectors according to the second embodiment.

As shown in FIG. 22, the three-point linkage mechanism 5 that is shown in FIGS. 19 to 21, etc. is driven to be moved up and down under an action made by an electronic hydraulic control type up/down driving unit 29 provided in the vehicle body. As shown in FIGS. 23 and 24, any of various work implement apparatuses W such as a rotary cultivating apparatus, a plow, a disc harrow, a cultivator, a subsoiler, a sowing apparatus, and a spraying apparatus can be coupled to the three-point linkage mechanism 5. If the work implement appratus W coupled to the three-point linkage mechanism 5 is a rotary cultivating apparatus or the like that is driven by power from the vehicle body, work power taken from the speed change unit is transmitted to the work implement apparatus W via an external power transmission shaft.

As shown in FIG. 22, a main ECU 30, which is a main electronic control unit, and an engine ECU 31, which is an electronic control unit for the engine, are mounted on the vehicle body. The main ECU 30 includes a travel control unit 30A that performs control regarding travel of the vehicle body, a work control unit 30B that performs control regarding the work implement apparatus, and the like, and the configuration of the main ECU 30 is as described above in the first embodiment. Furthermore, the configuration of the engine ECU 31 is the same as that of the above-described first embodiment.

The configurations of an electronic control type main transmission apparatus 32 and a forward/rearward travel switching apparatus 33 that are provided in the speed change power transmission unit are the same as those of the above-described first embodiment. Furthermore, the configuration of the speed change power transmission unit is the same as that of the above-described first embodiment.

As shown in FIG. 22, an in-vehicle information acquisition unit 36 includes various sensors and switches, such as: a rotation sensor 37 that detects the output speed of the engine 6; a vehicle speed sensor 38 that detects the output speed of an auxiliary transmission apparatus as the vehicle speed; a first lever sensor 39 that detects the operation position of the main shift lever 26; a second lever sensor 41 that detects the operation position of an auxiliary shift lever 40 that is provided in the driver part 17; a third lever sensor 42 that detects the operation position of the shuttle lever 20; a fourth lever sensor 43 that detects the operation position of the up/down lever 27; an up/down switch 28 as described above; a turn lifting switch 44, a rearward travel lifting switch 45 and a PTO switch 46 that are provided in the driver part 17; a height sensor 47 that detects the angle of an up/down swing of right and left lift arms (not shown) of the up/down driving unit 29 as the height position of the work implement apparatus W; and a steering angle sensor 48 that detects a steering angle of the front wheels 9.

The travel control unit 30A includes, for example, various control programs that realize control regarding travel of the vehicle body. The work control unit 30B includes, for example, various control programs that realize control regarding the work implement apparatus W. The configuration, functions, and effects of the travel control unit 30A are as described in the first embodiment. Furthermore, the configuration, functions, and effects of the work control unit 30B are as described in the first embodiment.

As shown in FIG. 22, a selection switch 50 that enables the driver to select, as a driving mode thereof, one of a manual driving mode, an automated driving mode and the like; and an electronic control system 51 for automated driving that automatically drives the vehicle body when the automated driving mode is selected are provided in the tractor. The electronic control system 51 includes: the above-described main ECU 30; an automatic steering unit 52 that realizes automatic steering of the right and left front wheels 9; a positioning unit 53 that measures the position and orientation of the vehicle body; a monitoring unit 54 that monitors the surroundings of the vehicle body, and the like. The configurations of the automatic steering unit 52 and the positioning unit 53 are as described in the first embodiment.

As shown in FIG. 22, the main ECU 30 includes an automated driving control unit 30C that includes, for example, various control programs that realize automated driving of the vehicle body. The configuration, functions and effects of the automated driving control unit 30C are as described in the first embodiment.

As shown in FIGS. 19 to 22 and the like, the monitoring unit 54 includes: an obstacle detection module 64 that detects the presence or absence of an obstacle; a travel regulation control unit 30F that performs, upon the obstacle detection module 64 detecting an obstacle, travel regulation control (contact avoidance control to avoid coming into contact with an obstacle) to prevent the vehicle body from traveling; four monitoring cameras 66 that capture images of the surroundings of the vehicle body; an image processing apparatus 67 that processes images captured by the monitoring cameras 66, and the like.

The obstacle detection module 64 shown in FIG. 22 includes: a plurality of obstacle detectors 65 that detect an obstacle that is present in detection-target areas X (see FIGS. 23 to 25); a plurality of obstacle searchers 68 that detect an obstacle that is present in search-target areas Y (see FIGS. 23 to 25); and two search information processing apparatuses 69 that perform determination processing to determine whether or not an obstacle has approached and entered an immediate range of the vehicle body based on search information from the obstacle searchers 68. The obstacle detectors 65 detect an approaching obstacle within a short range (e.g. within 10 m) of the vehicle body. Each obstacle searcher 68 detects the presence or absence of an obstacle within an immediate range (e.g. within 1 m) of the vehicle body. In other words, the obstacle detection module 64 includes the obstacle detectors 65 that detect an obstacle that is present in the detection-target area X using a method that is different from a method performed by the obstacle searchers 68.

Figure 25:
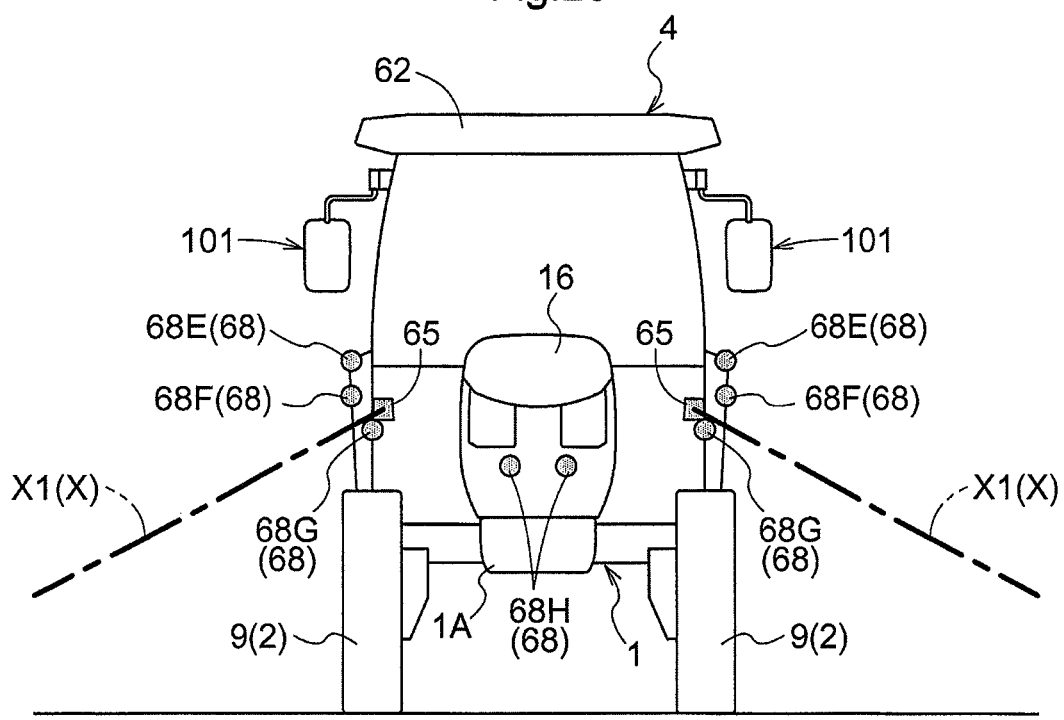
FIG. 25 is a front view schematically illustrating the detection-target area of the obstacle detectors according to the second embodiment.

FIGS. 23 to 25 schematically show the detection-target areas X of the obstacle detectors 65 and the search-target areas Y of the obstacle searchers 68. The search-target areas Y of the obstacle searchers 68 include an area that is located below the detection-target areas X of the obstacle detectors 65. Note that, in FIGS. 23 to 25, some portions of the detection-target areas X and the search-target areas Y are omitted for convenience of illustration.

The detection-target areas X and the search-target areas Y shown in FIGS. 23 to 25 change depending on the vehicle speed. Specifically, the detection-target areas X and the search-target areas Y increase with an increase in the vehicle speed.

An ultrasonic sonar device that uses ultrasonic waves to measure distance is employed in each obstacle searcher 68, the ultrasonic sonar device serving as an example of a range sensor. Eight obstacle searchers 68 are distributed on the front end portion and the right and left end portions of the vehicle body such that the front side and the right and left sides of the vehicle body are search-target areas Y. Each obstacle searcher 68 has a substantially conical search-target area Y. Each obstacle searcher 68 transmits search information obtained by performing a search to the corresponding search information processing apparatus 69.

Each search information processing apparatus 69 performs determination processing to determine whether or not an obstacle has approached and entered the immediate range of the vehicle body based on the period of time from transmission to reception of an ultrasonic wave from the corresponding obstacle searcher 68, and outputs the result of determination to the travel regulation control unit 30F.

As a result, when an obstacle has unexpectedly approached and entered the immediate range of the vehicle body from the front side or the right or left sides of the vehicle body during automated driving, the obstacle detection module 64 detects the approaching obstacle.

For example, when the vehicle body is traveling toward a ridge during automated driving, or when the vehicle body is traveling along a ridge at a ridge edge during automated driving, if the ridge has unexpectedly approached and entered the immediate range of the vehicle body, the obstacle detection module 64 detects the ridge as an obstacle. Also, if a moving object has unexpectedly approached and entered the immediate range of the vehicle body, the obstacle detection module 64 detects the moving object as an obstacle.

Regarding Obstacle Detectors of Second Embodiment

Each obstacle detector 65 employs a laser scanner that has a planar detection-target area X and a detection angle of up to about 270 degrees. Each obstacle detector 65 includes a detection unit that performs detection of an obstacle, and a processing unit that processes detection information from the detection unit. The detection unit irradiates a detection-target area X with a laser beam and receives the reflected light. The processing unit determines, for example, whether or not an obstacle has approached and entered a short range of the vehicle body, based on the period of time from irradiation to reception of the laser beam, and outputs the result of determination to the travel regulation control unit 30F.

An area on the front side of the vehicle body is set as the detection-target area X of a front-side obstacle detector 65. A pair of right and left obstacle detectors 65 are provided that have first detection-target areas X1 on the front side and the lateral sides of the vehicle body, and detect an obstacle that is present in the first detection-target areas X1. Furthermore, an area on the rear side of the work implement apparatus W of the vehicle body is set as a second detection-target area X2, and a rear-side obstacle detector 102 is provided that detects an obstacle that is present in the second detection-target area X2.

As shown in FIG. 23 and the like, for example, even if, during work travel, the vehicle body rolls or pitches to some extent due to unevenness of a farm field or the like, the first detection-target areas X1 and the second detection-target area X2 are set as areas in which the ground of the farm field is not detected.

As shown in FIGS. 19 to 21, 22 and the like, each obstacle detector 65 is attached to a support frame that extends in the up-down direction. Here, the support frames are front pillars 73 included in the cabin 4.

In other words, as shown in FIG. 20, each obstacle detector 65 is located between an outer end, in the right-left direction, of the hood 16 and an outermost position M of the main part of the vehicle body. Furthermore, each obstacle detector 65 is located between an upper end portion of the hood 16 and the upper end portion of the front wheels 9, with respect to the up-down direction. Furthermore, each obstacle detector 65 is located in a front/rear intermediate portion of the main part of the vehicle body. Here, the front/rear intermediate portion of the main part of the vehicle body means an area that is broad to some extent including areas extending forward and rearward from the front/rear center of the main part of the vehicle body.

Furthermore, each obstacle detector 65 is located between a front wheel shaft 9A of the front wheels 9 and a rear wheel shaft 10A of the rear wheels 10 in the front-rear direction of the vehicle. Accordingly, it is possible to set the first detection-target areas X1 so that an obstacle can be favorably detected even when the vehicle body is inclined due to an irregular landform.

As shown in FIGS. 23 to 25, the first detection-target area X1 of each obstacle detector 65 is set to be inclined forward, rearward, leftward, and rightward with respect to the horizontal plane. More specifically, as shown in FIG. 23, the detection-target area X of each obstacle detector 65 is inclined forward and downward, as well as rearward and upward. Furthermore, the first detection-target areas X1 of the obstacle detectors 65 are set so as to extend over the upper front side of the front wheels 9. Furthermore, the first detection-target areas X1 of the obstacle detectors 65 are set so as to extend over the upper front side of the weight 1A. Also, as shown in FIG. 25, the first detection-target areas X1 of the obstacle detectors 65 are inclined downward from the laterally inner side of the body toward the laterally outer side of the body.

As shown in FIGS. 23 and 24, an area on the rear side of the vehicle body relative to the work implement apparatus W is set as the second detection-target area X2 of the rear-side obstacle detector 102. The second detection-target area X2 of the rear-side obstacle detector 102 is set to have a rearward and downward inclination angle. The second detection-target area X2 is set to be larger in width in the right-left direction than the lateral width of the work implement apparatus W.

Here, the travel regulation control unit 30F shown in FIG. 22 includes, for example, a control program that realizes execution of travel regulation control. Upon detecting that an obstacle has approached and entered the short range of the vehicle body based on the result of determination performed by each obstacle detector 65 and the rear-side obstacle detector 102, the travel regulation control unit 30F starts travel regulation control in preference to automated driving that is based on control operation performed by the automated driving control unit 30C. Thereafter, the travel regulation control unit 30F performs the travel regulation control based on the result of determination performed by each obstacle detector 65, the rear-side obstacle detector 102, and each search information processing apparatus 69.

In travel regulation control, the travel regulation control unit 30F outputs a deceleration instruction to the travel control unit 30A upon travel regulation control starting. Accordingly, the travel regulation control unit 30F causes the main transmission apparatus 32 to perform a deceleration operation through a control operation performed by the travel control unit 30A, thereby reducing the vehicle speed from a set speed for normal travel to a set speed for contact avoidance. In this low-speed travel state, if the travel regulation control unit 30F confirms that an obstacle has approached and entered the immediate range of the vehicle body based on the result of determination performed by any of the search information processing apparatuses 69, the travel regulation control unit 30F outputs an emergency stop instruction to the travel control unit 30A and the work control unit 30B. As a result, the travel regulation control unit 30F switches the forward/rearward travel switching apparatus 33 to the neutral state through a control operation performed by the travel control unit 30A, and causes the brake operation unit 35 to activate the right and left brakes, thereby braking the right and left front wheels 9 and the right and left rear wheels 10. Also, the travel regulation control unit 30F causes the work control unit 30B to switch the PTO clutch 34 to an OFF state, and stop the action of the work implement apparatus W. As a result, it is possible to promptly stop the vehicle body from traveling and stop the work implement apparatus W from operating, based on the fact that an obstacle has approached and entered the immediate range of the vehicle body, and it is possible to avoid the risk that the obstacle will come into contact with the vehicle body. In this low-speed travel state, if the travel regulation control unit 30F confirms that there is no obstacle within the short range of the vehicle body based on the result of determination performed by each obstacle detector 65, the travel regulation control unit 30F outputs an acceleration instruction to the travel control unit 30A, and then ends the travel regulation control. Thus, the travel regulation control unit 30F causes the transmission apparatus 32 to perform an acceleration operation through a control operation performed by the travel control unit 30A so that the vehicle speed is increased from the set speed for contact avoidance to the set speed for normal travel, and thereafter restarts automated driving that is based on a control operation performed by the automated driving control unit 30C.

A wide-angle CD camera for visible light is employed in each monitoring camera 66 shown in FIGS. 19 to 22, etc. One of the four monitoring cameras 66 is for capturing an image of objects on the front side of the vehicle body. This monitoring camera 66 is provided at a right/left center portion in a front upper end region of the cabin 4 in an inclined orientation so as to capture images forward and downward thereof. One of the four monitoring cameras 66 is for capturing an image of objects located to the right of the vehicle body. This monitoring camera 66 is provided in a right upper end portion of the cabin 4 in an inclined orientation so as to capture an image downward and rightward thereof. One of the four monitoring cameras 66 is for capturing an image of objects located to the left of the vehicle body. This monitoring camera 66 is provided in a left upper end portion of the cabin 4 in an inclined orientation so as to capture an image downward and leftward thereof. One of the four monitoring cameras 66 is for capturing an image of objects on the rear side of the vehicle body. This monitoring camera 66 is provided at a right/left center portion in a rear upper end region of the cabin 4, in an inclined orientation so as to capture images rearward and downward thereof. As a result, it is possible to capture images of the entire surroundings of the vehicle body.

The image processing apparatus 67 shown in FIG. 22 processes video signals from the monitoring cameras 66, generates an image of objects on the front side of the vehicle body, an image of objects on the right side of the vehicle body, an image of objects on the left side of the vehicle body, an image of objects on the rear side of the vehicle body, a bird's eye image seen from right above the vehicle body, and so on; and transmits the images to the display unit 23 and the like. The configuration, functions, and effects of the display unit 23 are as described above in the first embodiment.

As shown in FIG. 22, the electronic control system 51 includes a cooperation control unit 70. When a cooperative driving mode is selected by manually operating the selection switch 50, the cooperation control unit 70 causes the vehicle body to automatically travel in cooperation with another vehicle that has the same specifications. The cooperation control unit 70 includes a communication module 71 that wirelessly communicates with another vehicle to exchange information regarding cooperative travel with the other vehicle, including information regarding the positions of the vehicle bodies, with each other, and a cooperative driving control unit 30E that performs cooperative driving control based on information from the other vehicle. The cooperative driving control unit 30E includes, for example, a control program that realizes execution of cooperative driving control, and is provided in the main ECU 30. The configuration, functions, and effects of the cooperative driving control unit 30E are as described above in the first embodiment.

As shown in FIGS. 19 to 22, and the like, similar to the first embodiment, the cabin 4 includes, for example, a roof frame 72, front pillars 73, center pillars 74, rear pillars 75, a front panel 76, door panels 77, side panels 78, and a rear panel 79.

The right and left front pillars 73 are provided on the front side of the vehicle body relative to a center of the wheelbase L of the vehicle body. The right and left front pillars 73 are provided such that, when viewed from the front side, an upper half portion thereof is curved toward the right/left center of the vehicle body as it approaches the upper side of the upper half portion; and such that, when viewed from the side, the upper half portion thereof is curved toward the front-rear center of the vehicle body as it approaches the upper side of the upper half portion. A direction indicator 108 (blinker) is supported on each of the right and left front pillars 73. Also, a rearview mirror 101 is supported at a position above the direction indicator 108 of each of the right and left front pillars 73. The rearview mirror 101 is rotatable about a vertical shaft and adjustable, the mirror being adjustable forward, rearward, leftward, and rightward.

As shown in FIGS. 19 to 22, the cabin 4 includes an auxiliary frame 90 that extends rearward from the upper end portions of the right and left rear pillars 75. The auxiliary frame 90 supports the rear-side obstacle detector 102, the monitoring camera 66 for capturing images on the rear side, and the like.

Regarding Obstacle Searcher of Second Embodiment

As shown in FIGS. 19, 21, and 22, the obstacle searchers 68 are set at positions at least above the right and left front wheels 9 of the vehicle body. Thus, for example, even if, during work travel, any obstacle searcher 68 has approached the ground of a farm field due to rolling or pitching of the vehicle body resulting from unevenness of the farm field, or the like, the distances between the obstacle searchers 68 and the ground in such a case can be kept larger than the search distance of the obstacle searchers 68.

In other words, the obstacle searchers 68 are located at appropriate height positions at which it is possible to avoid, even if, during work travel, the vehicle body rolls or pitches due to unevenness of the farm field or the like, the risk of the ground of the farm field entering the search distance of the obstacle searchers 68. Thus, it is possible to prevent the obstacle searchers 68 from misdetecting the ground of a farm field as an obstacle due to rolling or pitching of the vehicle body during work travel.

The search-target areas Y of the obstacle searchers 68 include first search-target areas Y1, second search-target areas Y2, third search-target areas Y3, and fourth search-target areas Y4.

The obstacle searchers 68 include: a pair of right and left first obstacle searchers 68E set for the first search-target areas Y1 on the lateral sides of the rear end portion of the main part of the vehicle body; a pair of right and left second obstacle searchers 68F set for the second search-target areas Y2 on the lateral sides of the front/rear intermediate portions of the vehicle body; a pair of right and left third obstacle searchers 68G set for the third search-target areas Y3 located on the lateral sides of the front/rear intermediate portions of the vehicle body and forwardly of the second obstacle searchers 68F; and a pair of right and left fourth obstacle searchers 68H set for the fourth search-target areas Y4 on the front side of the vehicle body.

As shown in FIGS. 19 to 21, the two first obstacle searchers 68E are attached to rear portions of the rear fenders 12. More specifically, the first obstacle searchers 68E are attached to the right and left rear fenders 12 at positions on the rear side of the rear wheel shaft 10A of the right and left rear wheels 10. The first obstacle searchers 68E can each detect an obstacle that is present in the corresponding first search-target area Y1. The first search-target areas Y1 are set to extend laterally outward and downward from the first obstacle searchers 68E.

The two second obstacle searchers 68F are attached to front portions of the rear fenders 12. The second obstacle searchers 68F can each detect an obstacle that is present in the corresponding second search-target area Y2. The second search-target areas Y2 are set to extend laterally outward and downward from the second obstacle searchers 68F.

The two third obstacle searchers 68G are attached to the right and left front pillars 73 of the cabin 4 that are located at front/rear intermediate portions of the vehicle body. The third obstacle searchers 68G can each detect an obstacle that is present in the corresponding third search-target area Y3. The third search-target areas Y3 are set to extend laterally outward and downward from the third obstacle searchers 68G.

As shown in FIGS. 19 to 22, of the above-described eight obstacle searchers 68, the pair of right and left fourth obstacle searchers 6811 are attached to the up/down intermediate portions of the front end portion of the hood 16, with a predetermined distance between each other in the right-left direction. The fourth obstacle searchers 6811 can each detect an obstacle that is present in the corresponding fourth search-target area Y4. With the right and left fourth obstacle searchers 68H, the search-target areas Y on the front side of the vehicle body can be increased in the right-left direction. The fourth search-target areas Y4 are set to extend laterally outward and downward from the fourth obstacle searchers 68H.

As shown in FIG. 19 and the like, the third obstacle searchers 68G and the obstacle detectors 65 are arranged below the rearview mirrors 101.

The first search-target areas Y1 of the first obstacle searchers 68E shown in FIGS. 23 and 24, and the second detection-target areas X2 of the rear-side obstacle detectors 102 are each appropriately adjustable according to the type or the width in the right-left direction of the work implement apparatus W.

Also, the detection-target areas X have limits that are set at the outer edges of the areas, so that detection of the ground, instead of an obstacle, can be prevented. Note that, in FIG. 24, the ends in the right-left direction of the first detection-target areas X1 are straight, which are schematically shown for convenience of illustration.

With the above-described attaching, the right and left lateral sides of the rear portion of the main part of the vehicle body, in which the right and left rear fenders 12 and the like are arranged, are the first search-target areas Y1 of the right and left first obstacle searchers 68E; the front side of the rear wheels 10 of the main part of the vehicle body, in which the right and left rear fenders 12 and the like are arranged, are the second search-target areas Y2 of the right and left second obstacle searchers 68F; and the right and left lateral sides of the front/rear intermediate portions of the vehicle body, in which the right and left front pillars 73 and the like are arranged, are the third search-target areas Y3 of the right and left third obstacle searchers 68G. In other words, with the right and left first obstacle searchers 68E, the right and left second obstacle searchers 68F, and the right and left third obstacle searchers 68G, larger areas on the lateral sides of the vehicle body that are larger in length in the front-rear direction can be set as the search-target areas Y. As a result, it is possible to thoroughly search for an obstacle that has approached and entered the immediate range of the vehicle body on the lateral sides of the vehicle body.

As a result, it is possible to more reliably keep, based on a search performed by each obstacle searcher 68, the vehicle body from shifting to a travel state when a moving obstacle (such as an animal or an object rolling with wind) has approached the stopped vehicle body, and keep the vehicle body during automated driving from coming into contact with the obstacle.

As shown in FIG. 20, the right and left first obstacle searchers 68E are attached to the right and left rear fenders 12 via right and left support members. In other words, the right and left first obstacle searchers 68E are respectively located above the lateral outer ends of the right and left rear wheels 10. Accordingly, the right and left first obstacle searchers 68E can favorably search for an obstacle without interference from the right and left rear wheels 10.

As shown in FIGS. 19 to 21, the right and left third obstacle searchers 68G are attached to the right and left front pillars 73. In other words, the right and left third obstacle searchers 68G are respectively located between the right and left front wheels 9 and the right and left rear wheels 10. Accordingly, the search-target areas Y of the right and left third obstacle searchers 68G can include the areas between the right and left front wheels 9 and the right and left rear wheels 10, and thus the right and left third obstacle searchers 68G can detect presence or absence of an obstacle between the right and left front wheels 9 and the right and left rear wheels 10.

As shown in FIGS. 19 to 22, the attachment orientation of the left-side first obstacle searcher 68E is set to a downward left orientation in which its transmission/reception surface is directed downward and left. The attachment orientation of the right-side first obstacle searcher 68E is set to a downward right orientation in which its transmission/reception surface is directed downward and right. The attachment orientation of the left-side second obstacle searcher 68F is set to a leftward orientation in which its transmission/reception surface is directed laterally left. The attachment orientation of the right-side second obstacle searcher 68F is directed to rightward orientation in which its transmission/reception surface is directed laterally right. The attachment orientation of the left-side third obstacle searcher 68G is set to a downward left orientation in which the transmission/reception surface is directed downward and left. The attachment orientation of the right-side third obstacle searcher 68G is set to a downward right orientation in which its transmission/reception surface is directed downward and right. The orientations of attaching the right and left fourth obstacle searchers 68H are set to forward orientations in which their transmission/reception surfaces are directed forward.

The areas indicated by bold long dash-dotted lines in FIG. 24 are areas in which an obstacle that is present at a position lower than a predetermined height can be detected by the obstacle detectors 65. Furthermore, the areas indicated by thin long dash-dotted lines in FIG. 24 are areas in which an obstacle that is present at a position lower than the predetermined height cannot be detected by the obstacle detectors 65.

As shown in FIGS. 23 and 24, the first search-target areas Y1 of the first obstacle searchers 68E, the second search-target areas Y2 of the second obstacle searchers 68F, and the third search-target areas Y3 of the third obstacle searchers 68G cover the areas on the lateral sides of the vehicle body (blind areas of the obstacle detectors 65) that are not included in the detection-target areas X of the obstacle detectors 65, and an obstacle can be detected in these areas.

Therefore, as a result of the areas that are not included in the detection-target areas X of the obstacle detectors 65 being covered by the search-target areas Y of the obstacle searchers 68, blind areas in which an obstacle cannot be detected can be reduced in the surroundings of the vehicle body.

Accordingly, it is possible to accurately detect an obstacle present in the surroundings of the vehicle body in a traveling state, and stop traveling of the vehicle body before coming into contact with the obstacle. Also, if a moving obstacle (such as an animal or an object rolling in the wind) has moved and approached the vicinity of the vehicle body in a stopped state, it is possible to accurately detect this obstacle and prevent the vehicle body from shifting from the stopped state to the travel state, thereby avoiding an issue such as the travel apparatuses 2 or the work implement apparatus W running over the obstacle.

Other Configurations of Second Embodiment

Hereinafter, other configurations obtained by modifying the above-described second embodiment will be described. A plurality of combinations of the configurations of the second embodiment are possible without contradicting each other, and may be applied as the second embodiment. Note that the scope of the present invention is not limited to content described in the configurations below.

[2-1] The work vehicle does not need to include a pair of right and left obstacle detectors 65. Specifically, the first detection-target area X1 of the left obstacle detector 65 and the first detection-target area X1 of the right obstacle detector 65 may be arranged in a right/left asymmetrical shape. Also, only one obstacle detector 65 may be provided on the right or left side.

[2-2] The obstacle detectors 65 do not need to be attached to the front pillars 73. For example, the obstacle detectors 65 may be attached to the rearview mirrors 101. Also, for example, the obstacle detectors 65 may also be attached to frames located in the vicinity of the direction indicators 108. By arranging the obstacle detectors 65 in the vicinity of the direction indicators 108, wiring can be realized such that a harness for the obstacle detectors 65 and a harness for the direction indicators 108 can be joined together.

[2-3] Instead of the cabin 4, a gate-shaped ROPS (Roll Over Protective Structure) frame may be provided that is located behind the driver's seat 22, and includes a beam portion that couples a pair of right and left column portions and upper end portions of the right and left column portions. In this case, the obstacle detectors 65 may be attached to the ROPS frame. Specifically, the obstacle detectors 65 may be attached to the column portions of the ROPS frame, or the beam portion of the ROPS frame.

[2-4] The driver part 17 may be provided with a protruding frame that spans between the leading end of the foot place where the foot of an onboard person is located, and the hood 16. In this case, the obstacle detectors 65 may be attached to the protruding frame.

[2-5] The first obstacle searchers 68E and the second obstacle searchers 68F may be attached to members other than the rear fenders 12.

[2-6] The obstacle detectors 65 may be apparatuses other than laser scanners.

[2-7] The obstacle detectors 65 may be arranged at positions that are deviated from respective spaces between the outer ends, in the right-left direction, of the hood 16, and the outermost positions M of the main part of the vehicle body.

[2-8] The obstacle detectors 65 may be arranged at positions other than front/rear intermediate portions of the main part of the vehicle body.

[2-9] The first detection-target areas X1 of the obstacle detectors 65 may be set to be inclined only in the front-rear direction with respect to a horizontal plane, or may be set to be inclined only in the right-left direction with respect to the horizontal plane.

[2-10] The obstacle searchers 68 may be apparatuses other than ultrasonic sensors. For example, an infrared range sensor or the like may be employed as each obstacle searcher 68.

[2-11] The right and left first obstacle searchers 68E are arranged at positions higher than headlights 107 provided in the front end portion of the hood 16.

[2-12] Ten or more obstacle searchers 68 may be provided, or if the work vehicle is short in length, six or less obstacle searchers 68 may be provided.

[2-13] The work vehicle may have a semi-crawler type configuration in which it is provided with right and left crawlers, instead of the right and left rear wheels 10.

[2-14] The work vehicle may have a full-crawler type configuration in which it is provided with right and left crawlers instead of the right and left front wheels 9 and the right and left rear wheels 10.

[2-15] The work vehicle may be of a two-wheel drive type in which either the right and left front wheels 9 or the right and left rear wheels 10 are driven.

[2-16] The work vehicle may have an electric type configuration in which it is provided with an electric motor instead of the engine 6.

[2-17] The work vehicle may have a hybrid type configuration in which it is provided with the engine 6 and an electric motor.

Third Embodiment

The following describes, as an example of a mode for carrying out the present invention, a third embodiment in which the present invention is applied to a tractor, which is an example of a work vehicle, with reference to the drawings.

Figure 26:
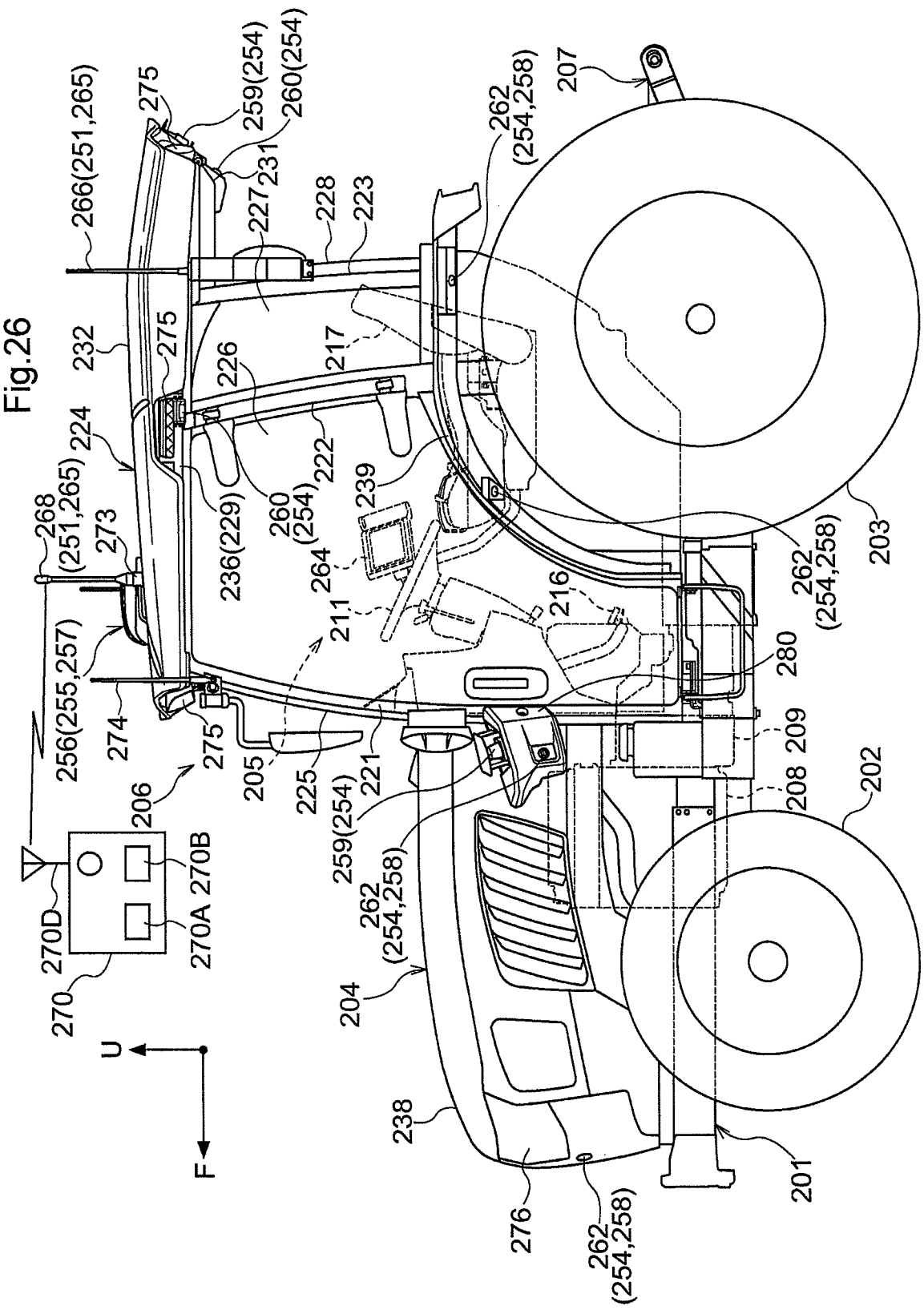

Note that an arrow with a reference mark F in FIG. 26 indicates the front side of the tractor, and an arrow with a reference mark U indicates the upper side of the tractor.

Figure 27:
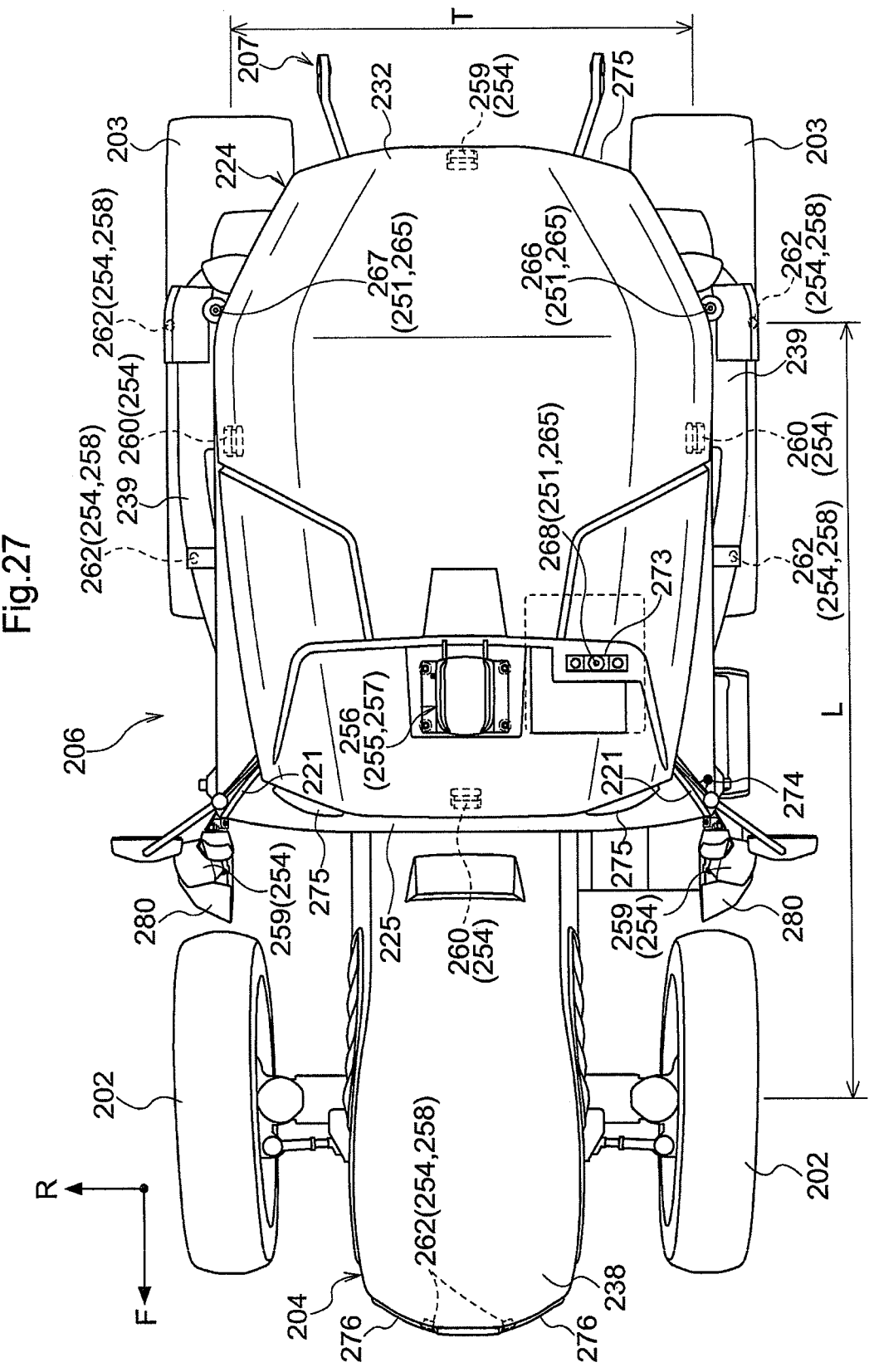

Furthermore, an arrow with a reference mark F in FIG. 27 indicates the front side of the tractor, and an arrow with a reference mark R indicates the right side of the tractor.

As shown in FIGS. 26 to 33, the tractor illustrated as an example of the third embodiment include: a vehicle body frame 201 that spans between the front and rear ends of the vehicle body; right and left front wheels 202 that function as drivable and steering wheels; right and left rear wheels 203 that function as driving wheels; a prime mover part 204 that is located in a front portion of the vehicle body frame 201; a cabin 206 that includes a boarding space and a driver part 205 in a rear portion of the vehicle body frame 201; a three-point linkage mechanism 207 that is attached to a rear end portion of the vehicle body frame 201 to be moved up and down, and is used to couple a work implement apparatus thereto; and the like.

As shown in FIG. 26, the tractor includes: an engine 208 that is located in the prime mover part 204; a pedal-operation type main clutch 209 that connects or disconnects power from the engine 208; a speed change power transmission unit (not shown) that splits power transmitted via the main clutch 209 into travel power and work power, and performs speed change; right and left side brakes (not shown) that act on the right and left rear wheels 203; and the like. An electronic control type diesel engine that is provided with a common rail system is employed as the engine 208.

Figure 30:
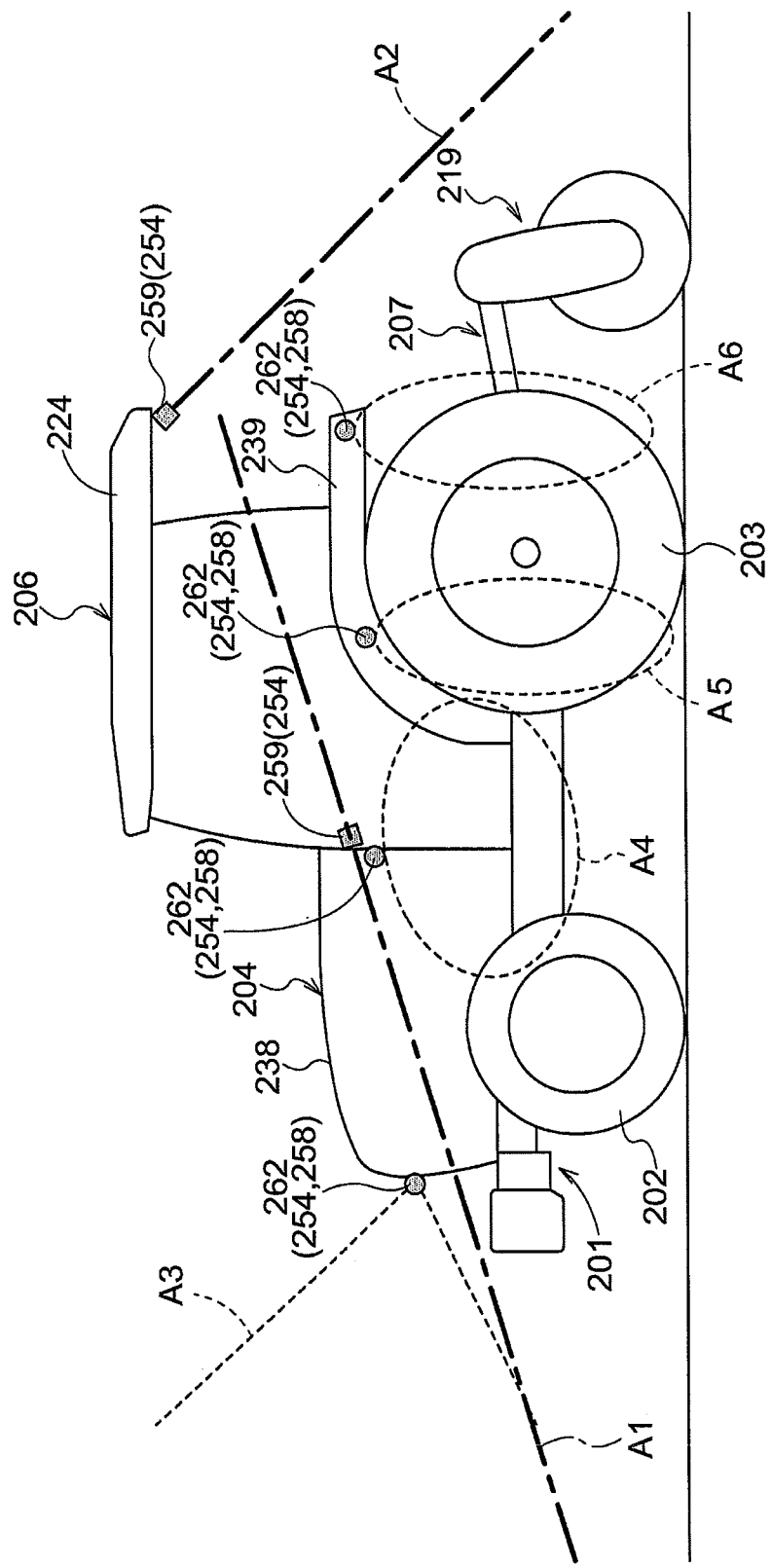
Figure 31:
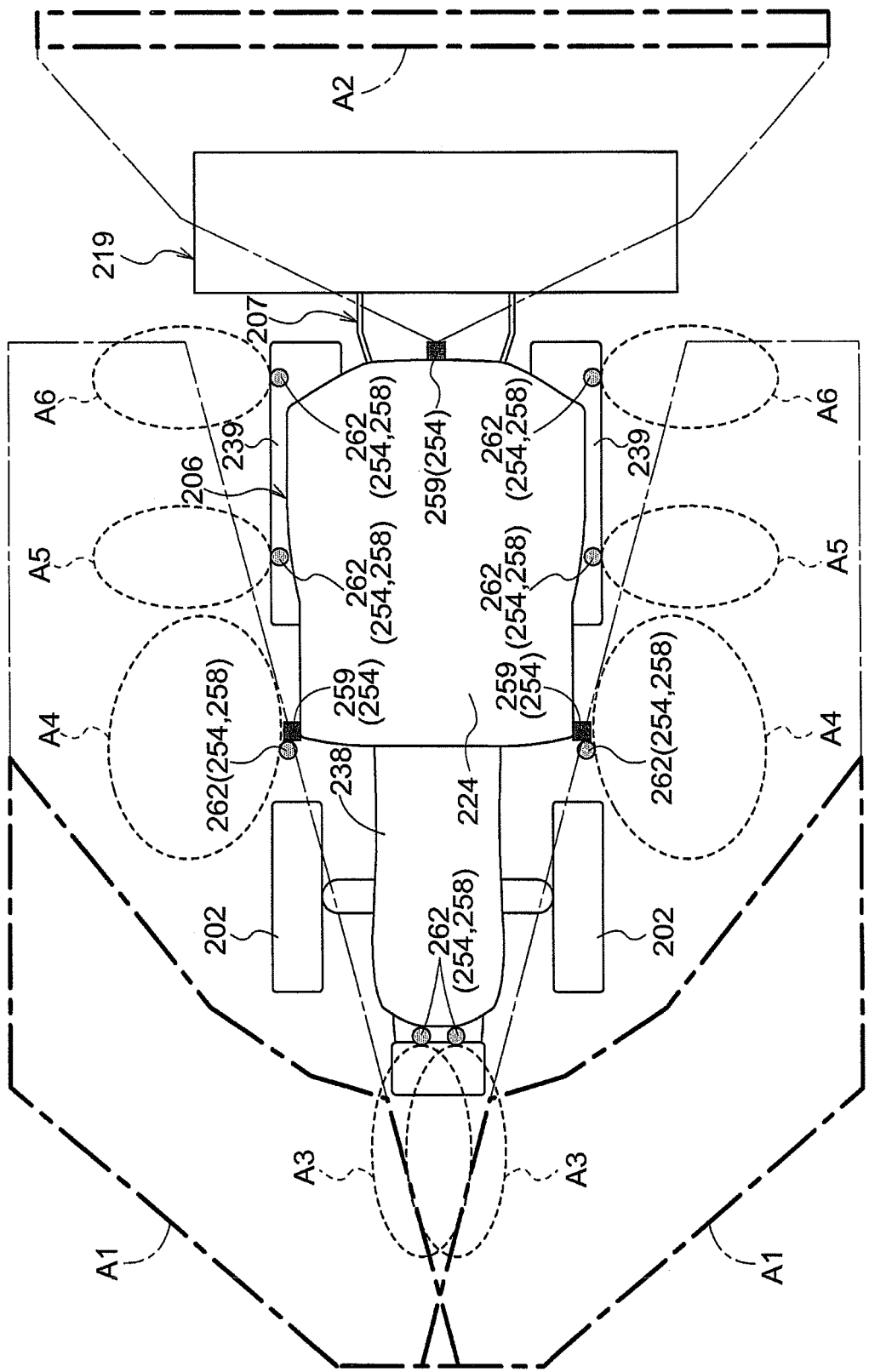
Figure 33:
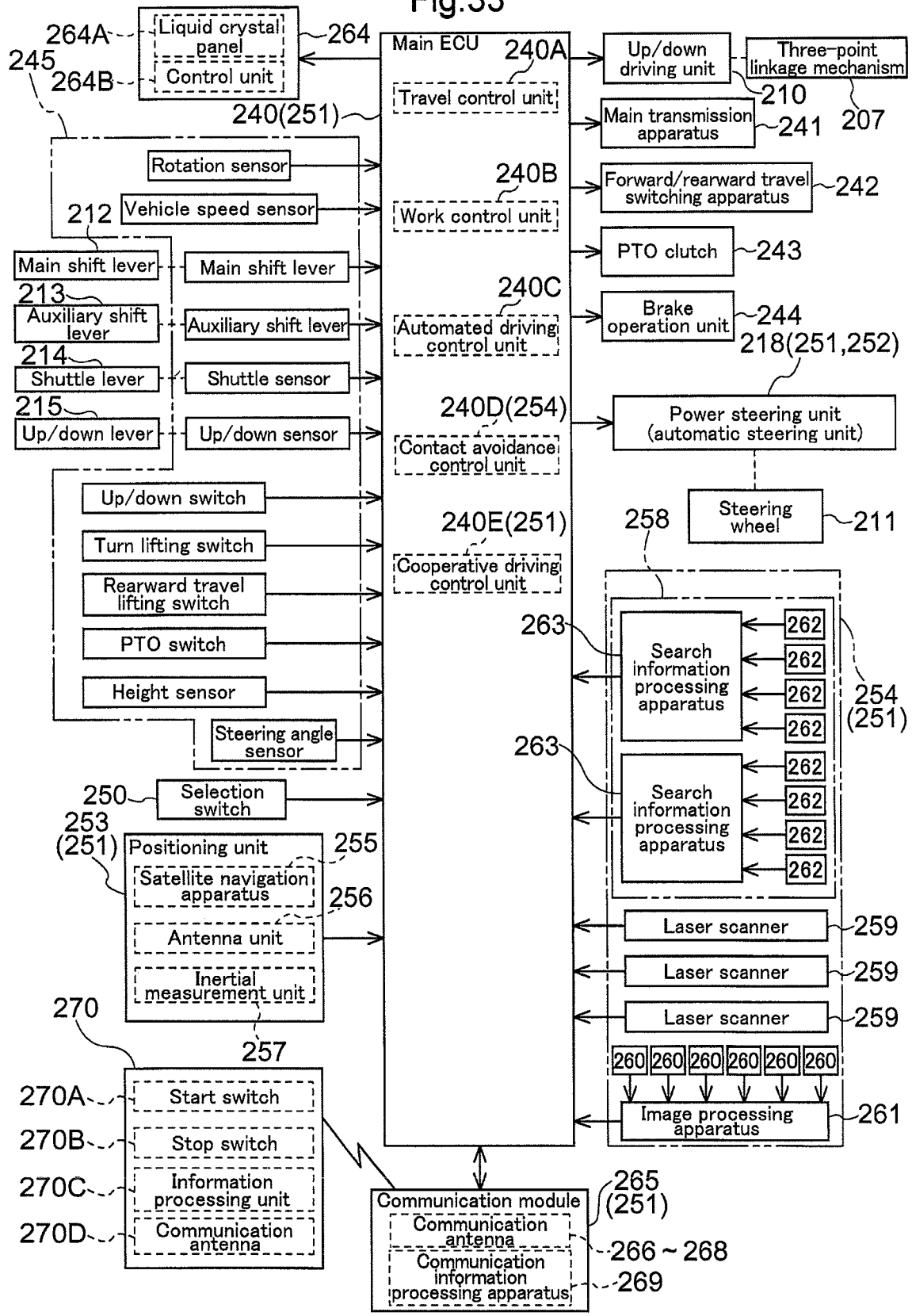
FIG. 33 is a block diagram illustrating a schematic configuration of a control system according to the third embodiment.

As shown in FIGS. 30 to 31 and 33, the three-point linkage mechanism 207 is driven to be moved up/down under an action made by an electronic hydraulic control type up/down driving unit 210 provided in the vehicle body. A work implement apparatus 219 such as a rotary cultivating apparatus, a plow, a disc harrow, a cultivator, a subsoiler, a sowing apparatus, and a spraying apparatus is coupled to the three-point linkage mechanism 207. If the work implement apparatus 219 coupled to the three-point linkage mechanism 207 is of a driving type such as a rotary cultivating apparatus, work power taken from the rear portion of the vehicle body is transmitted to the work implement apparatus 219 via an external power transmission shaft or the like.

As show in FIGS. 26 and 33, the driver part 205 includes, for example, various manual operation devices, such as a steering wheel 211 for manual steering that enables manual steering of the right and left front wheels 202; a main shift lever 212; an auxiliary shift lever 213; a shuttle lever 214 for switching to forward travel and rearward travel; an up/down lever 215 for setting the height position of a work implement apparatus 219; an up/down switch for making an instruction to move the work implement apparatus 219 up and down; a turn lifting switch, a rearward travel lifting switch, a PTO switch, a clutch pedal 216 that enables operation of the main clutch 209; and right and left brake pedals (corresponding to the brake pedals 49 in FIG. 6) that enable operation of the right and left side brakes, as well as the driver's seat 217. The steering wheel 211 is coupled to the right and left front wheels 202 via a full hydraulic type power steering unit 218, and the like.

As shown in FIGS. 26 to 29, the cabin 206 includes: right and left front pillars 221; right and left center pillars 222; right and left rear pillars 223; a roof 224 supported by the pillars 221 to 223; a front panel 225 that forms the front face of the front cabin 206; right and left door panels 226 supported by the right and left center pillars 222 so as to be able to be pivotally opened and closed; right and left side panels 227 that form the rear side faces of the cabin 206; a rear panel 228 that forms the rear face of the cabin 206; and the like.

The roof 224 includes: a roof frame 229 that is coupled to the pillars 221 to 223; a rear frame 230 that protrudes rearward from the roof frame 229; an inner roof (not shown) that is made of resin, and covers the roof frame 229 and the like from below; a rear cover 231 that covers the rear frame 230 and the like from below; an outer roof 232 that is made of resin, and covers the roof frame 229, the rear frame 230, and the like from above; and the like. The roof 224 has an inner space between the rear cover 231 and the inner roof, and the outer roof 232. The inner space houses an air conditioning unit (not shown) that enables air conditioning of the boarding space, a radio (not shown), and the like.

The roof frame 229 includes a front beam 235 that spans the right and left front pillars 221; right and left side beams 236 that respectively span the right and left front pillars 221, and the right and left rear pillars 223, a rear beam 237 that spans the right and left rear pillars 223, and the like. The roof frame 229 is substantially rectangular when viewed in a plan view.

As shown in FIG. 33, a main ECU 240, which is a main electronic control unit, is mounted on the vehicle body, and the main ECU 240 includes a travel control unit 240A that performs control regarding travel of the vehicle body, a work control unit 240B that performs control regarding the work implement apparatus 219, and the like. The main ECU 240 is connected to the above-described components, such as the electronic hydraulic control type up/down driving unit 210, an electronic control unit for the engine (corresponding to the engine ECU 31 shown in FIG. 7), an electronic control type main transmission apparatus 241, an electronic control type forward/rearward travel switching apparatus 242, an electronic control type PTO clutch 243, an electronic hydraulic type brake operation unit 244 that enables automatic operation of the right and left side brakes, and an in-vehicle information acquisition unit 245 that acquires in-vehicle information including the vehicle speed, so as to be able to communicate with them via an in-vehicle LAN such as a CAN or a communication line. An electronic control unit such as the main ECU 240 includes a microprocessor that includes a CPU, an EEPROM, and the like. The travel control unit 240A includes, for example, various control programs that realize control regarding the travel of the vehicle body. The work control unit 240B includes, for example, various control programs that realizes control regarding the work implement apparatus 219.

The main transmission apparatus 241, the forward/rearward travel switching apparatus 242, and the PTO clutch 243 are provided in the speed change power transmission unit, together with an auxiliary transmission apparatus (not shown) that performs stepwise transmission of travel power, a PTO transmission apparatus (not shown) that performs stepwise transmission of work power, and so on. A hydrostatic continuously variable transmission apparatus that performs stepless transmission of travel power is employed as the main transmission apparatus 241. The forward/rearward travel switching apparatus 242 also serves as a travel clutch that connects or disconnects travel power.

The in-vehicle information acquisition unit 245 includes various switches, such as the above-described up/down switch, a turn lifting switch, a rearward travel lifting switch, and a PTO switch, as well as various sensors, such as a rotation sensor that detects the output speed of the engine 208, a vehicle speed sensor that detects the output speed of the auxiliary transmission apparatus as the vehicle speed, a main shift sensor that detects the operation position of the main shift lever 212, an auxiliary shift sensor that detects the operation position of the auxiliary shift lever 213, a shuttle sensor that detects the operation position of the shuttle lever 214, an up/down sensor that detects the operation position of the up/down lever 215, a height sensor that detects the angle of up/down swing of the right and left lift arm (not shown) of the up/down driving unit 210 as the height position of the work implement apparatus 219, and a steering angle sensor that detects the steering angle of the front wheels 202.

The travel control unit 240A performs vehicle speed control to operate a trunnion shaft (not shown) of the main transmission apparatus 241 based on the output from the rotation sensor, the output from the vehicle speed sensor, the output from the main shift sensor, and the output from the auxiliary shift sensor, such that the vehicle speed reaches a control target vehicle speed obtained based on the engine speed, the operation position of the main shift lever 212, and the operation position of the auxiliary shift lever 213. Thus, the driver can change the vehicle speed to any vehicle speed by operating the main shift lever 212 to a certain operation position.

The travel control unit 240A performs forward/rearward travel switching control to switch the forward/rearward travel switching apparatus 242 to the power transmission state that corresponds to the operation position of the shuttle lever 214, based on the output from the shuttle sensor. Thus, the driver can set the travel direction of the vehicle body to the forward direction by operating the shuttle lever 214 to a forward travel position. Also, the driver can set the travel direction of the vehicle body to the rearward direction by operating the shuttle lever 214 to a rearward travel position.

The work control unit 240B performs position control to control the action of the up/down driving unit 210 based on the output from the up/down sensor and the output from the height sensor, such that the work implement apparatus 219 is located at the height position that corresponds to the operation position of the up/down lever 215. Thus, the driver can change the height position of the work implement apparatus 219 to any height position, by operating the up/down lever 215 to a certain operation position.

Upon the up/down switch being switched to a lifting instruction state in response to the up/down switch being manually operated, the work control unit 240B performs lifting control to control the action of the up/down driving unit 210 based on a lifting instruction from the up/down switch and the output from the height sensor, such that the work implement apparatus 219 is lifted to an upper limit position that has been determined in advance. Thus, the driver can make the work implement apparatus 219 be automatically lifted to the upper limit position by switching the up/down switch to the lifting instruction state.

Upon the up/down switch being switched to a lowering instruction state in response to the up/down switch being manually operated, the work control unit 240B performs lowering control to control the action of the up/down driving unit 210 based on a lowering instruction from the up/down switch, the output from the up/down sensor, and the output from the height sensor, such that the work implement apparatus 219 is lowered to a work height position that has been set using the up/down lever 215. Thus, the driver can make the work implement apparatus 219 be automatically lowered to the work height position by switching the up/down switch to the lowering instruction state.

When execution of turn-conjunctive lifting control is selected in response to the turn lifting switch being manually operated, the work control unit 240B automatically performs the above-described lifting control upon detecting that the steering angle of the front wheels 202 has reached a set angle for ridge edge turn based on the output from the steering angle sensor that detects the steering angle of the front wheels 202. Thus, by selecting execution of turn-conjunctive lifting control in advance, the driver can make the work implement apparatus 219 be automatically lifted to the upper limit position in conjunction with the start of a ridge edge turn.

When execution of rearward travel-conjunctive lifting control is selected in response to the rearward travel lifting switch being manually operated, the work control unit 240B automatically performs the above-described lifting control upon detecting that the shuttle lever 214 has been manually operated to the rearward travel position based on the output from the shuttle sensor. Thus, by selecting execution of rearward travel-conjunctive lifting control in advance, the driver can make the work implement apparatus 219 be automatically lifted to the upper limit position in conjunction with switching to rearward travel.

Upon the PTO switch being manually operated and the operation position of the PTO switch being switched to an ON position, the work control unit 240B performs clutch ON control to switch the PTO clutch 243 to an ON state based on the switching to the ON position, so that work power is transmitted to the work implement apparatus 219. Thus, the driver can activate the work implement apparatus 219 by operating the PTO switch to the ON position.

Upon the PTO switch being manually operated and the operation position of the PTO switch being switched to an OFF position, the work control unit 240B performs clutch OFF control to switch the PTO clutch 243 to an OFF state based on the switching to the OFF position, so that work power is not transmitted to the work implement apparatus 219. Thus, the driver can stop the work implement apparatus 219 by operating the PTO switch to the OFF position.

Upon the PTO switch being manually operated and the operation position of the PTO switch being switched to an automatic position, the work control unit 240B automatically performs the above-described clutch OFF control in conjunction with execution of the above-described lifting control, and automatically performs the above-described clutch ON control in conjunction with execution of the above-described lowering control. Thus, by operating the PTO switch to the automatic position in advance, the driver can stop the work implement apparatus 219 in conjunction with the automatic lifting of the work implement apparatus 219 to the upper limit position, or can activate the work implement apparatus 219 in conjunction with the automatic lowering of the work implement apparatus 219 to the work height position.

As shown in FIGS. 26 to 33, the tractor includes a selection switch 250 that enables the driver to select a driving mode, and an electronic control system 251 for automated driving that enables automated driving of the vehicle body. Also, this tractor has, as driving modes, a manual driving mode, an automated driving mode, and a cooperative driving mode. The electronic control system 251 includes the above-described main ECU 240, an automatic steering unit 252 that realizes automatic steering of the right and left front wheels 202, a positioning unit 253 that measures the position and orientation of the vehicle body, and a monitoring unit 254 that monitors the surroundings of the vehicle body, and the like.

As shown in FIG. 33, the automatic steering unit 252 is configured by the above-described power steering unit 218. When the manual driving mode is selected, the power steering unit 218 steers the right and left front wheels 202 based on an operation to rotate the steering wheels 211. Also, when the automated driving mode or the cooperative driving mode is selected, the power steering unit 218 steers the right and left front wheels 202 based on a control instruction from the main ECU 240.

With the above-described configuration, it is possible to automatically steer the right and left front wheels 202 without providing a steering unit that is dedicated to automatic steering. Also, if a failure occurs in the electrical system of the power steering unit 218, an onboard person can easily switch to manual steering, and continue driving the vehicle body.

As shown in FIGS. 26 to 29 and 33, the positioning unit 253 includes a satellite navigation apparatus 255 that measures the position and orientation of the vehicle body using a well-known GPS. In the third embodiment, similar to the first embodiment, an RTK-GPS is employed as the positioning method using the GPS.

The satellite navigation apparatus 255 includes a satellite navigation antenna unit 256 that receives radio waves transmitted from a GPS satellite (not shown) and positioning data transmitted from a reference station (not shown) located at a known position. The reference station transmits positioning data obtained by receiving radio waves from the GPS satellite, to the satellite navigation apparatus 255. The satellite navigation apparatus 255 obtains the position and orientation of the vehicle body based on positioning data obtained by receiving radio waves from the GPS satellite, and positioning data from the reference station.

The antenna unit 256 is attached to the roof 224 of the cabin 206, which is located at the top of the vehicle body, so as to increase sensitivity when receiving radio waves from a GPS satellite. Therefore, the position and orientation of the vehicle body measured using the GPS include positioning errors due to displacement of the antenna unit 256 resulting from yawing, pitching, or rolling of the vehicle body. Accordingly, the antenna unit 256 houses an IMU 257 (Inertial Measurement Unit) that includes a three-axis gyroscope (not shown) and a three-direction acceleration sensor (not shown), and measures, for example, the yaw angle, the pitch angle, and the roll angle of the vehicle body, so that correction can be performed to remove the above-described positioning errors. The IMU 257 is attached to a right/left intermediate portion of the upper surface of a front portion of the roof 224 of the cabin 206, together with the antenna unit 256, so as to be located at a central portion of a tread T and a central portion of a wheelbase L of the vehicle body in a plan view, so that the amount of displacement/offset of the above-described antenna unit 256 can be easily obtained (see FIG. 27).

As shown in FIG. 33, the main ECU 240 includes an automated driving control unit 240C that includes, for example, various control programs that realize automated driving of the vehicle body. The automated driving control unit 240C performs automated driving control to automatically drive the vehicle body when the automated driving mode or the cooperative driving mode is selected through a manual operation made to the selection switch 250. The automated driving control unit 240C transmits various control instructions to the travel control unit 240A, the work control unit 240B, and the like at appropriate points in time so that, during the automated driving control in the automated driving mode, the vehicle body automatically travels along a preset target travel path on a farm field at a set speed while appropriately performing work, based on, the target travel path and the result of positioning performed by the positioning unit 253. The travel control unit 240A controls the operations of the main transmission apparatus 241, the forward/rearward travel switching apparatus 242, and so on by transmitting various control instructions to the main transmission apparatus 241, the forward/rearward travel switching apparatus 242, and so on at appropriate points in time, based on various control instructions from the automated driving control unit 240C, various types of information acquired by the in-vehicle information acquisition unit 245, and so on. The work control unit 240B controls the operations of the up/down driving unit 210, the PTO clutch 243, and so on by transmitting various control instructions to the up/down driving unit 210, the PTO clutch 243, and so on at appropriate points in time, based on various control instructions from the automated driving control unit 240C, various types of information acquired by the in-vehicle information acquisition unit 245, and so on.

The target travel path may be obtained by converting, into data, a travel path along which the vehicle travelled during work travel while being manually driven in a farm field, the start point of a ridge edge turn, and so on, based on the result of positioning performed by the positioning unit 253. Alternatively, the target travel path may be obtained by converting, into data, a travel path along which the vehicle travelled during teaching travel while being manually driven in a farm field, the start point of a ridge edge turn, and so on, based on the result of positioning performed by the positioning unit 253, for example.

As shown in FIGS. 26 to 33, the monitoring unit 254 includes: an obstacle detection module 258 that detects an obstacle that has approached and entered an immediate range (e.g. within 1 m) of the vehicle body; three front and rear laser scanners 259 (examples of obstacle detectors) that detect an approaching obstacle within a short range (e.g. within 10 m) of the vehicle body; a contact avoidance control unit 240D that performs contact avoidance control to avoid coming into contact with an obstacle; four monitoring cameras 260 that capture images of the surroundings of the vehicle body; an image processing apparatus 261 that processes images captured by the monitoring cameras 260; and the like.

As shown in FIGS. 26 to 32, and 34 to 35, each laser scanner 259 includes: a detection unit 259A that has a detection angle of up to about 270 degrees, and performs detection of an obstacle; a processing unit 259B that processes detection information from the detection unit 259A; and the like. Each detection unit 259A irradiates predetermined detection-target areas A1 to A2 (see FIGS. 30 to 32) with a laser beam and receives the reflected light. The processing unit 259B determines, for example, whether or not an obstacle has approached and entered a short range of the vehicle body, based on the period of time from irradiation to reception of the laser beam, and outputs the result of determination to the contact avoidance control unit 240D. Areas on the right and left lateral sides of the vehicle body, including the front side of the vehicle body, are set to the detection-target areas A1 of the right and left laser scanners 259 located on the front side. An area on the rear side of the work implement apparatus 219 and the like is set to the detection-target area A2 of the single laser scanner 259 located on the rear side.

As shown in FIGS. 26 to 28, and 30 to 33, the obstacle detection module 258 includes eight sonar devices 262 (examples of obstacle detectors) that detect an obstacle within an immediate range of the vehicle body, and two search information processing apparatuses 263 that perform determination processing to determine whether or not an obstacle has approached and entered the immediate range of the vehicle body based on search information from the sonar devices 262. The eight sonar devices 262 are distributed on the front end portion and the right and left end portions of the vehicle body such that the front side and the right and left sides of the vehicle body are the predetermined detection-target areas A3 to A6 (see FIGS. 30 to 31). Each sonar device 262 transmits search information obtained by performing a search to the corresponding search information processing apparatus 263. Each search information processing apparatus 263 performs determination processing to determine whether or not an obstacle has approached and entered the immediate range of the vehicle body based on the period of time from transmission to reception of an ultrasonic wave from the corresponding sonar device 262, and outputs the result of determination to the contact avoidance control unit 240D.

As a result, when an obstacle has unexpectedly approached and entered the immediate range of the vehicle body in the detection-target areas A3 on the front side of the vehicle body or the detection-target areas A4 to A6 on the lateral sides of the vehicle body, the obstacle detection module 258 detects the approaching obstacle. Also, no sonar device 262 is provided in a rear end portion of the vehicle body, and thus the obstacle detection module 258 is prevented from misdetecting the work implement apparatus 219 attached to the rear portion of the vehicle body so as to be able to move up and down, as an obstacle.

For example, when the vehicle body is traveling toward a ridge during automated driving, or when the vehicle body is traveling along a ridge at a ridge edge during automated driving, if the ridge has unexpectedly approached and entered the immediate range of the vehicle body, the obstacle detection module 258 detects the ridge as an obstacle. Also, if a moving object has unexpectedly approached and entered the immediate range of the vehicle body, the obstacle detection module 258 detects the moving object as an obstacle.

As shown in FIG. 33, the contact avoidance control unit 240D includes, for example, a control program that realizes execution of contact avoidance control, and is provided in the main ECU 240. Upon detecting by the contact avoidance control unit 240D that an obstacle has approached and entered the short range of the vehicle body based on the result of determination performed by each laser scanner 259 and each search information processing apparatus 263, the contact avoidance control unit 240D performs the above-described contact avoidance control in preference to a control operation performed by the automated driving control unit 240C.

In contact avoidance control, the contact avoidance control unit 240D outputs a deceleration instruction to the travel control unit 240A upon contact avoidance control starting. Accordingly, the contact avoidance control unit 240D causes the main transmission apparatus 241 to perform a deceleration operation through a control operation performed by the travel control unit 240A, thereby reducing the vehicle speed from a set speed for normal travel to a set speed for contact avoidance.

In this low-speed travel state, if the contact avoidance control unit 240D detects that an obstacle has approached and entered the immediate range of the vehicle body based on the result of determination performed by each laser scanner 259 and each search information processing apparatus 263, the contact avoidance control unit 240D outputs an emergency stop instruction to the travel control unit 240A and the work control unit 240B. As a result, the contact avoidance control unit 240D switches the forward/rearward travel switching apparatus 242 to the neutral state through a control operation performed by the travel control unit 240A, and causes the brake operation unit 244 to activate the right and left brakes, thereby braking the right and left front wheels 202 and the right and left rear wheels 203. Also, the contact avoidance control unit 240D causes the work control unit 240B to switch the PTO clutch 243 to an OFF state, and stop the action of the work implement apparatus 219. As a result, it is possible to promptly stop the vehicle body from traveling and stop the work implement apparatus 219 from operating, based on the fact that an obstacle has approached and entered the immediate range of the vehicle body, and it is possible to avoid the risk that the obstacle will come into contact with the vehicle body.

In a stop state in which the vehicle body is stopped, including an emergency stop state, if the contact avoidance control unit 240D detects that there is no obstacle within the short range of the vehicle body based on the result of determination performed by each laser scanner 259 and each search information processing apparatus 263, the vehicle body is allowed to shift from the stop state to the above-described low-speed travel state in accordance with a driving start instruction.

In the low-speed travel state, if the contact avoidance control unit 240D confirms that there is no obstacle within the short range of the vehicle body based on the result of determination performed by each laser scanner 259 and each search information processing apparatus 263, the contact avoidance control unit 240D outputs an acceleration instruction to the travel control unit 240A, and then ends the contact avoidance control. Thus, the contact avoidance control unit 240D causes the main transmission apparatus 241 to perform an acceleration operation through a control operation performed by the travel control unit 240A so that the vehicle speed is increased from the set speed for contact avoidance to the set speed for normal travel, and thereafter restarts automated driving that is based on a control operation performed by the automated driving control unit 240C.

As shown in FIGS. 26 to 29, and 33, a wide-angle CCD camera for visible light is employed in each monitoring camera 260. The monitoring cameras 260 are distributed at the front, rear, left, and right end positions of the roof 224 of the cabin 206 to capture images of the entire surroundings of the vehicle body.

The image processing apparatus 261 processes video signals from the monitoring cameras 260, generates an image of objects on the front side of the vehicle body, an image of objects on the right side of the vehicle body, an image of objects on the left side of the vehicle body, an image of objects on the rear side of the vehicle body, a bird's eye image seen from right above the vehicle body, and so on, and transmits the images to the display unit 264 in the boarding space, and the like. The display unit 264 includes, for example, a control unit 264B that changes an image displayed on a liquid crystal panel 264A, based on, for example, a manual operation made with various operation switches (not shown) displayed on the liquid crystal panel 264A.

With the above-described configuration, during the manual driving mode, displaying images from the image processing apparatus 261 on the liquid crystal panel 264A makes it easier for the driver to visually check the state of the surroundings of the vehicle body and the state of work during operation. Thus, the driver can easily drive the vehicle body in a preferable manner according to the type of work, and so on. Also, during the automated driving mode or the cooperative driving mode, when an administrator rides in the vehicle body, displaying images from the image processing apparatus 261 on the liquid crystal panel 264A makes it easier for the administrator to visually check the state of the surroundings of the vehicle body and the state of work during automated driving or cooperative driving. If the administrator visually recognizes an abnormality in the surroundings of the vehicle body, the state of work, or the like during automated driving or cooperative driving, the administrator can promptly and appropriately address the abnormality according to the type of abnormality, the degree of abnormality, and so on.

As shown in FIGS. 26 to 29, and 33, the electronic control system 251 includes a communication module 265 that wirelessly communicates with another vehicle or the like to exchange various pieces of information, and a cooperative driving control unit 240E that performs cooperative driving control based on information from the other vehicle, or the like. The cooperative driving control unit 240E includes, for example, a control program that realizes execution of cooperative driving control, and is provided in the main ECU 240.

During automated driving control in the cooperative driving mode, the automated driving control unit 240C transmits various control instructions to the travel control unit 240A, the work control unit 240B, and so on at appropriate points in time so that the vehicle body automatically travels along a preset target travel path for side-by-side travel at a set speed while appropriately performing work, based on, for example, the target travel path for side-by-side travel and the result of positioning performed by the positioning unit 253.

The cooperative driving control unit 240E performs, during the cooperative driving control, inter-vehicle distance determination processing and inter-vehicle distance optimization processing. In the inter-vehicle distance determination processing, the cooperative driving control unit 240E determines whether or not the distance between the vehicle and another preceding vehicle in the forward travel direction, the distance between the vehicle and the other preceding vehicle in the side-by-side direction, and the like are appropriate, based on the target travel path for side-by-side travel of the vehicle, the result of positioning performed by the positioning unit 253, the target travel path for side-by-side travel of the other vehicle, position information regarding the other vehicle, and so on. If any of the distances between the vehicles is inappropriate, the cooperative driving control unit 240E performs the inter-vehicle distance optimization processing in preference to a control operation performed by the automated driving control unit 240C, so that the distance between the vehicles is appropriate.

Also, in the inter-vehicle distance optimization processing, if the distance between the vehicles in the forward travel direction is shorter than an appropriate distance, the cooperative driving control unit 240E outputs a deceleration instruction to the travel control unit 240A. Thus, the cooperative driving control unit 240E causes the main transmission apparatus 241 to perform a deceleration operation through a control operation performed by the travel control unit 240A, thereby returning the distance between the vehicles in the forward travel direction to the appropriate distance. Upon the distance between the vehicles in the forward travel direction returning to the appropriate distance, the cooperative driving control unit 240E restarts automated driving that is based on a control operation performed by the automated driving control unit 240C, thereby increasing the vehicle speed to the set speed for normal travel and keeping the distance between the vehicles in the forward travel direction at the appropriate distance.

If the distance between the vehicles in the forward travel direction is longer than the appropriate distance, the cooperative driving control unit 240E outputs an acceleration instruction to the travel control unit 240A. Thus, the cooperative driving control unit 240E causes the main transmission apparatus 241 to perform an acceleration operation through a control operation performed by the travel control unit 240A, thereby returning the distance between the vehicles in the forward travel direction to the appropriate distance. Upon the distance between the vehicles in the forward travel direction returning to the appropriate distance, the cooperative driving control unit 240E restarts automated driving that is based on a control operation performed by the automated driving control unit 240C, thereby decreasing the vehicle speed to the set speed for normal travel and keeping the distance between the vehicles in the forward travel direction at the appropriate distance.

On the other hand, if the distance between the vehicles in the side-by-side direction is longer than the appropriate distance, the cooperative driving control unit 240E outputs a steering instruction to the travel control unit 240A to travel toward the other vehicle. Thus, the cooperative driving control unit 240E causes the right and left front wheels 202 to steer toward the other vehicle through a control operation performed by the travel control unit 240A, thereby returning the distance between the vehicles in the side-by-side direction to the appropriate distance. Upon the distance between the vehicles in the side-by-side direction returning to the appropriate distance, the cooperative driving control unit 240E restarts automatic driving that is based on a control operation performed by the automated driving control unit 240C, thereby returning the travel direction of the vehicle body to the travel direction for normal travel and keeping the distance between the vehicles in the side-by-side direction at the appropriate distance.

If the distance between the vehicles in the side-by-side direction is shorter than the appropriate distance, the cooperative driving control unit 240E outputs a steering instruction to the travel control unit 240A to travel away from the other vehicle. Thus, the cooperative driving control unit 240E causes the right and left front wheels 202 to steer away from the other vehicle through a control operation performed by the travel control unit 240A, thereby returning the distance between the vehicles in the side-by-side direction to the appropriate distance. Upon the distance between the vehicles in the side-by-side direction returning to the appropriate distance, the cooperative driving control unit 240E restarts automatic driving that is based on a control operation performed by the automated driving control unit 240C, thereby returning the travel direction of the vehicle body to the travel direction for normal travel and keeping the distance between the vehicles in the side-by-side direction at the appropriate distance.

Thus, it is possible to automatically and appropriately drive the vehicle so as to perform side-by-side travel with another preceding vehicle while appropriately keeping the distance between the vehicles in the forward travel direction and the distance between the vehicles in the side-by-side direction.

As shown in FIGS. 26 to 28, and 33, the communication module 265 includes three communication antennas 266 to 268 with different frequencies, and a communication information processing apparatus 269. Each of the communication antennas 266 to 268 is located at an upper end of the cabin 206, so as to increase sensitivity in communication. The communication information processing apparatus 269 is located in an inner space of the roof 224 so as to improve waterproof and dustproof properties.

Of the three communication antennas 266 to 268, a first communication antenna 266 with the highest frequency band wirelessly communicates with, for example, the communication module 265 of another vehicle to exchange image information, which has a large amount of information, with each other. A second communication antenna 267 with the next highest frequency band wirelessly communicates with, for example, the communication module 265 of another vehicle to exchange in-vehicle information, such as the vehicle speed, other than the image information with each other. A third communication antenna 268 with the lowest frequency band wirelessly communicates with a remote controller 270 to exchange various types of information such as a driving start instruction and a driving stop instruction from the remote controller 270.

The first communication antenna 266 is attached to a front left end portion of the rear frame 230 of the roof 224 via a first supporter 271. The second communication antenna 267 is attached to a front right end portion of the rear frame 230 via a second supporter 272. The third communication antenna 268 is attached to a front left portion of the upper surface of the roof 224 via a third supporter 273. Note that a radio receiving antenna 274 is attached to the upper end portion of the left-side front pillar 221 of the cabin 206.

As shown in FIG. 33, the in-vehicle information acquisition unit 245, the laser scanners 259, the image processing apparatus 261, the search information processing apparatuses 263, and the like are communicably connected to the communication information processing apparatus 269 via the main ECU 240.

Accordingly, in-vehicle information, such as the vehicle speed, obtained by the in-vehicle information acquisition unit 245, monitoring information from each laser scanner 259 and each search information processing apparatus 263, and monitoring image information from the image processing apparatus 261, and the like can be appropriately communicated with another vehicle or the like via the respective dedicated communication antennas 266 to 268, and can be shared by the other vehicle performing cooperative travel. Also, by effectively using the shared in-vehicle information, monitoring information, and monitoring image information, it is easier to perform vehicle speed adjustment in association with the other vehicle performing cooperative travel, obstacle contact avoidance in association with the other vehicle performing cooperative travel, and the like. As a result, it is possible to more reliably avoid coming into contact with another vehicle that performs cooperative travel.

As shown in FIGS. 26 and 33, the remote controller 270 includes: a start switch 270A that outputs a driving start instruction upon being manually operated; a stop switch 270B that outputs a driving stop instruction upon being manually operated; an information processing unit 270C that processes various types of information such as a driving start instruction and a driving stop instruction, a communication antenna 270D that wirelessly communicates with the third communication antenna 268; and the like.

As shown in FIGS. 26 to 32, and 34 to 35, the right and left laser scanners 259 located in a front portion of the vehicle body are respectively attached to the right and left front pillars 221 via first mounting units 280 so that areas on the right and left lateral sides of the vehicle body, including the front side of the vehicle body, are the detection-target areas A1. The laser scanners 259 located on the front side are set in a laterally outward and forward inclination orientation such that the attachment orientation is inclined laterally outward of the vehicle body when viewed from the front, and is inclined forward when viewed from the side. The laser scanners 259 located on the front side have, as the detection-target areas A1 thereof, an inclination area such that it is inclined forward and downward to the ground, approaching the front side of the vehicle body, and it is inclined laterally outward and downward to the ground, approaching the laterally outside of the vehicle body. Note that, in FIG. 30, for convenience, the detection-target area A1 is schematically indicated by a straight line.

The laser scanner 259 located in a rear portion of the vehicle body is attached to a right/left intermediate portion of the rear frame 230 of the roof 224 via a second mounting unit 290, so that the rear portion of the work implement apparatus 219 is the main detection-target area A2. The rear-side laser scanner 259 is set to the rearward inclination orientation such that the attachment orientation is inclined to the rear side of the vehicle body when viewed from the side. The rear-side laser scanner 259 has, as the detection-target area A2 thereof, a trapezoidal (flared) inclination area such that it is inclined rearward and downward to the ground, approaching the rear side of the vehicle body, and it becomes large in width, in the right-left direction, toward the ground. Note that, in FIG. 30, for convenience, the detection-target area A2 is schematically indicated by a straight line.

Of the detection-target areas A1 and A2 of the laser scanners 259, the areas indicated by bold long dash-dotted lines are areas in which it is possible to detect an obstacle that is present in a height area lower than a predetermined height (see FIG. 31). Also, the areas indicated by fine long dash-dotted lines are areas in which it is impossible to detect an obstacle that is present in a height area lower than the predetermined height (see FIG. 31).

Of the eight sonar devices 262, two sonar devices 262 located in the front end portion of the vehicle body are attached to up/down intermediate portions of the front end portion of the hood 238, with a predetermined interval in the right-left direction. The sonar devices 262 located in the front end portion of the vehicle body are set, such that the detection-target areas A3 thereof are located above the detection-target areas A1 of the laser scanners 259 in the front portion of the hood 238 (see FIG. 30).

The two sonar devices 262 located in a front portion of the vehicle body are respectively attached to the right and left front pillars 221 via the first mounting units 280. The sonar devices 262 located in the front portion of the vehicle body are set, such that the detection-target areas A4 thereof are located below the detection-target areas A1 of the laser scanners 259 located laterally outward of the front pillars 221 between the front wheels 202 and the rear wheels 203 (see FIG. 30).

The two sonar devices 262 located in a rear portion of the vehicle body are attached to positions on the front side of the upper portions of the right and left rear fenders 239. The sonar devices 262 located in the rear portion of the vehicle body are set, such that the detection-target areas A5 thereof are located below the detection-target areas A1 of the laser scanners 259 located laterally outward on the front side of the rear wheels 203 (see FIG. 30).

The two sonar devices 262 located in the rear portion of the vehicle body are respectively attached to positions at the rear ends of the upper portions of the right and left rear fenders 239. The sonar devices 262 located in the rear portion of the vehicle body are set, such that the detection-target areas A6 thereof are located laterally outward on the rear side of the rear wheels 203, while being located below the detection-target areas A1 of the laser scanners 259 located on the front side of the work implement apparatus 219 (see FIG. 30).

In other words, as a result of the monitoring unit 254 including, in addition to the right and left laser scanners 259 that are located in the front portion of the vehicle body and have the detection-target areas A1 on the right and left lateral sides of the vehicle body including the front side of the vehicle body, and the laser scanner 259 that is located on the rear side of the vehicle body and has the main detection-target area A2 behind the work implement apparatus 219, the eight sonar devices 262 that have detection-target areas A3 to A6 in the blind areas of the laser scanners, it is possible to thoroughly and favorably detect an obstacle within a short range of the vehicle body in the surroundings of the vehicle body.

Figure 32:
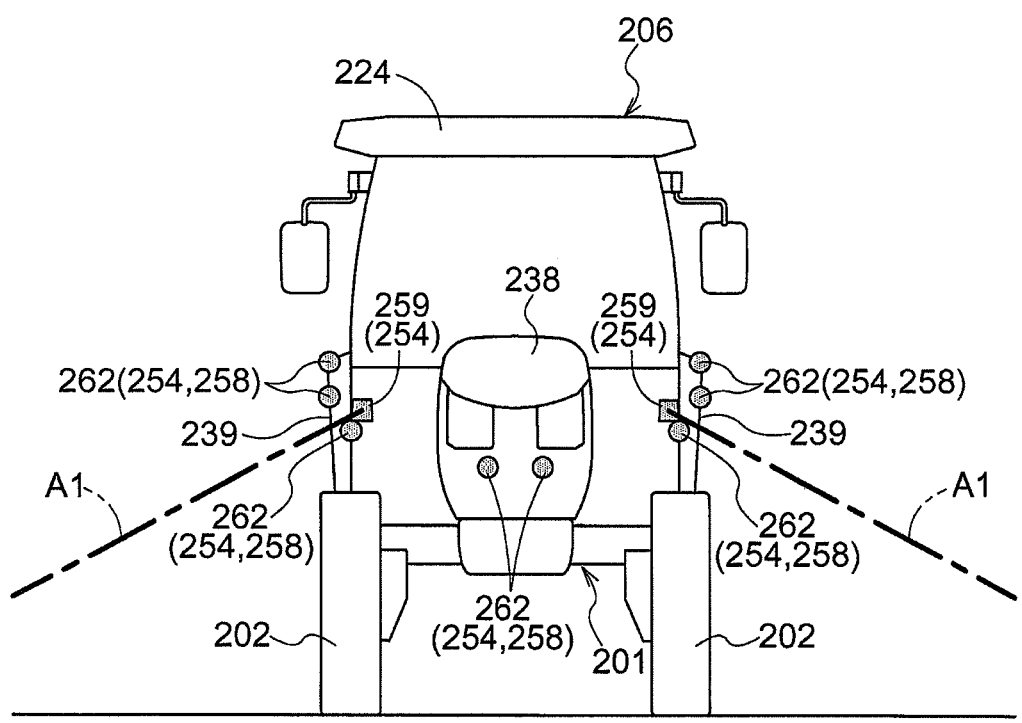

As shown in FIGS. 30 to 32, the detection-target areas A1 to A6 of the laser scanners 259 and the sonar devices 262 are appropriately set so that, even if, during work travel, the vehicle body has rolled or pitched due to unevenness of a farm field or the like, the ground of the farm field is prevented from entering the detection-target areas A1 to A6 of the laser scanners 259 and the sonar devices 262. Accordingly, it is possible to keep the laser scanners 259 and the sonar devices 262 from misdetecting the ground of the farm field as an obstacle, due to rolling or pitching of the vehicle body during work travel.

The detection-target areas A1 to A6 of the laser scanners 259 and the sonar devices 262 are controlled and set such that, in view of the relationship with the braking distance, the higher the vehicle speed, the larger the areas are in the direction away from the vehicle body.

The settings of the detection-target area A2 of the laser scanner 259 located in the rear portion of the vehicle body, and the detection-target areas A5 to A6 of the sonar devices 262 that are located in the rear portion of the vehicle body and are attached to the right and left rear fenders 239 can be changed depending on, for example, the type of work implement apparatus 219 or the width in the right-left direction.

Figure 28:
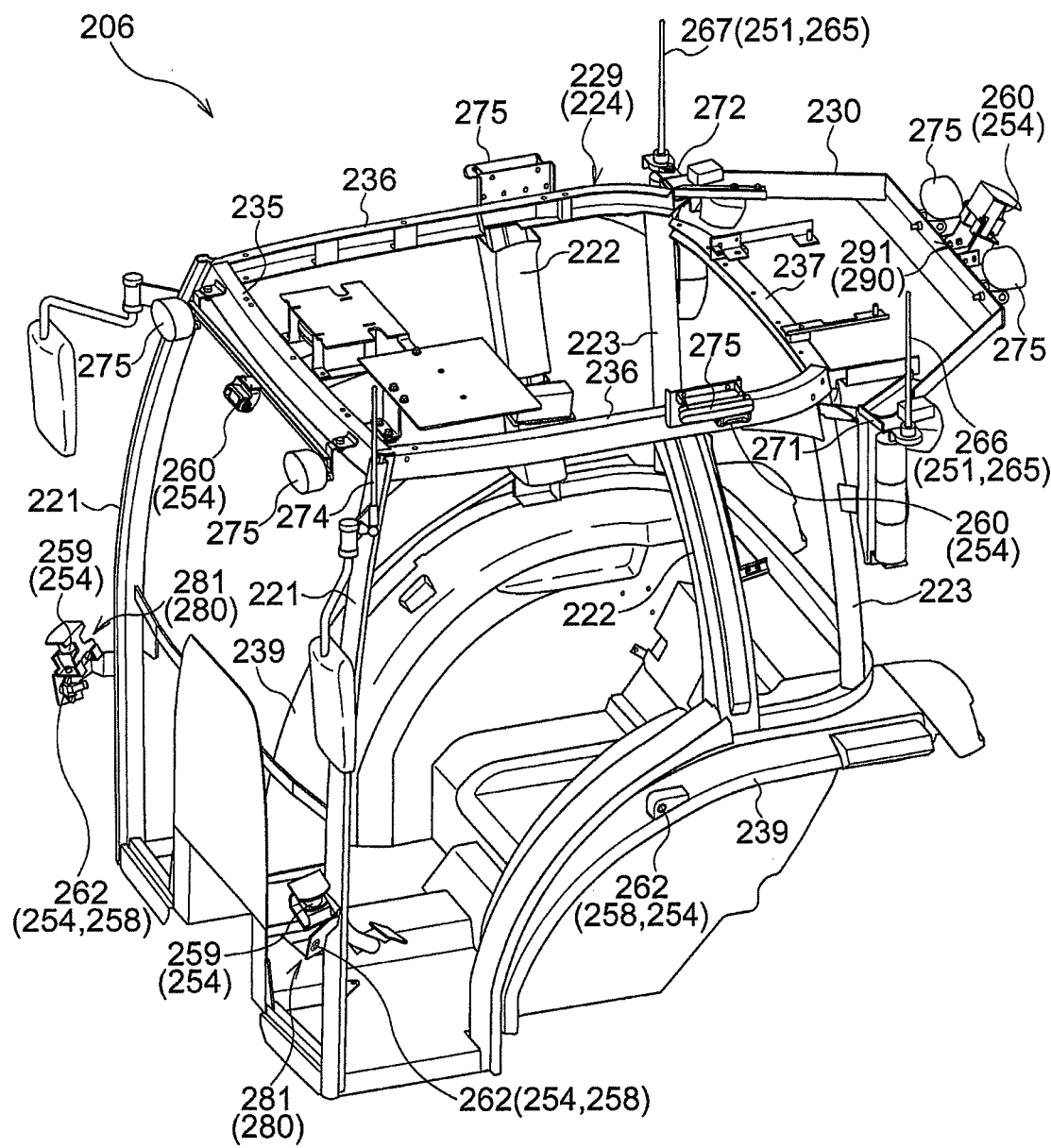
Figure 34:
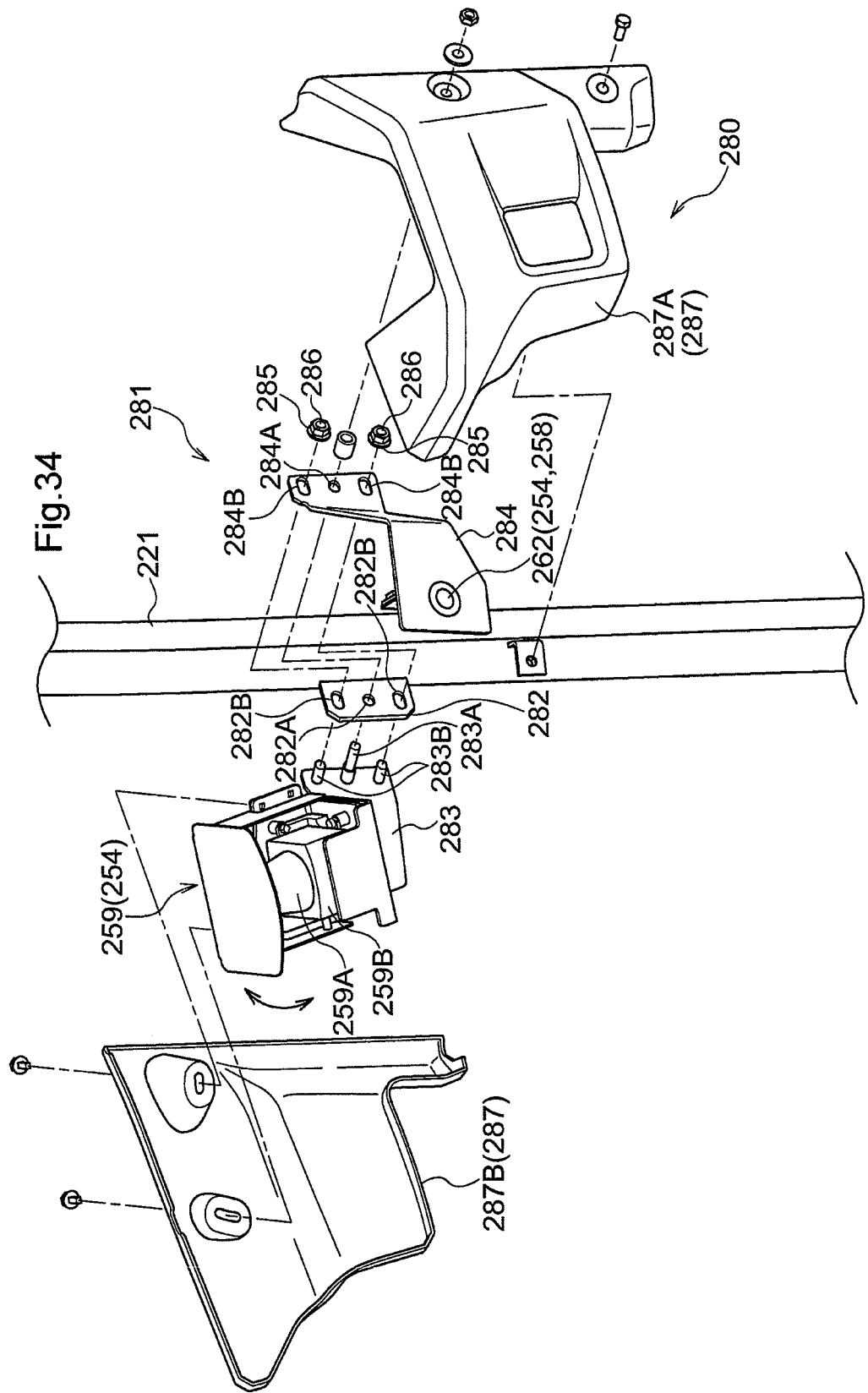
FIG. 34 is an exploded perspective view of the main portion that shows a configuration of a first mounting unit, according to the third embodiment.
Figure 35:
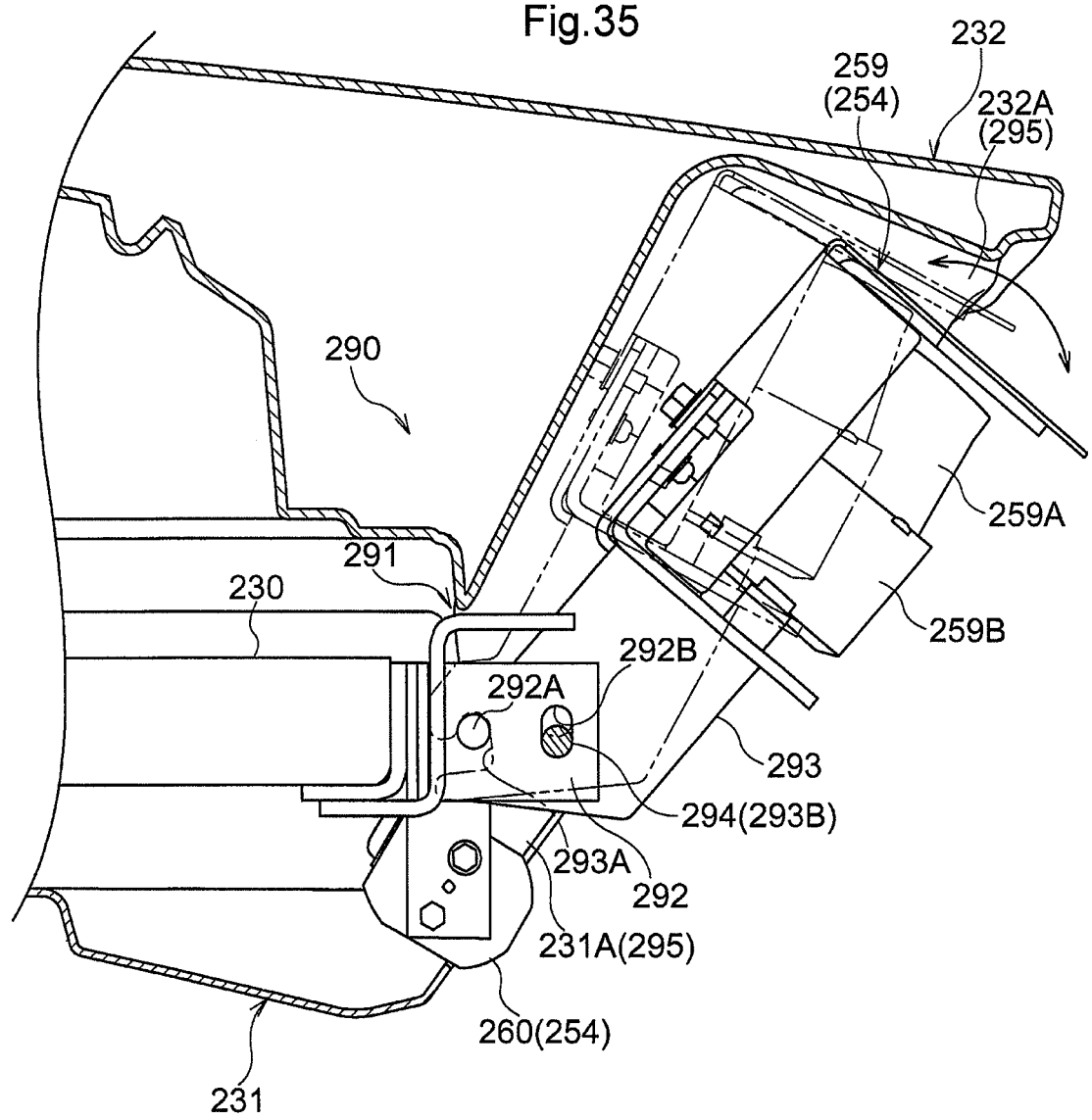
FIG. 35 is a side view in vertical section of the main portion that shows a configuration of a second mounting unit, according to the third embodiment.

As shown in FIGS. 28, and 34 to 35, the right and left first mounting units 280 each include a first adjustment mechanism 281 that adjusts the mounting angle, relative to the vehicle body, of each of the laser scanners 259 and the sonar devices 262 that are located in the front portion of the vehicle body. The second mounting unit 290 includes a second adjustment mechanism 291 that adjusts the mounting angle, relative to the vehicle body, of the laser scanner 259 that is located in the rear portion of the vehicle body.

Each of the right and left first mounting units 280 includes a fixing member 282 that is fixed to the right/left front pillar 221 associated therewith, a first support member 283 that supports the laser scanner 259 for performing detection in the detection-target area A1, and a second support member 284 that supports the sonar device 262 for performing detection in the detection-target area A4. Since the first support member 283 and the second support member 284 are mounted on the fixing member 282 such that the mounting angles thereof can be adjusted independently of each other, the first adjustment mechanism 281 enables individual adjustment of the mounting angles of the laser scanner 259 and the sonar device 262.

The second mounting unit 290 includes right and left fixing members 292 that are fixed to right/left intermediate portions of the rear frame 230, and an inverted U-shaped support member 293 that supports the laser scanner 259 for performing detection in the detection-target area A2. Since the support member 293 is mounted on the fixing members 292 such that the mounting angle thereof can be adjusted, the second adjustment mechanism 291 enables adjustment of the mounting angle of the laser scanner 259.

With this configuration, even if, due to a manufacturing error or the like, an error occurs in mounting angle, relative to the vehicle body, of any one of the right and left laser scanners 259 in the front portion of the vehicle body, the laser scanner 259 in the rear portion of the vehicle body, and the right and left sonar devices 262 in the front portion of the vehicle body, the first adjustment mechanism 281 or the second adjustment mechanism 291 easily adjusts the mounting angle of the laser scanner 259 or the sonar device 262 to an appropriate mounting angle.

Accordingly, it is possible to avoid the risk that any one of the detection-target areas A1, A2 and A4 of the laser scanners 259 and the sonar devices 262 will shift.

As a result, for example, when, due to the above-described shift in the detection-target area A1, A2 or A4 of the laser scanner 259 or the sonar device 262, the vehicle body rolls or pitches due to unevenness of a farm field or the like during work travel for example, or when a front wheel 202 or a rear wheel 203 is stuck in the ground of the farm field, it is possible to avoid an issue such as a case where the ground of the farm field or the like may enter any of the detection-target areas A1, A2 and A4 of the above-described laser scanners 259 or sonar devices 262, and is detected as an obstacle by the laser scanner 259 or the sonar device 262, a case where, when the right and left front wheels 202 are steered, any of the right and left front wheels 202 enters the detection-target area A1 or A4 of the above-described laser scanner 259 or sonar device 262 located in the front portion of the vehicle body, and is detected as an obstacle by the laser scanner 259 or the sonar device 262, or a case where, when, for example, the work implement apparatus 219 is operated to move upward to the upper limit position, the work implement apparatus 219 enters the detection-target area A2 of the above-described laser scanner 259 located in the front portion of the vehicle body, and is detected as an obstacle by this laser scanner 259.

Also, in each of the right and left first mounting units 280, the laser scanner 259 and the sonar device 262 are attached to a single fixing member 282, and thus, it is possible to realize simplification of the configuration by reducing the number of fixing members 282, compared with a case where, for example, the laser scanner 259 and the sonar device 262 are respectively attached to dedicated fixing members 282.

As shown in FIG. 34, in the right and left first mounting units 280, each first support member 283 includes: a single lateral pivot shaft 283A; and a pair of screw shafts 283B that are located parallel to the pivot shaft 283A, the pair of screw shafts 283B being located at positions facing each other in the up-down direction with the pivot shafts 283A interposed therebetween. Each of the second support member 284 and the fixing member 282 includes a single circular hole 284A, 282A through which the pivot shaft 283A is inserted, and a pair of elongate holes 284B, 282B through which the pair of screw shafts 283B are inserted. Each first adjustment mechanism 281 is configured such that the laser scanner 259 and the sonar device 262 are attached to the fixing member 282 so that the angles can be individually adjusted around the pivot shaft, using the above-described pivot shaft 283A, the pair of screw shafts 283B, the circular hole 284A, 282A, the pair of elongate holes 284B, 282B, a pair of washers 285 that are externally fitted to the pair of screw shafts 283B, and a pair of nuts 286 that are screwed to the pair of screw shafts 283B.

In the layout in which the fixing member 282 is located between the first support member 283 and the second support member 284, the pivot shaft 283A of the first support member 283 is inserted into the circular hole 282A of the fixing member 282 and the circular hole 284A of the second support member 284 from the inner side of the fixing member 282 with respect to the vehicle body, and the screw shafts 283B of the first support members 283 are inserted into the elongate holes 282B of the fixing member 282 and the elongate holes 284B of the second support member 284. Whereby, the right and left first mounting units 280 are configured so that the angle of each of the support members 283 and 284 can be adjusted individually around the pivot shaft within a range of the elongate holes 282B, 284B with respect to the fixing member 282. Also, after the adjustment of the angles of the support members 283 and 284, the nuts 286 are screwed to the screw shafts 283B, and the fixing member 282 is interposed between the first support member 283 and the second support member 284, and thus the support members 283 and 284 are each fixed to the fixing member 282 at a suitable mounting angle.

Accordingly, it is possible to individually adjust the mounting angles of the laser scanner 259 and the sonar device 262 in a front portion of the vehicle body to the respective appropriate mounting angles.

In other words, while simply configuring each of the right and left first adjustment mechanisms 281 with: a single pivot shaft 283A and a pair of screw shafts 283B that are provided on a first support member 283; circular holes 284A and 282A formed in a second support member 284 and a fixing member 282, and a pair of elongate holes 284B and 282B; a pair of washers 285; and a pair of nuts 286, it is possible to individually adjust the mounting angles of the laser scanner 259 and the sonar device 262 located in a front portion of the vehicle body to the respective appropriate mounting angles, and avoid the risk that a shift will occur in the detection-target area A1 or A4 of the laser scanner 259 and the sonar device 262 that are located in the front portion of the vehicle body.

As shown in FIG. 35, in the second mounting unit 290, the right and left fixing members 292 have a pivot shaft 292A that extends in the right-left direction, and each have an elongate hole 292B located rearward of the pivot shaft 292A.

The support member 293 includes right and left engaging parts 293A that engage with the pivot shaft 292A to be pivotally moved up and down, and right and left female screw parts 293B into which right and left bolts 294 inserted into the elongate holes 292B are screwed. The second adjustment mechanism 291 is used to attach the laser scanner 259 to the fixing members 292 so that the angle can be adjusted in the up-down direction, using the above-described pivot shaft 292A extending in the right-left direction, the right and left elongate holes 292B, the right and left engaging part 293A, right and left female screw parts 293B, and the right and left bolts 294.

With the above-described configuration, the second mounting unit 290 has a configuration in which, as a result of the engaging parts 293A of the support member 293 engaging with the pivot shaft 292A of the fixing members 292, and the bolts 294 inserted into the elongate holes 292B of the fixing members 292 being screwed into the female screw parts 293B of the support members 293, the support members 293 can realize angle adjustment of the right and left fixing members 292 in the up-down direction in a range of the elongate holes 292B. Also, after the angle adjustment of the support members 293, the bolts 294 are further screwed into the female screw parts 293B, thereby fixing the support members 293 at any mounting angle to the right and left fixing members 282. Accordingly, it is possible to adjust the mounting angle of the laser scanner 259 on the rear side of the vehicle body to an appropriate mounting angle.

In other words, while simply configuring the second adjustment mechanism 291 with: the pivot shaft 292A provided on the right and left fixing member 292; the elongate holes 292B; the right and left engaging parts 293A and the right and left female screw parts 293B provided on the support members 293; and the right and left bolts 294, it is possible to adjust the mounting angle of the laser scanner 259 on the rear side of the vehicle body to an appropriate mounting angle, and avoid the risk that a shift will occur in the detection-target area A2 of the laser scanner 259 located on the rear side of the vehicle body.

Figure 29:
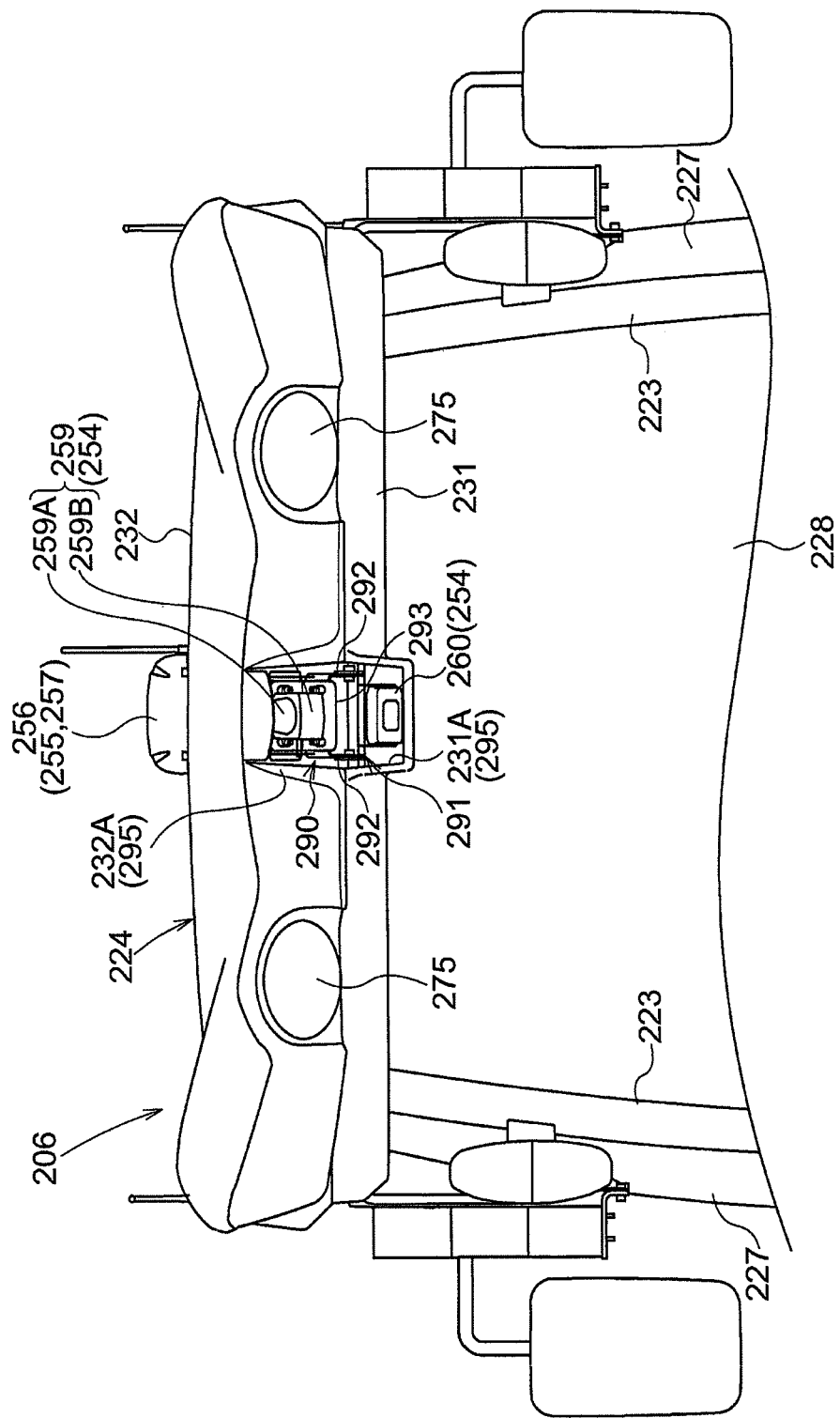

As shown in FIGS. 29, and 34 to 35, the first mounting unit 280 includes a first cover 287 that covers and hides the first adjustment mechanism 281. The second mounting unit 290 includes a second cover 295 that covers and hides the second adjustment mechanism 291. Accordingly, it is possible to suppress the risk of the first adjustment mechanism 281 or the second adjustment mechanism 291 being unintentionally operated by a user, and the mounting angle of the laser scanners 259 or the sonar devices 262 in a front portion of the vehicle body being inappropriately changed.

As shown in FIG. 34, the first cover 287 includes an outer cover part 287A that is made of resin and is attached to the center pillar 222 and the fixing member 282 of the first adjustment mechanism 281, and an inner cover part 287B that is made of resin and is attached to the laser scanner 259, and the first cover 287 is configured so as to be dividable in the right-left direction.

As shown in FIGS. 29 and 35, the second cover 295 is constituted by a first recessed portion 231A that is formed at a right/left intermediate portion of the rear end portion of the rear cover 231 of the roof 224, and a second recessed portion 232A that is formed at a right/left intermediate portion of the rear end portion of the outer roof 232 of the roof 224. In other words, the rear end portion of the rear cover 231 and the rear end portion of the outer roof 232 are also used as constituent components of the second cover 295.

As shown in FIGS. 26 to 29, and 36 to 38, the monitoring unit 254 includes six lights 275 that each have multiple LEDs and illuminate the image capture target position of the corresponding monitoring camera 260. Accordingly, even during night work, each monitoring camera 260 can favorably capture an image of the surroundings of the vehicle body. Also, effectively using the images of the surroundings by sharing them with another vehicle that performs cooperative travel makes it easier to perform, even during night work in which visibility deteriorates, vehicle speed adjustment with the other vehicle that is performing cooperative travel, contact avoidance to avoid coming into contact with an obstacle in association with the other vehicle that performs cooperative travel, and the like.

Of the six lights 275, two are front-side lights 275 that illuminate the front side of the vehicle body, and are provided to the right and left of the front-side monitoring cameras 260. One is a right-side light 275 that illuminates the right side of the vehicle body, and is provided above the right-side monitoring camera 260. One is a left-side light 275 that illuminates the left side of the vehicle body, and is provided above the left-side monitoring camera 260. Two are rear-side lights 275 that illuminate the rear side of the vehicle body, and are provided to the right and left of the rear-side monitoring cameras 260.

Figure 36:
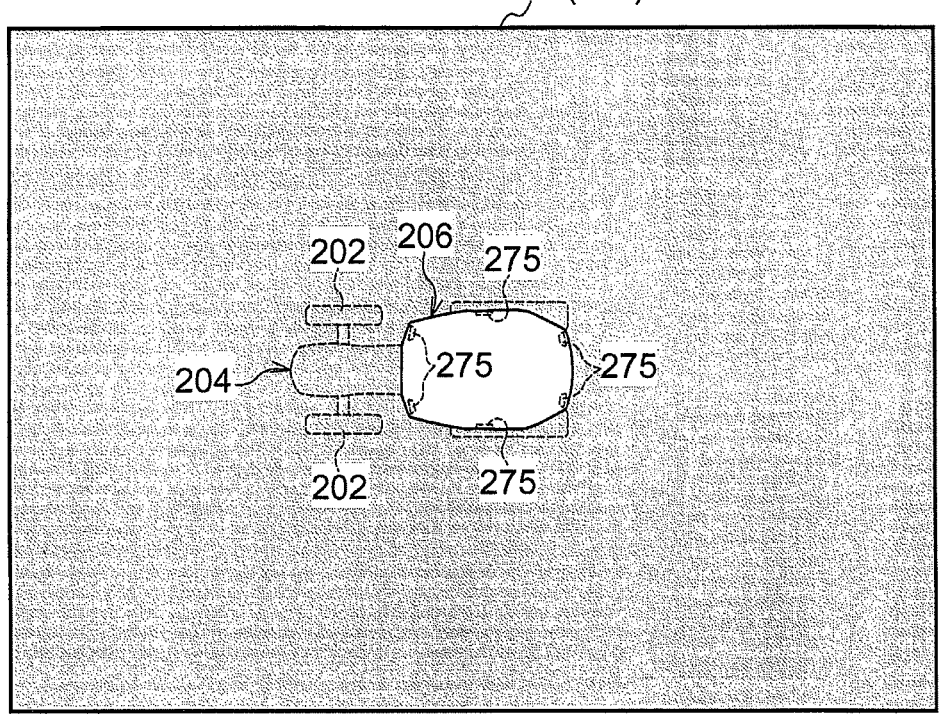
FIG. 36 is a bird's eye view illustrating a total light-off state, in which all lights are turned off, at night according to the third embodiment.

FIG. 36 shows a situation in which, in a total light-off state in which all of the lights 275 are turned off at night, a bird's eye image obtained by processing video signals from the monitoring cameras 260 is displayed on the liquid crystal panel 264A of the display unit 264. In this total light-off state, it is, of course, not possible to visually recognize an obstacle from the bird's eye image displayed on the liquid crystal panel 264A.

Figure 37:
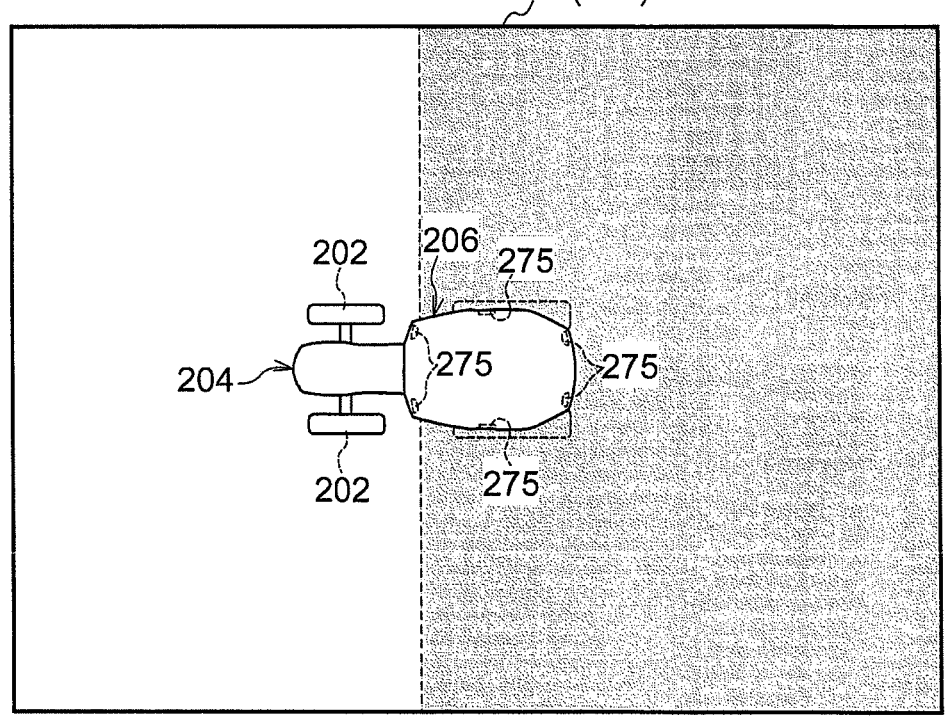
FIG. 37 is a bird's eye view illustrating a forward illumination state, in which only two forward lights are turned on, at night according to the third embodiment.

FIG. 37 shows a situation in which, in a forward illumination state in which only two front-side lights 275 are turned on at night, a bird's eye image obtained by processing video signals from the monitoring cameras 260 is displayed on the liquid crystal panel 264A of the display unit 264. In this forward illumination state, a predetermined area on the front side of the vehicle body extending from the front end portion of the cabin 206 in which the two front-side lights 275 are arranged can be favorably illuminated, and thus it is possible to visually recognize an obstacle that is present in the predetermined area on the front side of the vehicle body, from the bird's eye image displayed on the liquid crystal panel 264A.

Figure 38:
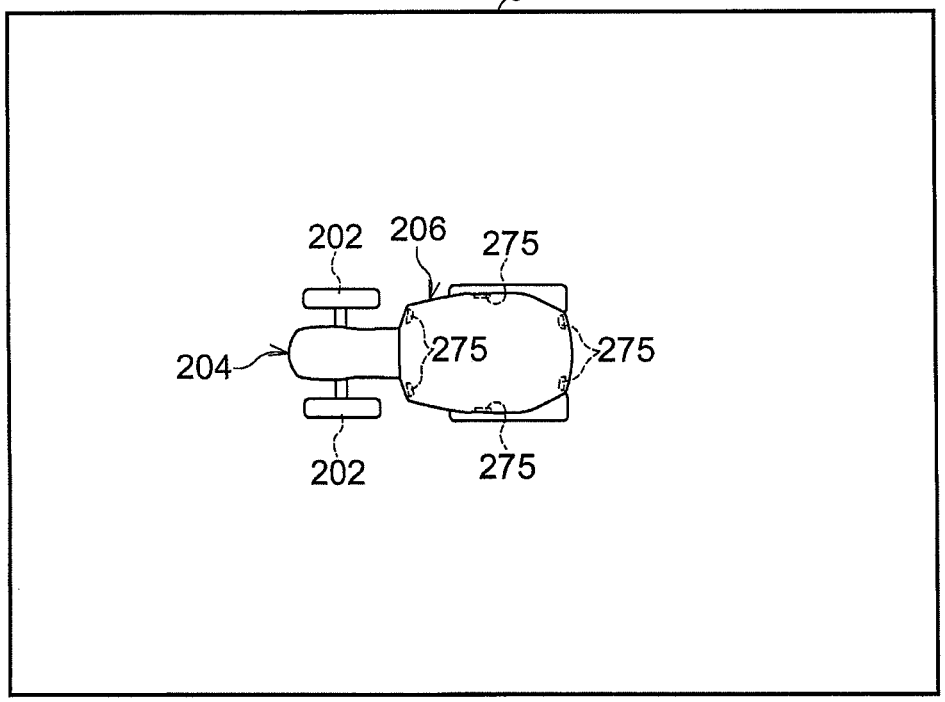
FIG. 38 is a bird's eye view illustrating an all light-on state, in which all lights are turned on, at night according to the third embodiment.

FIG. 38 shows a situation in which, in an all light-on state in which all of the lights 275 are turned on at night, a bird's eye image obtained by processing video signals from the monitoring cameras 260 is displayed on the liquid crystal panel 264A of the display unit 264. In this all light-on state, a predetermined area in the surroundings of the vehicle body from the front, rear, left, and right sides of the cabin 206 at which the lights 275 are arranged can be favorably illuminated, and thus it is possible to visually recognize an obstacle that is present in the predetermined area in the surroundings of the vehicle body from the bird's eye image displayed on the liquid crystal panel 264A.

As shown in FIGS. 26 to 27, right and left headlights 276 are provided at upper portions of the front end of the hood 238. Accordingly, during night travel, by turning on the right and left headlights 276, it is possible to favorably illuminate the front side of the vehicle body, thus making it easier to perform night travel.

Other Configurations of Third Embodiment

The present invention is not limited to the configurations exemplified in the above-described third embodiment. Hereinafter, other representative configurations of the present invention will be given as examples.

[3-1] The configurations given as examples below may be employed in the work vehicle.

For example, the work vehicle may have a semi-crawler type configuration in which it is provided with right and left crawlers instead of the right and left rear wheels 203.

For example, the work vehicle may have a full-crawler type configuration in which it is provided with right and left crawlers instead of the right and left front wheels 202 and the right and left rear wheels 203.

For example, the work vehicle may be of a two-wheel drive type in which either the right and left front wheels 202 or the right and left rear wheels 203 are driven.

For example, the work vehicle may have an electric type configuration in which it is provided with an electric motor instead of the engine 208.

For example, the work vehicle may have a hybrid type configuration in which it is provided with the engine 208 and an electric motor.

For example, the work vehicle only needs to have, as a driving mode, at least one of a manual driving mode, an automated driving mode, and a cooperative driving mode.

For example, the work vehicle may include a protection frame instead of the cabin 206.

For example, the work vehicle may include only either the obstacle detectors (laser scanners 259) or the obstacle detectors (sonar devices 262).

[3-2] Various changes may be made to, for example, the layout or the number of obstacle detectors (laser scanners 259) according to the configuration, dimensions, and the like of the work vehicle.

For example, when the work vehicle is provided with a protection frame instead of the cabin 206, an obstacle detector (laser scanner 259) may be located at a right/left intermediate portion of the upper portion of the protection frame.

For example, the work vehicle may include one obstacle detector on the front side of the vehicle body (laser scanner 259), and the one obstacle detector may be located at a right/left intermediate portion of the upper portion of the prime mover part 204, or at a right/left intermediate portion of the front end portion of the roof 224 of the cabin 206.

For example, the work vehicle may include a pair of right and left obstacle detectors on the rear side of the vehicle body (laser scanners 259), and the pair of right and left obstacle detectors may be located at positions offset from a right/left intermediate portion of the rear end portion of the roof 224 of the cabin 206 in a right/left symmetrical manner.

[3-3] Various changes may be made to, for example, the layout or the number of the obstacle detectors (sonar devices 262) according to the configuration, dimensions, and the like of the work vehicle.

For example, if the work vehicle is long in length, ten or more obstacle detectors (sonar devices 262) may be provided, and if the work vehicle is short in length, six or less obstacle detectors (sonar devices 262) may be provided.

For example, when the work vehicle is provided with a protection frame instead of the cabin 206, an obstacle detector (sonar device 262) may be attached to the protection frame.

[3-4] An infrared range sensor or the like may be employed as each obstacle detector (sonar device 262).

[3-5] Any or all of the two sonar devices 262 provided in the front end portion of the vehicle body, any or all of the two sonar devices 262 provided in the lateral rear portions of the vehicle body, and any or all of the two sonar devices 262 provided in the rear portion of the vehicle body may be attached to the vehicle body via the mounting units 280, 290 provided with the adjustment mechanisms 281, 291, so that the mounting angle thereof can be adjusted.

[3-6] Various modifications in the configuration of the first mounting unit 280 are possible.

For example, the first mounting unit 280 may have a configuration in which only the obstacle detectors (laser scanners 259) are mounted to the vehicle body so that the mounting angle can be adjusted.

For example, the first mounting unit 280 may have a configuration in which only the obstacle detectors (sonar device 262) are mounted to the vehicle body so that the mounting angle can be adjusted.

For example, the first mounting unit 280 may have a configuration in which three or more obstacle detectors (a laser scanner 259 and sonar devices 262) are mounted to the vehicle body so that the mounting angle can be individually adjusted.

For example, in the first mounting unit 280, the second support member 284 may have a single lateral pivot shaft, and a pair of screw shafts that are located in parallel to the pivot shaft, the pair of screw shafts being located at positions facing each other in the up-down direction, with the pivot shaft interposed therebetween, and the first support member 283 and the fixing member 282 may each have a single circular hole through which the pivot shaft is inserted, and a pair of elongate holes through which the pair of screw shafts are inserted.

For example, in the first mounting unit 280, the fixing member 282 may have a single lateral pivot shaft, and a pair of screw shafts that are located in parallel to the pivot shaft, the pair of screw shafts being located at positions facing each other in the up-down direction, with the pivot shaft interposed therebetween, and the first support member 283 and the second support member 284 may each have a single circular hole through which the pivot shaft is inserted, and a pair of elongate holes through which the pair of screw shafts are inserted.

[3-7] In the mounting units 280, 290, various modifications are possible in the configurations of the covers 287 and 295 that respectively cover and hide the adjustment mechanisms 281 and 291.

For example, the first cover 287 may be configured so as to be dividable in the up-down direction.

For example, the second cover 295 may be constituted by a dedicated member that covers and hides the second adjustment mechanism 291.

INDUSTRIAL APPLICABILITY

The present invention is applicable to a tractor that includes an electronic control system for automated driving that automatically drives the vehicle body, or a tractor that includes an obstacle detector that detects an obstacle in the surroundings of the vehicle body, and a mounting unit with which the obstacle detector is mounted to the vehicle body. Furthermore, the present invention is also applicable to, in addition to the tractor, a work vehicle such as a passenger mower, a combine, a passenger rice planter, or a wheel loader.

DESCRIPTION OF REFERENCE NUMERALS/MARKS

1: Vehicle body frame
2: Travel apparatus
3: Prime mover
4: Cabin
6: Engine
9: Front wheel
12: Rear fender
14: Radiator
16: Hood
16A: Opening
30D: Contact avoidance control unit
30F: Travel regulation control unit
51: Electronic control system
64: Obstacle detection module
65: Obstacle detector
65A: Detection unit
68: Obstacle searcher
68A: First range sensor 68B: Second range sensor
68C: Third range sensor
68D: Fourth range sensor
68E: First obstacle searcher
68F: Second obstacle searcher
73: Front pillar
92: Resonance-proof member
95: Resonance-proof member
97: Resonance-proof member
110: Support frame
112: Vibration-proof rubber
115: Dustproof member
M: Outermost position
X: Detection-target area
Y: Search-target area
259: Obstacle detector (laser scanner)
262: Obstacle detector (sonar device)
280: Mounting unit (first mounting unit)
281: Adjustment mechanism (first adjustment mechanism)
282: Fixing member
282A: Circular hole
282B: Elongate hole
283: Support member (first support member)
283A: Pivot shaft
283B: Screw shaft
284: Support member (second support member)
284A: Circular hole
284B: Elongate hole
286: Nut
287: Cover (first cover)
290: Mounting unit (second mounting unit)
291: Adjustment mechanism (second adjustment mechanism)
295: Cover (second cover)
A1: Detection-target area
A4: Detection-target area

What is claimed is:

1. A work vehicle comprising:
an obstacle detection module, including a plurality of obstacle searchers and a plurality of search information processors, configured to detect presence or absence of an obstacle; and
an electronic control unit, including a contact avoidance control unit configured to perform, upon the obstacle detection module detecting an obstacle, contact avoidance control to keep a vehicle body from coming into contact with the obstacle,
the obstacle detection module and the electronic control unit being included in an electronic control system configured for automated driving that automatically drives the vehicle body,
a hood that is located in a front portion of the vehicle body;
a cabin that is located in a rear portion of the vehicle body; and
right and left rear fenders that are located in the rear portion of the vehicle body,
wherein the plurality of obstacle searchers that are distributed on a front end portion and right and left end portions of the vehicle body such that a front side and right and left lateral sides of the vehicle body are search-target areas,
wherein the plurality of obstacle searchers include:
right and left first range sensors that are attached to a front end portion of the hood;
right and left second range sensors that are attached to right and left side portions of the hood at positions higher than right and left travel apparatuses, respectively;
right and left third range sensors that are attached to right and left front pillars of the cabin that are located at front/rear intermediate portions of the vehicle body, respectively; and
right and left fourth range sensors that are attached to the right and left rear fenders at positions higher than the travel apparatuses, respectively.

2. A work vehicle comprising:
an obstacle detection module, including a plurality of obstacle searchers and a plurality of search information processors, configured to detect presence or absence of an obstacle; and
an electronic control unit, including a contact avoidance control unit configured to perform, upon the obstacle detection module detecting an obstacle, contact avoidance control to keep a vehicle body from coming into contact with the obstacle,
the obstacle detection module and the electronic control unit being included in an electronic control system configured for automated driving that automatically drives the vehicle body,
wherein the plurality of obstacle searchers that are distributed on a front end portion and right and left end portions of the vehicle body such that a front side and right and left lateral sides of the vehicle body are search-target areas,
wherein each of the obstacle searchers comprises a sonar device with an oscillator, and
the sonar device is attached to the vehicle body via a resonance prevention member that is made of resin.

3. A work vehicle comprising:
an obstacle detection module, including an obstacle detector and a plurality of search information processors, configured to detect presence or absence of an obstacle; and
an electronic control unit, including a travel regulation control unit configured to control travel of a vehicle body upon the obstacle detection module detecting an obstacle,
the obstacle detection module and the electronic control unit being included in an electronic control system configured for automated driving that automatically drives the vehicle body,
wherein the obstacle detector is configured to detect an obstacle present in a detection-target area located on a front side and a lateral side of a main part of the vehicle body,
wherein in an up-down direction, the obstacle detector is located between an upper end portion of a hood, and an upper end portion of a front wheel.

4. The work vehicle according to claim 3, wherein
in a right-left direction, the obstacle detector is located between an outer end of a hood, and an outermost position of the main part of the vehicle body associated therewith.

5. The work vehicle according to claim 3, wherein
the obstacle detector is located at a front/rear intermediate portion of the main part of the vehicle body.

6. The work vehicle according claim 3, wherein
the obstacle detector is attached to a support frame that extends in an up-down direction.

7. The work vehicle according to claim 3, wherein
a right-left pair of the obstacle detectors are provided.

8. The work vehicle according to claim 3, wherein
the detection-target area of the obstacle detector is set to extend over an upper front side of a front wheel.

9. The work vehicle according to claim 3, wherein
the obstacle detector comprises a laser scanner, and
wherein the detection-target area of the obstacle detector is set to be inclined fore and aft, and right and left with respect to the horizontal plane.

10. A work vehicle comprising:
an obstacle detection module, including an obstacle detector and a plurality of search information processors, configured to detect presence or absence of an obstacle; and
an electronic control unit, including a travel regulation control unit configured to control travel of a vehicle body upon the obstacle detection module detecting an obstacle,
the obstacle detection module and the electronic control unit being included in an electronic control system configured for automated driving that automatically drives the vehicle body,
wherein the obstacle detector is configured to detect an obstacle present in a detection-target area located on a front side and a lateral side of a main part of the vehicle body,
wherein the obstacle detector is attached to a support frame that extends in an up-down direction, and
wherein the support frame comprises a front pillar provided in a cabin.

11. A work vehicle comprising:
an obstacle detection module, including an obstacle detector and a plurality of search information processors, configured to detect presence or absence of an obstacle; and
an electronic control unit, including a travel regulation control unit configured to control travel of a vehicle body upon the obstacle detection module detecting an obstacle,
the obstacle detection module and the electronic control unit being included in an electronic control system configured for automated driving that automatically drives the vehicle body,
wherein the obstacle detector is configured to detect an obstacle present in a detection-target area located on a front side and a lateral side of a main part of the vehicle body,
wherein the obstacle detector is attached to a ROPS (Roll Over Protective Structure) frame for turnover protection of the work vehicle.

* * * * *